(12) United States Patent
Nishina et al.

(10) Patent No.: US 7,961,365 B2
(45) Date of Patent: Jun. 14, 2011

(54) IMAGE READING APPARATUS AND IMAGE FORMING APPARATUS

(75) Inventors: Kiichiro Nishina, Yokohama (JP);
Yoshifumi Sudoh, Machida (JP);
Masahiro Itoh, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 450 days.

(21) Appl. No.: 12/118,083

(22) Filed: May 9, 2008

(65) Prior Publication Data

US 2008/0278779 A1      Nov. 13, 2008

(30) Foreign Application Priority Data

May 10, 2007   (JP) ................................. 2007-125322
Jun. 29, 2007   (JP) ................................. 2007-171981

(51) Int. Cl.
*H04N 1/56*      (2006.01)
*H04N 1/48*      (2006.01)
(52) U.S. Cl. ......... 358/518; 358/505; 358/513; 359/773
(58) Field of Classification Search .................. 358/448, 358/468, 474, 475, 518, 505, 513; 359/205.1, 359/652, 662, 664, 672, 676, 683, 685, 686, 359/687, 688, 768, 771, 772, 773
See application file for complete search history.

(56) References Cited

U.S. PATENT DOCUMENTS

| | | |
|---|---|---|
| 4,690,518 A | 9/1987 | Kouchiwa et al. |
| 4,738,517 A | 4/1988 | Nishina et al. |
| 4,753,522 A | 6/1988 | Nishina et al. |
| 4,836,664 A | 6/1989 | Nishina |
| 4,997,265 A | 3/1991 | Nishina |
| 5,311,364 A | 5/1994 | Kanoshima et al. |
| 5,680,254 A | 10/1997 | Ueda et al. |
| 5,781,324 A | 7/1998 | Nishina |
| 5,959,785 A * | 9/1999 | Adachi .......................... 359/692 |
| 6,034,824 A * | 3/2000 | Moon ............................ 359/651 |
| 6,097,508 A * | 8/2000 | Hattori .......................... 358/475 |
| 6,288,820 B1 * | 9/2001 | Noda ............................ 359/773 |
| 6,665,131 B2 * | 12/2003 | Suzuki et al. ................. 359/778 |
| 6,718,132 B2 | 4/2004 | Nishina |
| 6,724,414 B2 | 4/2004 | Masuda et al. |
| 6,747,818 B2 | 6/2004 | Ohashi et al. |
| 6,909,559 B2 | 6/2005 | Nishina |
| 6,924,938 B2 | 8/2005 | Nishina et al. |
| 7,027,236 B2 | 4/2006 | Nishina |
| 7,031,074 B2 | 4/2006 | Nishina et al. |
| 7,064,902 B2 | 6/2006 | Nishina et al. |

(Continued)

FOREIGN PATENT DOCUMENTS

JP      2-38925      9/1990

(Continued)

*Primary Examiner* — Kimberly A Williams
(74) *Attorney, Agent, or Firm* — Dickstein Shapiro LLP

(57) ABSTRACT

An image reading apparatus includes: a light source which irradiates illumination light to a document; an imaging element which images reflected light of the illumination light from the document; a color separator which performs color separation of the illumination light or the reflected light into at least three wavelength ranges including a first wavelength range, a second wavelength ranges and a third wavelength range; a light-receiving element which converts the reflected light imaged by the imaging element into an electrical signal as a document image of the document, for each of the at least three wavelength ranges; and an image processor which classifies the document image on the basis of the electrical signal in the first wavelength range and in the second wavelength range.

17 Claims, 28 Drawing Sheets

U.S. PATENT DOCUMENTS

| | | |
|---|---|---|
| 7,133,220 B2 | 11/2006 | Nishina |
| 7,164,541 B2 | 1/2007 | Nishina et al. |
| 7,184,222 B2 | 2/2007 | Nishina |
| 7,277,629 B2 | 10/2007 | Nishina |
| 7,450,275 B2 * | 11/2008 | Nishina .................. 358/474 |
| 7,478,754 B2 * | 1/2009 | Gurevich et al. ........ 235/462.24 |
| 7,777,973 B2 * | 8/2010 | Jeong et al. .................. 359/775 |
| 2002/0048093 A1 * | 4/2002 | Suzuki et al. .................. 359/752 |
| 2004/0228014 A1 * | 11/2004 | Kelly .......................... 359/831 |
| 2004/0264008 A1 | 12/2004 | Nishina |
| 2005/0045725 A1 * | 3/2005 | Gurevich et al. ............. 235/454 |
| 2005/0111115 A1 | 5/2005 | Tatsuno et al. |
| 2005/0141103 A1 * | 6/2005 | Nishina .................. 359/715 |
| 2006/0114577 A1 * | 6/2006 | Nishina .................. 359/771 |
| 2006/0244930 A1 * | 11/2006 | Hayashi et al. ................. 353/97 |
| 2007/0201144 A1 | 8/2007 | Sudoh |
| 2007/0216969 A1 | 9/2007 | Nishina |
| 2007/0247726 A1 | 10/2007 | Sudoh |
| 2008/0019017 A1 | 1/2008 | Nishina |
| 2008/0063313 A1 | 3/2008 | Nishina |
| 2009/0273719 A1 * | 11/2009 | Kuwata et al. ............... 348/745 |
| 2010/0172020 A1 * | 7/2010 | Price et al. .................... 359/381 |

FOREIGN PATENT DOCUMENTS

| | | |
|---|---|---|
| JP | 03-240010 | 10/1991 |
| JP | 4-104113 | 4/1992 |
| JP | 5-164963 | 6/1993 |
| JP | 6-59189 | 3/1994 |
| JP | 8-160297 | 6/1996 |
| JP | 8-286108 | 11/1996 |
| JP | 9-101452 | 4/1997 |
| JP | 9-304696 | 11/1997 |
| JP | 2729039 | 12/1997 |
| JP | 2790919 | 6/1998 |
| JP | 2000-249913 | 9/2000 |
| JP | 2001-100096 | 4/2001 |
| JP | 2001-166359 | 6/2001 |
| JP | 2002-31753 | 1/2002 |
| JP | 2002-287022 | 10/2002 |
| JP | 2004-112535 | 4/2004 |
| JP | 2004-294925 | 10/2004 |
| JP | 3821929 | 6/2006 |
| JP | 3856258 | 9/2006 |
| JP | 3934197 | 3/2007 |

* cited by examiner

EXAMPLE 1

EXAMPLE 1

EXAMPLE 2

EXAMPLE 2

EXAMPLE 5

EXAMPLE 5

COMPARATIVE EXAMPLE

COMPARATIVE EXAMPLE

SMOOTHING FILTER

1/16 ×
| 1 | 1 | 1 | 1 | 1 |
|---|---|---|---|---|
| 1 | 1 | 2 | 1 | 1 |
| 1 | 1 | 1 | 1 | 1 |

EDGE REINFORCEMENT FILTER

1/8 ×
| 0 | 0 | -4 | 0 | 0 |
|---|---|----|---|---|
| -1 | -3 | 24 | -3 | -1 |
| 0 | 0 | -4 | 0 | 0 |

EXAMPLE 6

EXAMPLE 6

EXAMPLE 7

EXAMPLE 7

EXAMPLE 8

EXAMPLE 8

EXAMPLE 9

EXAMPLE 9

EXAMPLE 10

EXAMPLE 10

EXAMPLE 11

EXAMPLE 11

IMAGE READING APPARATUS AND IMAGE FORMING APPARATUS

CROSS REFERENCE TO RELATED APPLICATIONS

The present application is based on and claims priorities from Japanese Patent Applications No. 2007-125322, filed May 10, 2007, and No. 2007-171981, filed Jun. 29, 2007, the disclosure of which are hereby incorporated by reference herein in their entirety.

BACKGROUND

The present invention relates to an image reading apparatus, and to an image forming apparatus utilizing the image reading apparatus.

A document reading section (or an image reading apparatus), such as a digital copying machine, a facsimile, an image scanner and so on for example, utilizes an optical system to image a document on a light-receiving element (or a photoelectric conversion element), so as to convert an image of the document into an electrical signal. As a method of reading the document image in color, there has been proposed a method which converts information on colors of the document image into a signal, by subsequently lighting plural light sources provided in an illumination system and having different wavelength ranges, respectively, to read out the document image. There has been also a method which converts the color information of the document image, by utilizing a so-called three-line CCD (Charge-Coupled Device) as a light-receiving element, in which, for example, three lines of line sensors having red, green and blue filters, respectively, are aligned on a single chip, to perform color separation of the document image into three primary colors so as to read out the document image.

It has been known that an image reading apparatus of a digital copying machine applies an image process of pseudo-halftone processing to a photograph region, applies an image process of moire removing processing to a dot region, and applies an image process of sharpening processing, in which resolution is emphasized, to a line drawing region such as characters, in a case when a document image is mixed with a photograph, a dot image and a line drawing such as characters, in order to achieve high image quality in copying. Additionally, the most appropriate encoding type is selected for each of the regions to improve a compression rate of an image when the image is to be transmitted. In order to realize such image processes, the image reading apparatus of the digital copying machine performs an image process referred to as a so-called image region separation process, in which a character region and a design region (such as the photograph region and the dot region) in the image are separated at high precision, as preprocessing of such image processes.

In addition, as the image processes, a filter process or a spatial filter process has been generally performed for a digital image signal, for the purpose of improving sharpness, smoothness and so on of the image. In particular, a MTF (Modulation Transfer Function) compensation for improving the sharpness of characters and a smoothing process for suppressing the moire of a dot are essential processes in the image processor such as the digital copying machine which handle the image signal read by a scanning device.

Formerly, in the filter process performed in a color copying machine, a method of implementing the filter process to signals of three primary colors or the three primary colors plus a color of black (K=Keytone), for example RGB (Red, Green and Blue) or CMYK (Cyan, Magenta, Yellow, and Keytone), has been general. However, in recent years, a method in which at least one of luminance/color difference signals, value/chromaticity signals, and value/saturation/hue signals are used, and which implements the filter process to the signals in which characteristic of colors are considered, is becoming mainstream.

An advantage of the filter process to the luminance/color difference signals and so on is that filter processing, in which visual characteristics of humans such as high sensitivity for the luminance and low sensitivity for the color difference are considered, is possible. Another advantage is that adjustment of intensity of edge reinforcement, adjustment of the smoothing, and adjustment of degree of compensation of signals and so forth for the luminance signal and the color difference signal for example are easily realized according to a characteristic of an input image such as saturation.

Generally, it is required for a reading lens used in the image reading apparatus to have a high contrast in a high spatial frequency domain in an image plane, and at the same time, to have an aperture efficiency of substantially 100% up to a peripheral part of a field angle. Furthermore, in order to achieve decent reading of a colored document, it is necessary to match imaging positions of respective colors of red, green and blue in a direction of an optical axis on a light-receiving surface, and to perform a significantly fine compensation for chromatic aberration of the respective colors. Accordingly, it is necessary to design the reading lens such that a field curvature is suppressed to be extremely small and that an imaging performance in each image height from a part near the optical axis to a peripheral part becomes even.

Furthermore, in recent years, a bright lens having an F-number of about F4.2 has been demanded for the reading lens, in order to cope with a demand for improvement in productivity or speed-up in copying. In order to cope with the above demands, a Gauss type imaging lens having a four-group and six-piece structure, which is capable of suppressing generation of coma flare even when a relatively large diameter is employed and in which performance of the chromatic aberration compensation is also high, has been used as the imaging lens which satisfies performance and specification for coping with those demands.

For example, Japanese Patent Registration No. 2729039, No. 2790919, No. 3934197, and No. 3821929, as well as Japanese Patent Publication No. H09-304696 and No. 2001-166359 each discloses the invention in which a so-called anomalous dispersion glass, wherein partial dispersion deviation has a plus property, is used for at least one of a third lens and a fourth lens which are negative lenses, so as to better compensate chromatic aberration on an optical axis, in a case in which the Gauss type is used.

However, since the number of pieces of lens structuring the lens is six, which is large, the Gauss type has a drawback in that an external diameter of the lens becomes large, and has limitation or earlier restriction in miniaturization as well as cost reduction of the lens and a device utilizing such lens. Furthermore, the anomalous dispersion glass having relatively high dispersion (for example, Abbe number is in the vicinity of 40 to 45), which is generally used for the negative lens, has a problem in terms of fabrication such as easier generation of lens burn, and thus has a disadvantage in that fabrication costs are increased.

On the other hand, Japanese Patent Publication No. 2002-31753 and No. 2001-166359 each discloses the invention of a telephoto type having a reduced number of pieces of lens structuring a lens, i.e., having a four-group and four-piece structure. However, the telephoto type disclosed in Japanese Patent Publication No. 2002-31753 and No. 2001-166359 has an F-number of 6 or more, which is dark, and thus cannot cope with speed-up of copying.

In addition, Japanese Patent Registration No. 3856258 and Japanese Patent Publication No. H09-101452 each discloses the invention which achieves diameter increase in the telephoto type. However, although the invention disclosed in Japanese Patent Registration No. 3856258 has the F-number of 4.5 which is relatively large in a diameter, an amount of aberration is extremely large. Thus, the invention disclosed in Japanese Patent Registration No. 3856258 has a disadvantage in that it does not have imaging performance useable for high-density reading such as 600 dpi for example.

Also, while the invention disclosed in Japanese Patent Publication No. H09-101452 has the F-number of four which is large in the diameter, axial chromatic aberration of both a blue region and a red region is extremely large. Thus, the invention disclosed in Japanese Patent Registration No. H09-101452 has a disadvantage in that it does not have performance usable for a full color copying machine.

SUMMARY

At least one objective of the present invention is to provide an image reading apparatus which uses an imaging lens including the reduced number of lenses and which has high image quality, and an image forming apparatus using the same.

To achieve these and other advantages and in accordance with the purpose of the invention, as embodied and broadly described herein, the invention provides a first image reading apparatus, comprising: a light source which irradiates illumination light to a document; an imaging element which images reflected light of the illumination light from the document, and which satisfies a formula (1)

$$|Bf1-Bf2|<|Bf3-Bf2| \quad (1)$$

where Bf1 is a distance from a rear end part of the imaging element to a first imaging position relative to first light having a wavelength in a first wavelength range, Bf2 is a distance from the rear end part of the imaging element to a second imaging position relative to second light having a wavelength in a second wavelength range, and Bf3 is a distance from the rear end part of the imaging element to a third imaging position relative to third light having a wavelength in a third wavelength range; a color separator which performs color separation of the illumination light or the reflected light into at least three wavelength ranges including the first wavelength range, the second wavelength range, and the third wavelength range; a light-receiving element which converts the reflected light imaged by the imaging element into an electrical signal as a document image of the document, for each of the at least three wavelength ranges; and an image processor which classifies the document image on the basis of the electrical signal in the first wavelength range and in the second wavelength range.

In addition, the invention provides a second image reading apparatus, comprising: a light source which irradiates illumination light to a document; an imaging element which images reflected light of the illumination light from the document, and which satisfies a formula (7)

$$0.001<|f-fe|/fe \quad (7)$$

where fe is a focal distance for a reference wavelength e-line (546.07 nm), and f is a focal distance for a C-line (656.27 nm) or for an F-line (486.13 nm); a color separator which performs color separation of the illumination light or the reflected light into at least three wavelength ranges including a first wavelength range, a second wavelength range, and a third wavelength range; a light-receiving element which converts the reflected light imaged by the imaging element into an electrical signal as a document image of the document, for each of the at least three wavelength ranges; and an image processor which converts the electrical signal into luminance/color difference signals or value/chromaticity signals to perform a filter process.

Furthermore, the invention provides an image forming apparatus, comprising: the first image reading apparatus or the second image reading apparatus; and an image forming section which forms an electrostatic latent image on a photoconductive photoreceptor with a light beam, on the basis of an output signal from the image reading apparatus.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the specification, serve to explain the principles of the invention.

DETAILED DESCRIPTION

Figure 1:
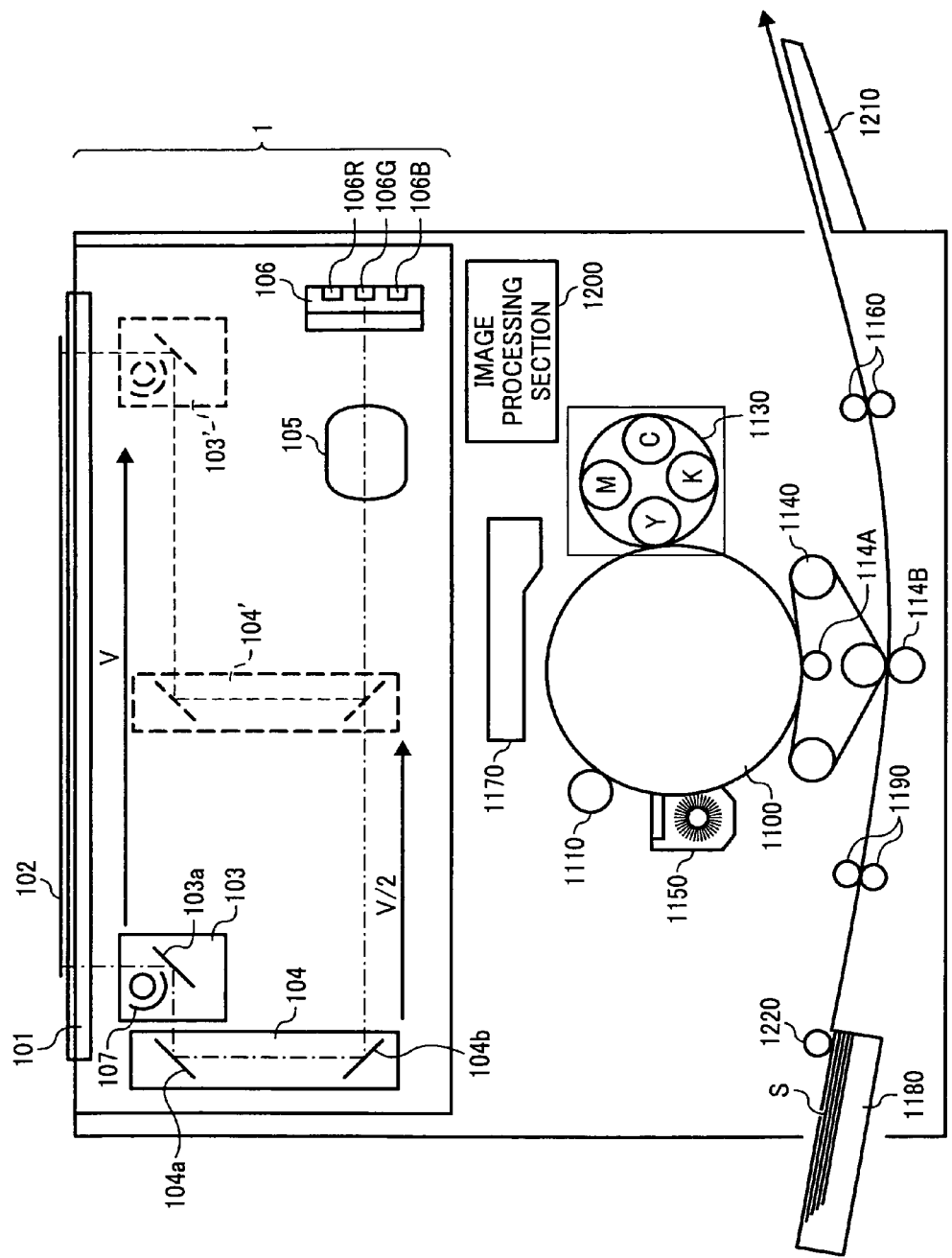
FIG. 1 schematically illustrates a structure of an image forming apparatus according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

First Embodiment

An image forming apparatus includes an image reading apparatus according to the present embodiment. The image reading apparatus reads an image of a document in full-color and outputs a signal of the image. The image forming apparatus then forms an image corresponding to the image signal read by the image reading apparatus. The image forming apparatus according to the present embodiment utilizes a light beam to form an image, although any known methods such as an ink jet method, an ink ribbon method, a thermal method and so on, for example, can be used as a formation method of the image in the image forming apparatus. In addition, the image forming apparatus forms an electrostatic latent image corresponding to an image to be formed onto a surface of a photoreceptor having a photoconductive property to form the image, although formation of the image can also be performed onto films such as a silver salt film.

FIG. 1 schematically illustrates a structure of a digital full-color copying machine as an image forming apparatus according to a first embodiment of the invention. The image forming apparatus includes an image reading apparatus according to the present embodiment, and an image forming section. The image reading apparatus includes a scanner 1 as a document reading section, and a later-described first image processor provided with a scanner compensation section 2 (illustrated in FIG. 5), a filter processing section (not shown), a color compensation processing section (not shown), and a BG/UCR (Black Generation processing and Under-Color-Removal) processing section (not shown). The image forming section performs formation of an image corresponding to an image signal of a document image read by the image reading apparatus. Referring to FIG. 1, the scanner 1 is disposed at an upper part of the image forming apparatus, whereas the image forming section is disposed at a lower part of the image forming apparatus.

The image forming apparatus or the image reading apparatus according to the present embodiment includes a light source which irradiates illumination light to a document, an imaging element which images reflected light of the illumination light from the document, a light-receiving element which converts the reflected light imaged by the imaging element into an electrical signal as a document image, and an image processor which performs an image process on the basis of the electrical signal. The image forming apparatus or the image reading apparatus also includes a color separator provided in an optical path from the light source to the light-receiving element and which performs color separation of the illumination light or the reflected light into at least three kinds of wavelength ranges including a first wavelength range, a second wavelength range, and a third wavelength range. The imaging element satisfies a formula (1) as follows.

$$|Bf1-Bf2|<|Bf3-Bf2| \tag{1}$$

where Bf1 represents a distance from a rear end part of the imaging element to an imaging position relative to light having an arbitrary wavelength in the first wavelength range, Bf2 represents a distance from the rear end part of the imaging element to an imaging position relative to light having an arbitrary wavelength in the second wavelength range, and Bf3 represents a distance from the rear end part of the imaging element to an imaging position relative to light having an arbitrary wavelength in the third wavelength range.

Moreover, the light-receiving element performs the conversion for each of the wavelength ranges which are color-separated by the color separator. The image processor performs the image process which classifies the document image on the basis of the electrical signal in the first wavelength range and in the second wavelength range.

It is preferable that, although it is not limited thereto, the light having the arbitrary wavelength in the first wavelength range be blue light (B), the light having the arbitrary wavelength in the second wavelength range be green light (G), and the light having the arbitrary wavelength in the third wavelength range be red light (R).

In addition, it is preferable that the image processor judge whether or not the document image includes a dot region, by utilizing the electrical signal in the first wavelength range as a first color signal and the electrical signal in the second wavelength range as a second color signal.

Figure 2:
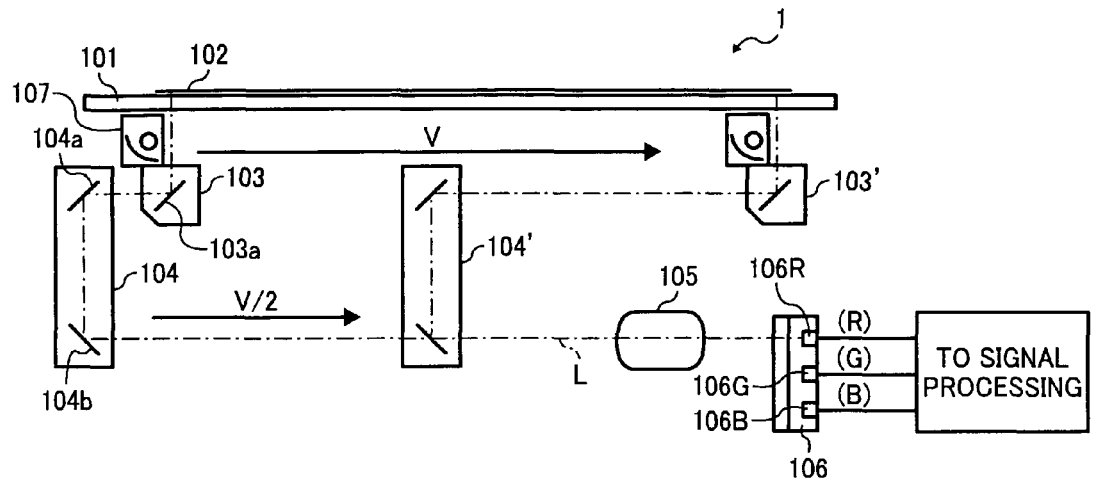
FIG. 2 is a sectional side view illustrating an image reading apparatus according to the first embodiment of the invention.

FIG. 2 illustrates the scanner 1 as the image reading apparatus or as a part of the image reading apparatus according to the first embodiment of the invention. Referring to FIG. 2, the scanner 1 according to the present embodiment includes a so-called three-line CCD (Charge Coupled Device) as a light-receiving element.

In the scanner 1, a document 102 is disposed or placed on a contact glass 101. The document 102 is illuminated through the contact glass 101 by an illumination optical system 107 disposed below the contact glass 101. Illumination reflected light L from the document 102 is reflected by a first mirror 103a of a first moving carriage 103, which is then reflected by a first mirror 104a and a second mirror 104b of a second moving carriage 104 to be guided to an imaging lens 105. Thereafter, the illumination reflected light L is imaged by the imaging lens 105 on each line sensor 106R, 106G, and 106B of a line sensor unit 106.

For example, when a longitudinal direction (a horizontal direction in FIG. 2) of the document 102 is to be read, the first moving carriage 103 moves to a position denoted by a reference numeral 103' located on a right side end from a left side end of FIG. 2 at a speed of "V". Simultaneously the second moving carriage 104 moves to a position denoted by a reference numeral 104' located in a central part from the left side end of FIG. 2 at a speed of "V/2" which is half the speed of the first moving carriage 103. In this operation, an optical length from the document 102 to the line sensor unit 106 becomes constant, consistently, and thereby, reading of the entire part of the document 102 is performed.

The line sensor unit 106 has a structure in which the line sensors 106R, 106G, and 106B as line CCDs are aligned parallel to each other in three lines on a single chip, in such a manner that a longitudinal direction of each of the line sensors 106R, 106G, and 106B becomes or corresponds to a sub-scanning direction (a direction orthogonal to a plane of the drawings). In other words, the line sensor unit 106 employs the three-line CCD. In addition, filters for performing color separation of the illumination reflected light L into light having three kinds of wavelength ranges, i.e., a filter which color-separates the illumination reflected light L into light having a wavelength range of red (R), a filter which color-separates the illumination reflected light L into light having a wavelength range of green (G), and a filter which color-separates the illumination reflected light L into light having a wavelength range of blue (B), are provided on a front surface of the line sensors 106R, 106G, and 106B, respectively.

Figure 3:
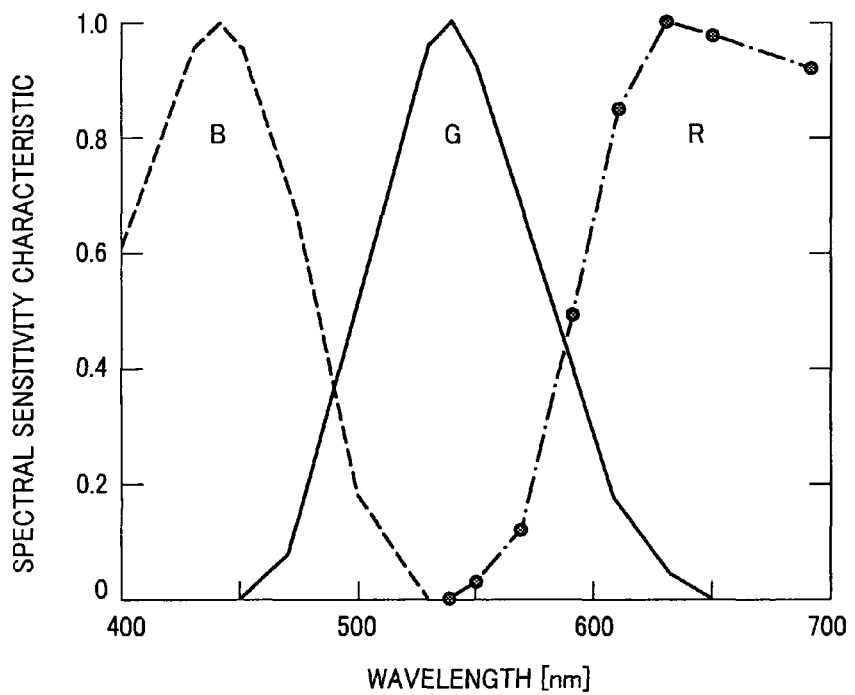
FIG. 3 illustrates one example of a spectral sensitivity characteristic of a line sensor unit according to the first embodiment of the invention.

FIG. 3 illustrates one example of a spectral sensitivity characteristic of the line sensor unit 106. FIG. 3 illustrates an example in which ordinary white light is incident on the line sensor unit 106 as the illumination reflected light L, wherein a horizontal axis represents a wavelength and a vertical axis represents spectral sensitivity.

In FIG. 3, a curved line of R corresponds to the line sensor 106R, which indicates high transmittance to the red light. In addition, a curved line of G corresponds to the line sensor 106G, which indicates high transmittance to the green light, and a curved line of B corresponds to the line sensor 106B, which indicates high transmittance to the blue light. The wavelength ranges of the respective curved lines of R, G and B have the following features in, for example, a visible range from 400 nm to 700 nm. The wavelength range of R has the spectral sensitivity within a range of 550 nm to 700 nm, in which a peak wavelength appears in the vicinity of 650 nm. In addition, the wavelength range of G has the spectral sensitivity within a range of 450 nm to 650 nm, in which a peak wavelength appears in the vicinity of 550 nm. The wavelength range of B has the spectral sensitivity within a range of 400 nm to 550 nm, in which a peak wavelength appears in the vicinity of 450 nm.

As a method of color separation, a color separation prism, a color separation filter or the like may be selectively inserted between the imaging lens 105 and the line sensors 106R, 106G, and 106B to color-separate the light into R, G and B. Alternatively, light sources of R, G and B may be subsequently lit to illuminate the document 102. However, any methods can be employed as long as the light is separated into predetermined wavelength ranges.

Figure 4:
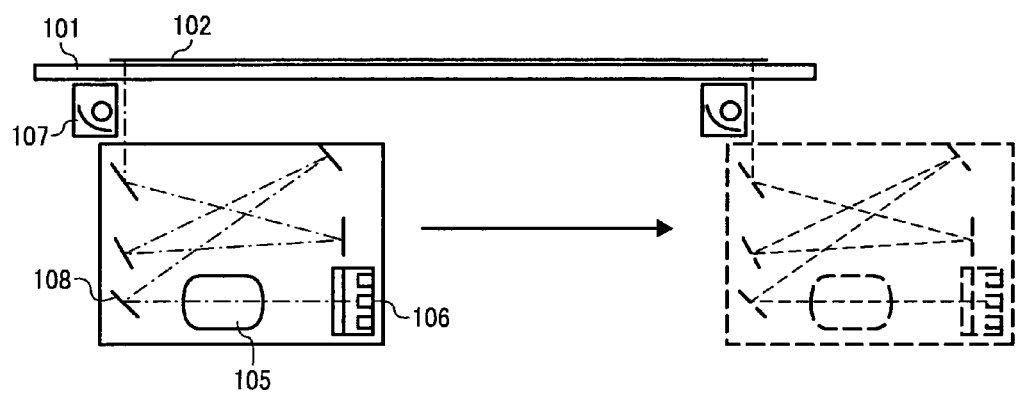
FIG. 4 is a sectional side view illustrating another image reading apparatus according to the first embodiment of the invention.

FIG. 4 illustrates another image reading apparatus according to the first embodiment of the invention. The optical system of the image reading apparatus may alternatively have a structure in which the optical path of the illumination reflected light L is turned back by a plurality of mirrors (the number of lenses can be arbitrary selected) to guide the illumination reflected light L to the imaging lens 105, and in which the mirrors, the imaging lens 105 and the line sensor unit 106 are held by an integrated unit 108, which moves in its entirety to read the document image.

When the document image is imaged on a light-receiving surface of the line-sensor unit 106, the document image is color-separated by the filters of the line sensors 106R, 106G and 106B into document images having three colors of R, G and B. Then, the document images of R, G and B are photo-electrically converted by the line sensors 106R, 106G and 106B into electrical signals corresponding to the document images of R, G and B, which are then outputted to the subsequent first image processor. The electrical signals corresponding to the document images of R, G and B may be referred to as an R signal, a G signal, and a B signal, respectively, or may be collectively referred to as an RGB image data. The B signal corresponds to the curved line of B illustrated in FIG. 3, whereas the G signal corresponds to the curved line of G, and the R signal corresponds to the curved line of R illustrated in FIG. 3.

Thereafter, the first image processor, which is illustrated in FIG. 1 as an image processor 1200, performs predetermined image processes to the RGB image data outputted from the line sensor unit 106, and outputs image signals used for formation of electrostatic latent images. More specifically, the image signals are used for forming the electrostatic latent images corresponding to the respective colors of yellow (Y), magenta (M), cyan (C) and black (K=keytone) onto the surface of the photoreceptor, which will be described later in greater detail. Subsequently, the image signals for the electrostatic latent image formation are compressed in a compression processing section 3.

The image forming section illustrated in FIG. 1 includes a second image processor, which is illustrated in FIG. 1 as the image processor 1200, and an image outputting section. The second image processor includes an expansion processing section 6, and a printer compensation section 7. First, the image signals for the electrostatic latent image formation, compressed in the compression processing section 3, are expanded to be the original uncompressed image signals for the electrostatic latent image formation in the expansion processing section 6. Then, the printer compensation section 7 performs quantization of image data and outputs the image data. The quantization of the image data may be carried out by, for example, a printer γ (gamma) compensation process, a gradation process, a compensation process for a brightness characteristic in the subsequent image outputting section, an error diffusion process according to a gradation characteristic in the subsequent image outputting section and a result of image region separation, and a dither process. In the present embodiment, the first image processor and the second image processor are provided integrally as the single image processor 1200 as illustrated in FIG. 1, although the first image processor and the second image processor may be individually provided. Thereafter, the electrostatic latent images are formed on the surface of the photoreceptor by the image outputting section.

Referring to FIG. 1, the image outputting section includes a photoconductive photoreceptor 1100 formed cylindrical. In addition, an electrification roller 1110 as a charger, a revolver type developing device 1130, a transfer belt 1140, and a cleaning device 1150 are arranged around the photoreceptor 1100. A so-called corona charger can be used for the charger, in place of the electrification roller 1110.

An optical scanning device 1170, which scans a light beam on the basis of a signal outputted from the image processor 1200 and forms the electrostatic latent image on the photoreceptor 1100, is provided above the photoreceptor 1100. The optical scanning device 1170 performs optical scanning of the photoreceptor 1100 between the electrification roller 1110 and the developing device 1130.

FIG. 1 also illustrates transfer papers S as recording media, a fixing device 1160, a cassette 1180 in which the transfer papers S are stored, a pair of resist rollers 1190, a paper-feeding roller 1220, and a tray 1210.

To form an image, the photoconductive photoreceptor 1100 is rotated in a clockwise direction in the drawings at a constant speed, and the surface thereof is evenly charged by the electrification roller 1110. The surface of the photoreceptor 1100 is exposed by a laser beam of the optical scanning device 1170, and thereby the electrostatic latent image is formed. The thus-formed electrostatic latent image is a so-called negative latent image.

The formation of the electrostatic latent image is performed in order of a yellow image, a magenta image, a cyan image and a black image, in accordance with the rotation of the photoreceptor 1100. The formed electrostatic latent images are subsequently subjected to reversal development by a developer unit Y which performs development by a yellow toner, a developer unit M which performs development by a magenta toner, a developer unit C which performs development by a cyan toner, and a developer unit K which performs development by a black toner, which are provided in the revolver type developing device 1130, so as to be visualized as toner images as positive images. The thus-obtained toner images of the respective colors are subsequently transferred onto the transfer belt 1140 by a transfer voltage applying roller 114A. Thereby, the toner images of the respective colors are overlapped on the transfer belt 1140 to be a color image.

The cassette 1180, stored with the transfer papers S, is provided as attachable and detachable to a body of the image forming apparatus. The uppermost one sheet of transfer papers S stored in the cassette 1180, in a state in which the cassette 1180 is mounted to the body of the image forming apparatus as illustrated in FIG. 1, is delivered to the pair of resist rollers 1190 by the paper-feeding roller 1220. Thus, a tip end of the transfer paper S delivered toward the pair of resist rollers 1190 is caught by the resist rollers 1190.

The pair of resist rollers 1190 sends the transfer paper S to a transfer section in accordance with timing that the toner image on the transfer belt 1140 moves to a transfer position. The transfer paper S delivered to the transfer section is overlapped with the toner image in the transfer section, and is pressed to the toner image on the transfer belt 1140 by a transfer roller 114B. By this operation, the toner image is electro-statically transferred on the transfer paper S.

The transfer paper S on which the toner image is transferred is then sent to the fixing device 1160 to fix the toner image. Thereafter, the transfer paper S travels through a delivery path structured by a guiding member (not shown), and is discharged on the tray 1210 by a pair of paper-discharging rollers (not shown).

The surface of the photoreceptor 1100 is cleaned by the cleaning device 1150 to remove the residual toner, paper powder and so on, every time the toner image is transferred.

Now, a system of processing an image in the digital full-color copying machine, as illustrated in FIG. 1, is described.

Figure 5:
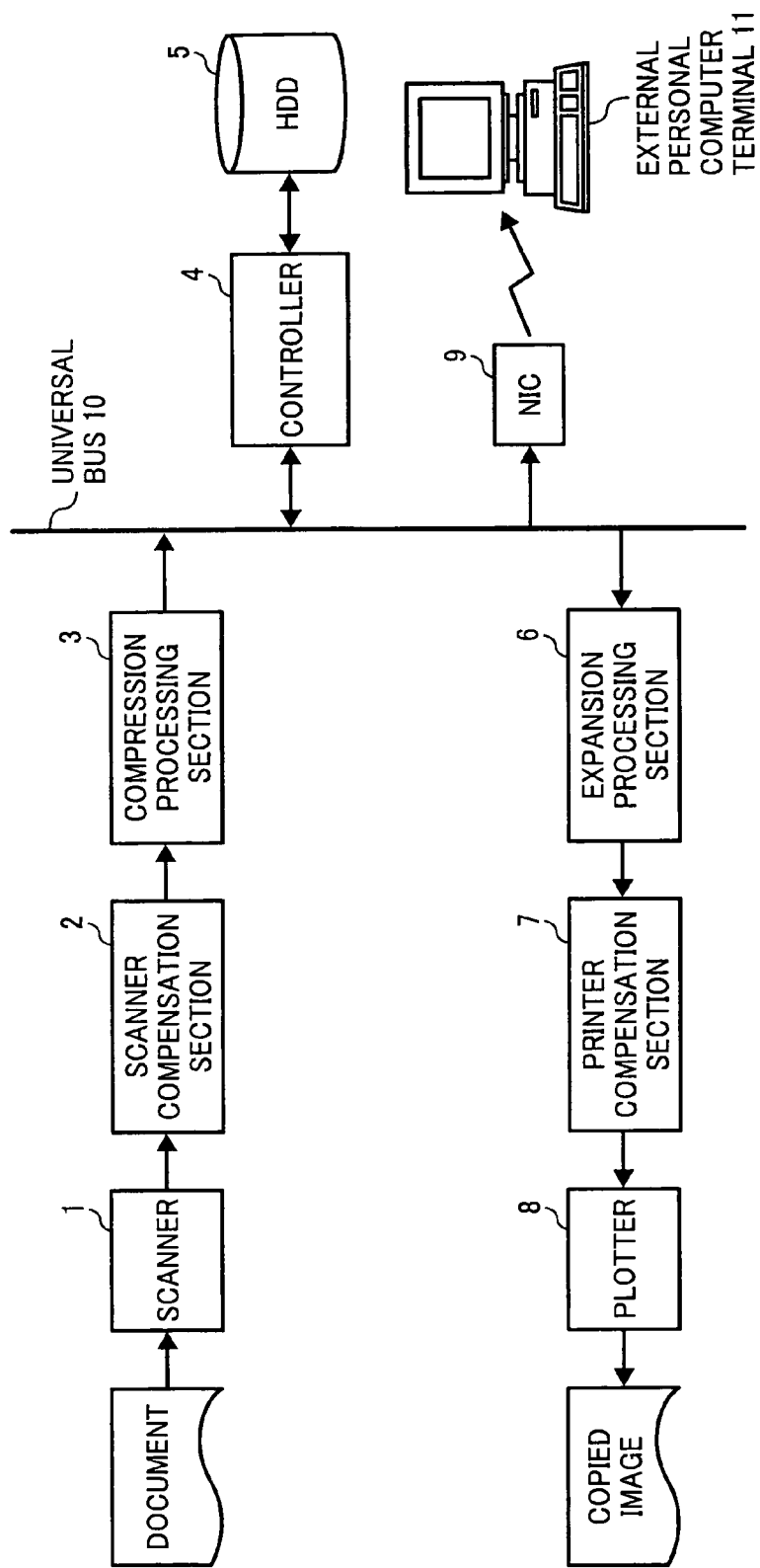
FIG. 5 is a block diagram of an image processor in the image forming apparatus.

FIG. 5 is a block diagram schematically illustrating the image processor 1200 in the digital full-color copying machine according to the present embodiment.

Hereinafter, a structure of each part of the image processor 1200, and processing in the course of copying the document, i.e., in the course of reading of the document image, accumulation of the read image, and an output of printing utilizing the accumulated images, will be briefly described.

When the scanner 1 operates as the full-color copying machine or as a part of the full-color copying machine, the scanner 1 reads a document image with the line sensor unit 106 as an analog image signal in which the document image is color-separated into R (red), G (green) and B (blue). The scanner 1 then converts the read analog image signal into digital data, and outputs the digital data.

The scanner compensation section 2 applies image processes such as a scanner γ (gamma) compensation process, a filter process and so on to the RGB image data as the digital data read by the scanner 1, so as to compensate characteristics of the scanner 1. The image processes performed in the scanner compensation section 2 separates, as image region separation, the document image into plural kinds of different image regions, and applies processes suitable for each of the image regions. The image regions, for example, include a character region, a line drawing region, and a design region. As the processes suitable for each of the image regions, for example, the scanner compensation section 2 applies a filter process which emphasizes the character region and smoothes the design region of the image, although it is not limited thereto. The processes related to the image region separation in the scanner compensation section 2 will be described later in greater detail.

The compression processing section 3 performs a process of compressing image data already subjected to the compensation by the scanner compensation section 2, and sends out the compressed image data to a universal bus 10. The image data after the compression is sent to a controller 4 through the universal bus 10. The controller 4 includes a semiconductor memory (not shown) to accumulate image data sent thereto.

The image data accumulated in the semiconductor memory are written in a large-capacity recorder 5 on an as-needed basis. The large-capacity recorder 5, for example, includes a hard-disk drive (HDD) as illustrated in FIG. 5, although it is not limited thereto. The accumulation of the image data in the large-capacity recorder 5 is for the purpose of eliminating needs for reading documents again in a case in which the transfer paper S is jammed in the full-color copying machine and thus an output which did not end properly, for the purpose of performing electronic sorting in which plural document image data are rearranged, and for the purpose of once accumulating the read documents and outputting the accumulated documents again when the need arises, and so forth. Here, although the image data after compensation by the scanner compensation section 2 are compressed by the compression processing section 3, the image data may not be compressed to be subjected to subsequent processes when a band of the universal bus 10 is sufficiently wide and capacity of the large-capacity recorder 5 is high.

Then, the controller 4 sends the image data accumulated in the large-capacity recorder 5 to the expansion processing section 6 through the universal bus 10. The expansion processing section 6 expands the compressed image data to the original uncompressed image data, and output the expanded image data to the printer compensation section 7.

The printer compensation section 7 performs the quantization of the image data. The quantization of the image data includes, for example, the printer γ (gamma) compensation process, the gradation process, the compensation process for the brightness characteristic in a plotter 8 as the subsequent image outputting section, the error diffusion process according to the gradation characteristic of the plotter 8 and the result of the image region separation, and the dither process.

The plotter 8 drives the light beam of the laser on the basis of the image data to form an image on the photoreceptor 1100 as an electrostatic latent image. In the present embodiment, the formed electrostatic latent images are developed by the toners of different colors, which are then transferred on the transfer paper S, and thereby a copied image is formed.

Next, a case in which the image processing system illustrated in FIG. 5 operates as a distribution scanner, i.e., a case in which image data is distributed through a network to a personal computer (PC) 11 as an external device which utilizes the image data inputted by the scanner, will be described.

As in the above-described case in which the operation is based on the copying machine, the document image is read by the scanner 1, and the read image is sent to the controller 4 through the processes performed in the scanner compensation section 2 and the compression processing section 3. The controller 4 performs a format process which converts the image data into a data format having a reduced burden on the network and in which availability of data in the personal computer 11 is considered. The RGB image data subjected to the format process by the controller 4 is distributed to the personal computer 11 through a NIC (Network Interface Controller) 9. The format process includes a conversion of the image data into a format such as JPEG (Joint Photographic Experts Group), TIFF (Tagged Image File Format), BMP (Bit Map), and other suitable formats used as general-purpose image formats, for example.

Figure 6:
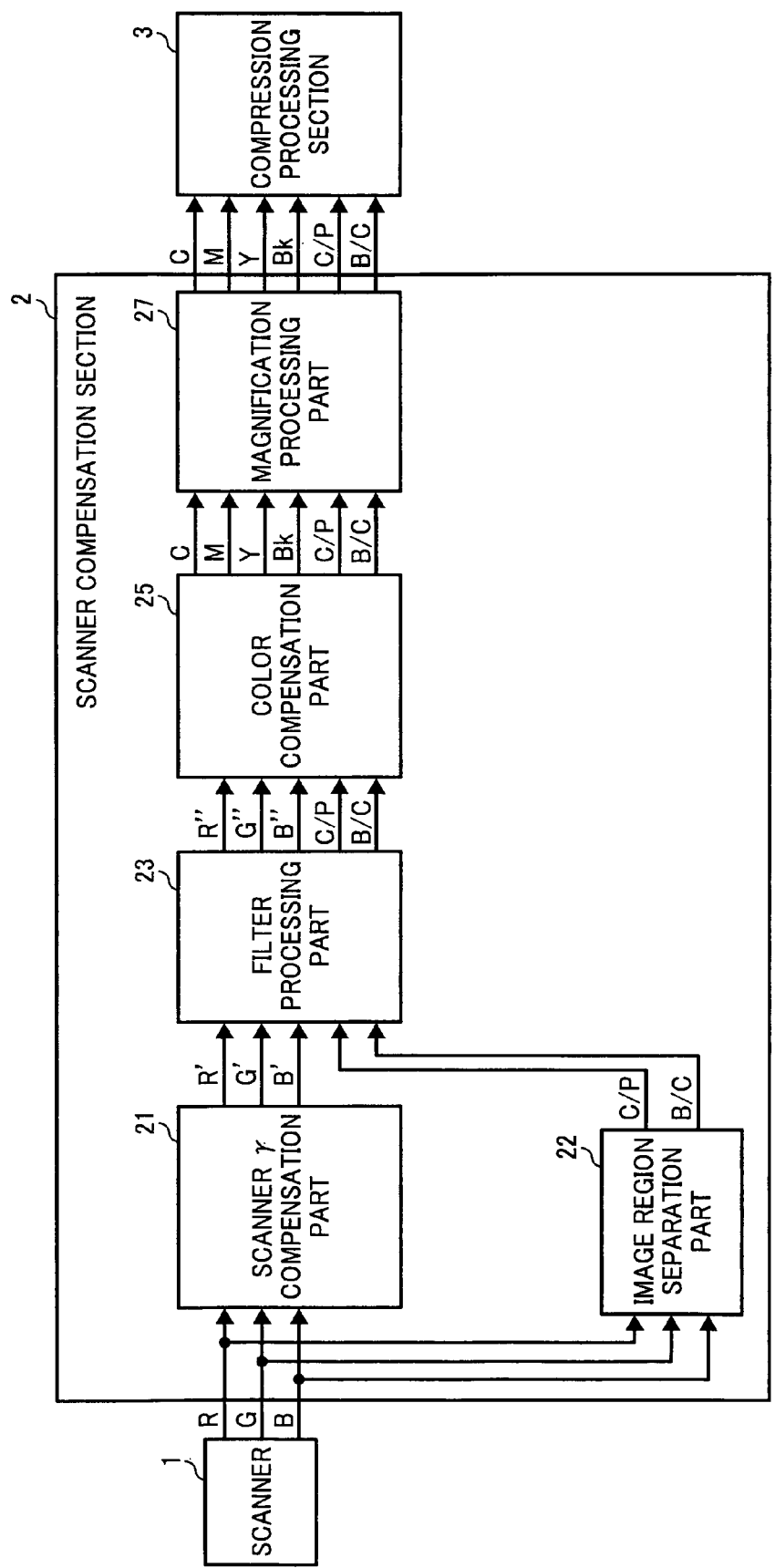
FIG. 6 is a block diagram of a scanner compensation section in the image processor illustrated in FIG. 5.

FIG. 6 is a block diagram illustrating an internal structure of the scanner compensation section 2 illustrated in FIG. 5. Referring to FIG. 6, the scanner compensation section 2 includes a scanner γ (gamma) compensation part 21, an image region separation part 22, a filter processing part 23, a color compensation part 25, and a magnification processing part 27.

The scanner γ compensation part 21 converts, on the basis of the RGB image data outputted from the scanner 1, a digital value of the RGB image data, having the characteristics of the scanner 1, into a digital value proportional to value (brightness).

The image region separation part 22 determines which one of types of images, such as characters, dot characters, designs and so forth, does each pixel (or region) of the RGB image data belongs to, and separates an image area (or an image region) of the document into regions such as the character region, the dot region, the design region and so on for example, as the image region separation.

The filter processing part 23 performs a sharpening process, a smoothing process and so on to the RGB image data, on the basis of a result of the image region separation by the image region separation part 22.

The color compensation part 25 converts the RGB image data, color-separated into RGB color spaces, into image data including color information in color spaces of cyan (C), magenta (M), yellow (Y), and black (K). It is to be noted that black (K) may be denoted also as Bk.

The magnification processing part 27 enlarges or reduces a size in a main-scanning direction of the image data, and outputs the enlarged or reduced image data.

Now, the image region separation part 22 in the scanner compensation section 2 and its related processing portions which utilize the result of the image region separation will be described hereinafter in greater detail.

Figure 7:
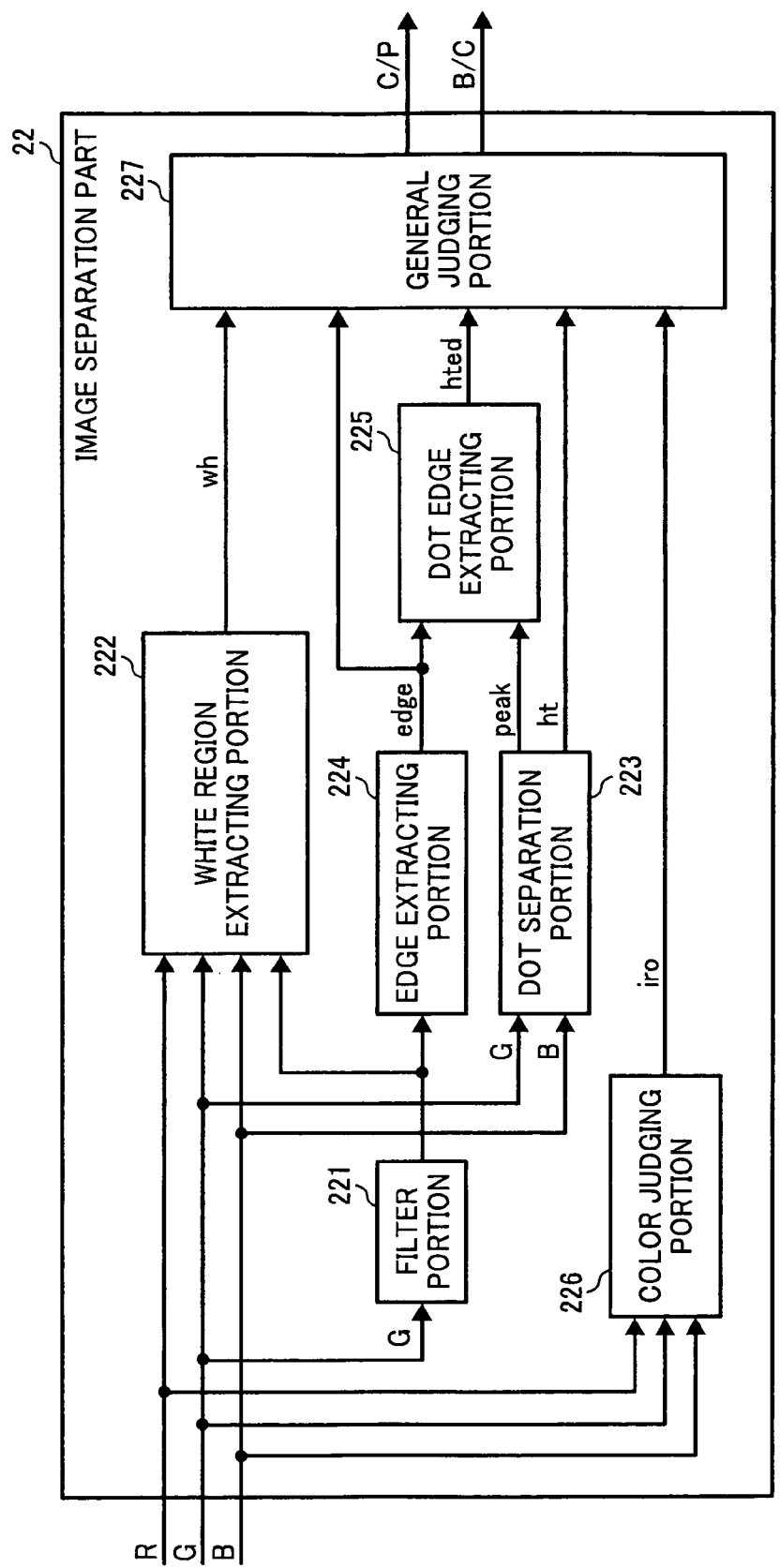
FIG. 7 is a block diagram of an image region separation part in the scanner compensation section illustrated in FIG. 6.

FIG. 7 is a block diagram illustrating an internal structure of the image region separation part 22. Referring to FIG. 7, the image region separation part 22 includes a filter portion 221, a white region extracting portion 222, a dot separation portion 223, an edge extracting portion 224, a dot edge extracting portion 225, a color judging portion 226, and a general judging portion 227. The image region separation section 22 processes the RGB image data, and generates a C/P signal representing a result (types of images) of the image region separation, and a B/C signal, and outputs the generated C/P signal and the B/C signal. More specifically, the C/P signal represents the design region, the character region, the dot character region, and the dot region and so on, whereas the B/C signal represents a chromatic region or an achromatic region.

The C/P signal and the B/C signal outputted from the image region separation part 22 are inputted to the filter processing part 23, the color compensation part 25, and the magnification processing part 27, in synchronization with the image data represented by the color spaces of RGB or CMYK inputted into each of the processing parts of the scanner compensation section 2, and are referred to as the occasion demands. In addition, the C/P signal and the B/C signal are also inputted into the printer compensation section 7 after the compression process and the expansion process are performed together with the image data, and are referred to by each processing part of the printer compensation section 7 as the occasion demands.

Now, each of the processing portions of the image region separation part 22 will be described.

The image data of G (green) is inputted into the filter portion 221. The filter portion 221 emphasizes or reinforces an edge of the G image data for extraction of edges of characters in the edge extracting portion 224, and outputs the G image data in which degradation of a MTF (Modulation Transfer Function) characteristic is compensated. This process can be implemented by a known technology, such as a process of a filter portion described in paragraphs 0069 to 0077 of Japanese Patent Publication No. 2003-46772 can be applied thereto, so it will not be described in detail. The G image data processed by the filter portion 221 is outputted to the edge extracting portion 224.

The G image data, in which the edge is emphasized or reinforced by the filter portion 221, is inputted into the edge extracting portion 224. The edge extracting portion 224 determines a character edge region on the basis of continuity of black pixels having a high level of density and white pixels having a low level of density. The edge extracting portion 224 then outputs an "edge" signal of "1" to pixels determined as belonging to the edge region, and outputs an "edge" signal of "0" to pixels determined as belonging to a non-edge region. This process can be implemented by a known technology, such as a process of an edge extracting portion described in paragraphs 0078 to 0083 of Japanese Patent Publication No. 2003-46772 can be applied thereto, so it will not be described in detail. The "edge" signal outputted by the edge extracting portion 224 is inputted into the dot edge extracting portion 225 and the general judging portion 227.

The RGB image data and the G image data, in which the edge is emphasized or reinforced by the filter portion 221, are inputted into the white region extracting portion 222. The white region extracting portion 222 determines whether or not a pixel belongs to a white region. The white region extracting portion 222 outputs a "wh" signal of "1" to pixels determined as belonging to the white region, and outputs a "wh" signal of "0" to pixels determined as not belonging to the white region. Thus, the "wh" signal representing a final result on separation of a white background includes a boundary region of a white part and a non-white part. In other words, the white region becomes larger than the actual white part on the document, due to inclusion of the boundary region. This process can be implemented by a known technology, such as a process of a white region extracting portion described in paragraphs 0084 to 0126 of Japanese Patent Publication No. 2003-46772 can be applied thereto, so it will not be described in detail. The "wh" signal outputted by the white region extracting portion 222 is inputted into the general judging portion 227.

The G image data and the image data of B (blue) are inputted into the dot separation portion 223. The dot separation portion 223 outputs a dot peak detection signal "peak" and a dot region signal "ht".

Figure 8:
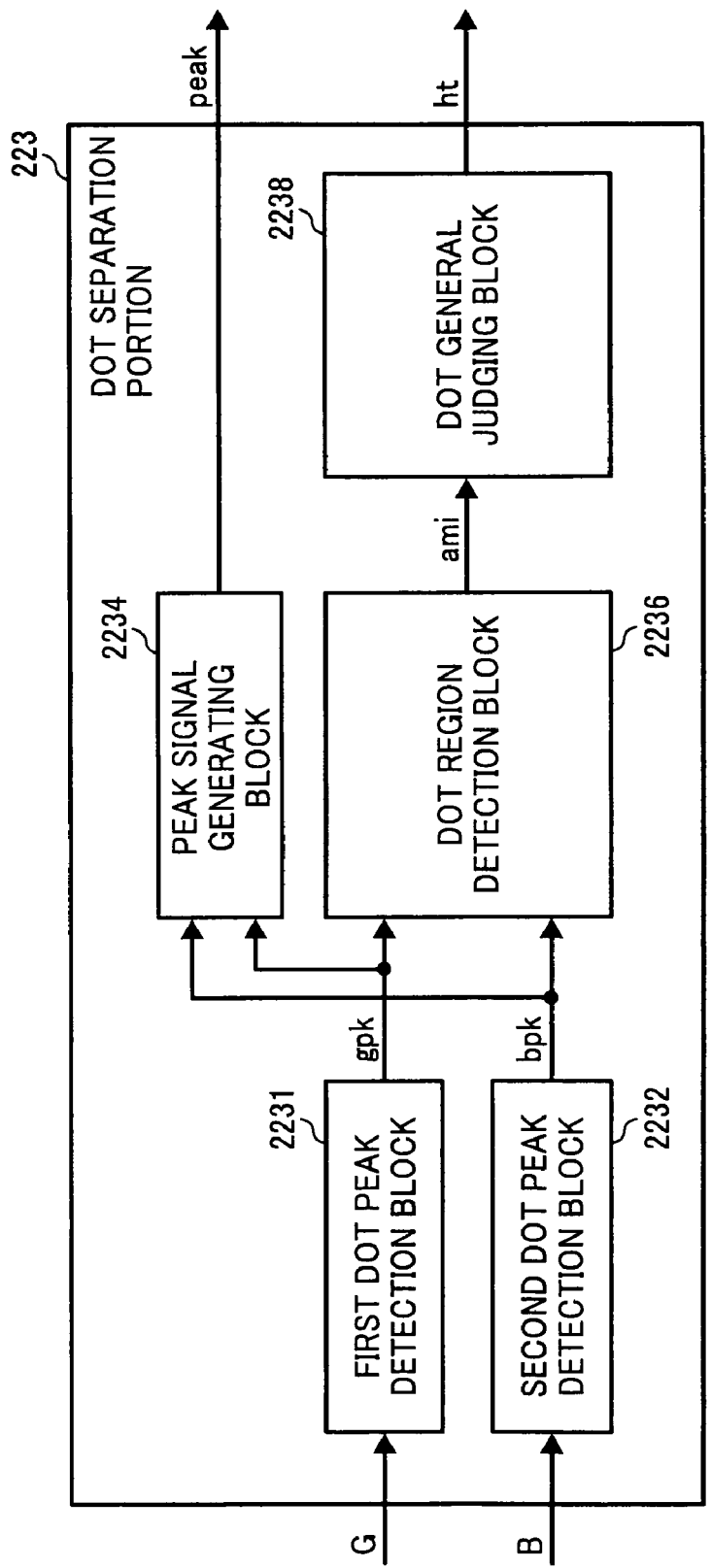
FIG. 8 is a block diagram of a dot separation portion in the image region separation part illustrated in FIG. 7.

FIG. 8 is a block diagram illustrating an internal structure of the dot separation portion 223 according to the present embodiment. Referring to FIG. 8, the dot separation portion 223 includes a first dot peak detection block 2231, a second dot peak detection block 2232, a peak signal generating block 2234, a dot region detection block 2236, and a dot general judging block 2238.

The G image data is inputted into the first dot peak detection block 2231, whereas the B image data is inputted into the second dot peak detection block 2232. The G image data is sensitive to a black density of the color image, and thus peak detection is possible without converting the G image data into a luminance signal. However, the G image data has no sensitivity to a Y (yellow) color, and thus a Y peak is omitted in the peak detection based on the G image data. On the other hand, the B image data has the sensitivity to the Y. Thus, peak detection based on the B image data compensates the omission in the peak detection based on the G image. Accordingly, it is possible to enhance precision in peak detection of a dot by utilizing both the G image data and the B image data.

The first dot peak detection block 2231 detects, by utilizing the G image data, a pixel having the largest (or least) density as a pixel forming a part of a dot (referred to as a dot peak pixel), on the basis of information on pixel density within a local region having a predetermined size in a plane or in two dimensions. When the first dot peak detection block 2231 detects a pixel in the center of a region as the dot peak pixel, the first dot peak detection block 2231 generates a dot peak detection signal gpk=1, and in other cases, the first dot peak detection block 2231 generates a dot peak detection signal gpk=0.

On the other hand, the second dot peak detection block 2232 detects, by utilizing the B image data, a pixel having the largest (or least) density as a pixel forming a part of a dot (referred to as a dot peak pixel), on the basis of information on pixel density within a local region having a predetermined size in a plane or in two dimensions. When the second dot peak detection block 2232 detects a pixel in the center of a region as the dot peak pixel, the second dot peak detection block 2232 generates a dot peak detection signal bpk=1, and in other cases, the second dot peak detection block 2232 generates a dot peak detection signal bpk=0.

More specifically, the first dot peak detection block 2231 outputs the dot peak detection signal gpk as a binary signal as a result of the detection, and the second dot peak detection block 2232 outputs the dot peak detection signal bpk as a binary signal as a result of the detection. The dot peak detection signals gpk and bpk are inputted into the peak signal generating block 2234. The peak signal generating block 2234 outputs logical sum of the dot peak detection signals gpk and bpk as a dot peak signal "peak".

The dot peak detection signal gpk outputted by the first dot peak detection block 2231 and the dot peak detection signal bpk outputted by the second dot peak detection block 2232 are inputted into the dot region detection block 2236. The dot region detection block 2236 generates a dot region detection signal "ami" as a binary signal, as a result of detection of a dot region.

The dot region detection block 2236 detects the binary dot region detection signal ami by a detection method as follows, on the basis of the inputted dot peak detection signals gpk and bpk. The dot region detection block 2236 calculates the number of the dot peak pixels establishing the dot peak detection signal gpk=1 or the dot peak detection signal bpk=1 for each small region having a predetermined size in a plane or in two dimensions, and sets a total of the number of the dot peak pixels as a count value P. The dot region detection block 2236 judges the entire pixels in the small region as the dot region when the count value P is larger than a threshold value "Pth". Alternatively, in a case in which a process is performed per pixel, the dot region detection block 2236 judges only the pixel in the center of the small region as the dot region, when the count value P is larger than the threshold value Pth. The dot region detection block 2236 outputs the dot region detection signal ami=1 to the pixel judged as the dot region by the present detection method. On the other hand, the dot region detection block 2236 outputs the dot region detection signal ami=0 to the pixel judged as not the dot region. Here, the dot peak pixels in the dot region of the actual document are detected as a lump having a certain degree of size or area. When the pixel as the dot peak detection signal gpk=1 or bpk=1 is detected in an isolated manner, it is highly likely that such a pixel is due to a character or mere noise of an image. Accordingly, a value of the threshold value Pth may be increased so as to reduce the possibility of judging the isolated pixel as gpk=1 or the isolated pixel as bpk=1 as the dot region. The thus-outputted dot region detection signal ami is inputted into the dot general judging block 2238.

The dot region detection signal ami from the dot region detection block 2236 is inputted into the dot general judging block 2238. The dot general judging block 2238 ultimately judges the dot region on the basis of the inputted dot region detection signal ami, and outputs a dot detection signal "ht" as a binary signal representing a final result of the dot separation to the general judging portion 227.

The dot general judging block 2238 counts the number of pixels establishing the dot region detection signal ami=1 within a focused small region having a predetermined size. When its total value "AmiP" is larger than a predetermined threshold value "Amith", the dot general judging block 2238 ultimately judges that the small region being focused is in the dot region or is the dot region, and outputs the dot detection signal ht=1. When the total value AmiP is less than the predetermined threshold value Amith, the dot general judging block 2238 judges that the focused small region is a non-dot region, and outputs the dot detection signal ht=0.

The "edge" signal of character outputted by the edge extracting portion 224 and the dot peak signal "peak" outputted by the dot separation portion 223 are inputted into the dot edge extracting portion 225. The dot edge extracting portion 225 outputs a dot edge signal "hted" on the basis of the "edge" signal and the dot peak signal "peak".

An image data of R (red), the G image data, and the B image data are inputted into the color judging portion 226. The color judging portion 226 performs a color judging process, in which whether a focused pixel is a chromatic pixel or an achromatic pixel is judged on the basis of the R image data, the G image data, and the B image data, and in which a binary signal of "iro"=1 when the pixel being focused is the chromatic pixel and of iro=0 when the focused pixel is the achromatic pixel is outputted. This process can be implemented by a known technology, such as a process of a color judging portion described in paragraphs 0158 to 0205 of Japanese Patent Publication No. 2003-46772 can be applied thereto, so it will not be described in detail. The "iro" signal representing a result of the judgment of chromatic or achromatic judged by the color judging portion 226 is inputted into the general judging portion 227.

Into the general judging portion 227 provided in the image region separation part 22, the "wh" signal representing the white region outputted by the white region extracting portion 222, the "ht" signal representing the result of the dot detection outputted by the dot separation portion 223, the "edge" signal outputted by the edge extracting portion 224, the "hted" signal outputted by the dot edge extracting portion 225, and the "iro" signal representing the result on the judgment of chromatic or achromatic outputted by the color judging portion 226, are inputted. The general judging portion 227 outputs, on the basis of those signals, the C/P signal representing the result (the types of images) of the image region separation as the signal representing the design region, the character region, the dot character region, and the dot region for example, and the B/C signal as the signal representing the chromatic region or the achromatic region.

The C/P signal and the B/C signal outputted by the image region separation part 22 is given to each of the filter processing part 23, the color compensation part 25, the magnification processing part 27, and the printer compensation section 7, in synchronization with the image data as described above in a cascade manner, in order to perform the processes according to the types of images of the separated regions.

The filter processing part 23 compensates the MTF of the RGB image data, and structured by a coefficient matrix corresponding to a pixel matrix of N×M, and by a logic which calculates a weighting average value by multiplying respective coefficients by the respective image data. The filter processing part 23 uses the coefficient matrix for the sharpening process to calculate the weighting average value when the C/P signal indicates 1 (for example, character region) or 2 (for example, dot character region), and performs output to the color compensation part 25. The filter processing part 23 uses the coefficient matrix for the smoothing process to calculate the weighting average value when the C/P signal indicates 0 (for example, design region) or 3 (for example, dot region), and performs output to the color compensation part 25.

The color compensation part 25 converts the R image data, the G image data, and the B image data into C data, M data, and Y data by, for example, a primary masking process, and further performs an UCR (Under Control Removal) process, by which color reproduction is improved. Additionally, in the UCR process, a common part or intersection among the C data, the M data, and the Y data are applied with a color addition/removal process to generate K data. Then, the color compensation part 25 outputs the C data, the M data, the Y data, and the K data. Here, the color compensation part 25 performs a full-black process when the C/P signal indicates 1 (for example, character region) or 2 (for example, dot character region). The color compensation part 25 removes the C data, the M data, and the Y data when the C/P signal indicates 1 or 2 and the B/C signal indicates 0 (for example, achromatic design), since the image is expressed only with the K data when pixels show achromatic characters.

The printer compensation section 7 performs γ (gamma) compensation according to a frequency characteristic of the plotter 8 to the C data, the M data, the Y data, and the K data, which are restored by expanding the compressed data accumulated in the large-capacity recorder 5 by the expansion processing section 6. The printer compensation section 7 further performs the quantization based on the dither process and the error diffusion process for example, and outputs thus-obtained C" data, M" data, Y" data, and K" data to the plotter 8, in synchronization with operation of writing data.

Thus, according to the present embodiment, the character region and the dot character region are separated by using the result of the image region separation by the image region separation part 22, and image processes suitable for each of the separated regions are applied thereto. Therefore, it is possible to improve quality of a formed image. In particular, it is possible to ensure response to the dot character region on the white part.

Hereinafter, description on utilization of the G data and the B data within the input RGB image data in the dot separation portion 223 in the image region separation part 22 will be described in detail.

Figure 9:
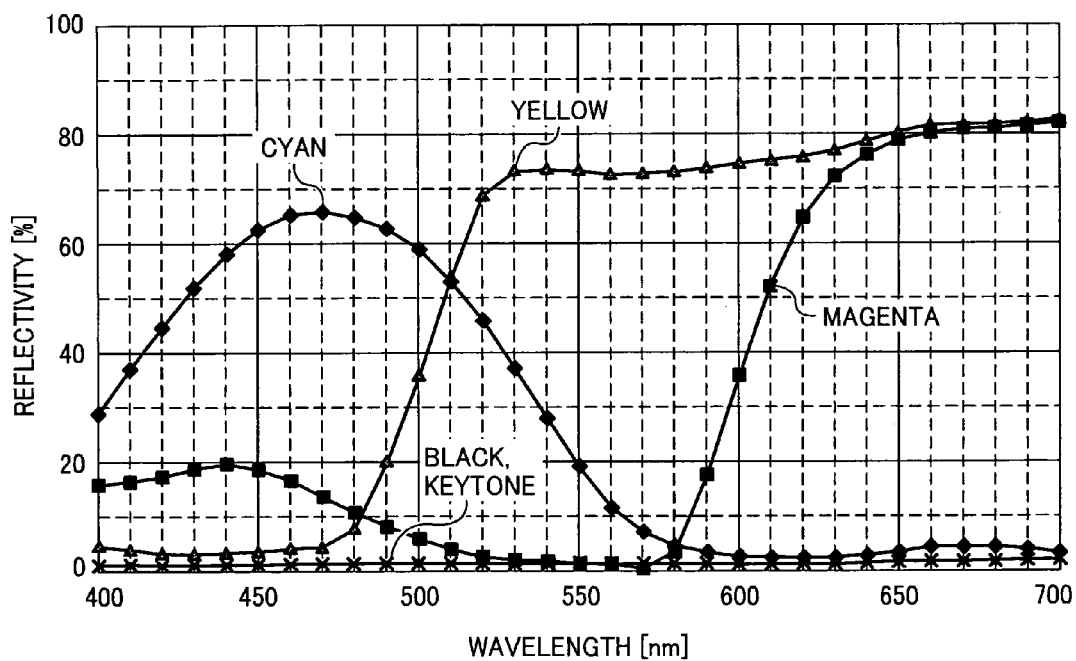
FIG. 9 is a graph illustrating spectral reflectance characteristics of ordinary inks used in printing of a document.

FIG. 9 illustrates one example of spectral reflectivity of ordinary inks used in printing of a document. Normally, when light having a wavelength range in which reflectivity of an ink is high is used, a difference in reflectivity of light due to presence or absence of the ink is small, and hence, detection of a document image is difficult. Therefore, light having a wavelength in which the difference in the reflectivity of light by the presence or absence of the ink is large is used to detect the document image.

Referring to FIG. 9, when focusing attention to a yellow ink as a complementary color of the B signal, reflectivity of light is high in the wavelength ranges corresponding to the R signal and the G signal, while the reflectivity of light is substantially zero percent in the wavelength range corresponding to the B signal. In other words, in a case in which an image printed by the yellow ink is present on a document and the document is read, for example, by the document reading section illustrated in FIG. 1, the reflectivity of light having the wavelength range corresponding to the B signal becomes extremely small. On the other hand, when there is no information printed by the yellow ink on the document, the reflectivity of light having the wavelength range corresponding to the B signal is increased. Therefore, it is possible to detect presence or absence of the image printed by the yellow ink by utilizing the B signal. Accordingly, it is necessary that good imaging performance is obtained for the wavelength range corresponding to the B signal, in order to detect the document image printed by the yellow image in a decent manner.

In addition, in a case of a magenta ink as a complementary color of G signal, the reflectivity of light is high in the wavelength range corresponding to the R signal, while the reflectivity of light is substantially 0% in the wavelength range corresponding to the G signal as the complementary color. Therefore, detection of presence or absence of an image printed by the magenta ink is possible by using the G signal as the complementary color. It is to be noted that the reflectivity of light is also low in the wavelength range corresponding to the B signal, in the case of the magenta ink. Hence, the detection of the image printed by the magenta ink is possible also by the B signal.

Furthermore, in a case of a cyan ink as a complementary color of the R signal, the reflectivity of light is high in the wavelength range corresponding to the B signal, while the reflectivity of light is substantially 0% in the wavelength range corresponding to the R signal as the complementary color. Therefore, it is possible to detect presence or absence of an image printed by the cyan ink by using the R signal as the complementary color. It is to be noted that the reflectivity of light is also low in the wavelength range corresponding to the G signal, in the case of the cyan ink. Hence, it is possible to detect the image printed by the cyan ink even by the G signal.

Therefore, although the B signal as the complementary color of the yellow ink is necessary for the detection of the yellow ink, the detection for the cyan ink as well as the detection for the magenta ink are possible by the signal other than the complementary color thereof. In a case of the black ink, since the reflectivity of light is low in the wavelength ranges corresponding to any of the signals of the R signal, the G signal, and the B signal, the detection of an image printed by the black ink is possible by any of the R signal, the G signal, and the B signal.

Here, the G signal has the highest sensitivity in terms of human luminosity factor, and thus the G signal is the essential signal for the image processes when the R signal, G signal, and the B signal are converted into a luminance signal and a color difference signal. In addition, the B signal becomes necessary for detecting the image by the yellow ink, since the image of the yellow ink is detectable only with the B signal. On the other hand, the cyan ink is detectable even by the G signal as described above. Therefore, according to the image reading apparatus of the present embodiment of the invention, the image processes on the image region separation is performed by utilizing the two signals of the B signal and the G signal. Accordingly, by suppressing the number of signals used, it is possible to reduce an amount of memory in the image processes.

As described in the foregoing, the present embodiment of the invention utilizes the B (blue) signal and the G (green) signal to execute the image processes for judging the dot region. Here, the dot document represents a printed photograph image, a thinly-daubed image and so on with a whole series or an aggregation of small points, and is used for representing smooth shading. Thus, when there is failure in the detection of the dot region, a moire is generated in an image formed on the basis of a failed result. Such a moire is extremely noticeable, and is evaluated as large degradation in image quality. In addition, since the dot is the aggregation of small points, the imaging performance of relatively high spatial frequency (normally, a region of equal to or more than half of a Nyquist frequency, for example) is required for an imaging element. On the other hand, according to the present embodiment, the R (red) signal high in frequency is not used for the detection of the dot, while the B signal and the G signal which are low in frequency are used for the dot detection. Therefore, the suppression of the imaging performance in the high spatial frequency region of an optical element is possible.

The above-described formula (1) is a conditional expression required for obtaining the image reading apparatus in which the performance of the R signal unused for the image processes is suppressed. As represented by the formula (1), it is necessary that a difference between the distance from the rear end part of the imaging element to the imaging position relative to the light having the arbitrary wavelength in the third wavelength range (the R signal) as a wavelength range unused for the image processes and the distance from the rear end part of the imaging element to the imaging position relative to the light having the arbitrary wavelength in the second wavelength range (the G signal) as a reference, be larger than a difference between the distance from the rear end part of the imaging element to the imaging position relative to the light having the arbitrary wavelength in the first wavelength range (the B signal) used for the image processes and the distance from the rear end part of the imaging element to the imaging position relative to the light having the arbitrary wavelength in the second wavelength range (the G signal) as the reference.

According to this structure, the image reading apparatus can detect the dot even when a compact, low-cost imaging lens in which the number of lenses is reduced is used as the imaging element 105 of the scanner 1 illustrated in FIG. 1. In addition, it is also possible to realize reading the image with high precision in which deterioration in the image quality such as the moire does not occur.

In addition, although it is necessary to make the imaging performance for the wavelength ranges corresponding to the G signal and the B signal fine for the imaging lens used for the image reading apparatus, it is also possible to suppress the performance for the wavelength range corresponding to the R signal unused for the imaging processes to be small. Therefore, degree of freedom in an optical design is increased significantly.

It is preferable that the imaging lens 105 used in the image reading apparatus according to the present embodiment be an imaging lens which causes reduction imaging of a document image. As the imaging lens used for the image reading apparatus, there are a reduction optical system which causes the reduction imaging of document information, and an equal-magnification imaging optical system which causes equal-magnification imaging of the document information. The fine image reading performance is obtainable even in a case in which a surface of the document is not in close-contact with the contact glass and floated from the contact glass in an example in which the reduction optical system is used, although the image reading apparatus according to the present embodiment is applicable to both of the reduction optical system and the equal-magnification imaging optical system.

Here, it is preferable that the following formulae (2) and (3) be satisfied:

$$|f1-f2|<|f3-f2| \quad (2)$$

$$0.003<|f3-f2|/f2<0.0045 \quad (3)$$

where f1 represents a focal distance in a F-line (blue, 486.13 nm) of the imaging lens 105, f2 represents a focal distance in an e-line (green, 546.07 nm) of the imaging lens 105, and f3 represents a focal distance in a C-line (red, 656.27 nm) of the imaging lens.

The conditional expressions of the imaging lens 105 for satisfying the formula (1) in the example in which the reduction optical system is used for the imaging lens 105 are the formulae (2) and (3).

The above formula (2) defines a so-called axial chromatic aberration or a so-called on-axis chromatic aberration of the imaging lens which satisfies the formula (1). The formula (2) also represents that it is necessary that an axial chromatic aberration amount (|f1−f2|) of the F-line (486.13 nm) corresponding to the B signal be smaller than an axial chromatic aberration amount (|f3−f2|) of the C-line (656.27 nm) corresponding to the R signal, wherein a wavelength of the axial chromatic aberration of the imaging lens corresponding to the R signal is the C-line (656.27 nm), a wavelength of the axial chromatic aberration of the imaging lens corresponding to the G signal is the e-line (546.07 nm), a wavelength of the axial chromatic aberration of the imaging lens corresponding to the B signal is the F-line (486.13 nm), and a reference wavelength of a lens design is the e-line (546.07 nm) corresponding to the G signal.

The above formula (3) defines the axial chromatic aberration amount of the C-line (656.27 nm). By setting the axial chromatic aberration of the C-line to be within the range of the formula (3), reduction in the number of lenses and compactification thereof are possible, and the imaging lens is obtained at reduced costs. Here, when "|f3−f2|/f2" falls below a lower limit of the formula (3), chromatic aberration of the C-line becomes a good state, although the number of lenses and an entire length of the lenses are increased. On the other hand, when "|f3−f2|/f2" exceeds an upper limit of the formula (3), the chromatic aberration of the C-line becomes too large, and the imaging performance of the R signal deteriorates significantly. Thereby, fine image processes cannot be performed, and at the same time, the quality of read image also degrades significantly.

It is preferable that the imaging lens 105 of the reduction imaging system which satisfies the formula (2) and formula (3) be structured, subsequently in an order from a side of a photographic object, by a first lens having positive power, a second lens having negative power, a third lens having positive power, and a fourth lens having negative power (structure A).

Furthermore, in addition to the structure A, it is preferable that the first lens be a lens having a meniscus configuration facing its convex surface to the photographic object side, that the second lens be a both-concaved lens (having concave sections on both sides), that the third lens be a both-convexed lens (having convex sections on both sides), that the fourth lens be a lens having a meniscus configuration facing its concave surface to the photographic object side, and that an aperture stop be provided between the second lens and the third lens (structure B).

The fine imaging performance is also obtained even when the imaging lens 105 employs a structure of the lenses according to the structure A and the structure B, i.e., a so-called telephoto type lens having a four-group and four-piece structure, as an alternative to lenses of a so-called Gauss type having a four-group and six-piece structure.

It is also preferable that each of the imaging element 105 having the structure A and the imaging element 105 having the structure B satisfy the following formulae (4) and (5) (structure C):

$$0.05<ncv-ncc<0.25 \quad (4)$$

$$25.0<vcv-vcc<36.5 \quad (5)$$

where ncv represents a total of a refractive index in a d-line (587.56 nm) of the first lens and the third lens, ncc represents a total of a refractive index in a d-line of the second lens and the fourth lens, vcv represents a total of Abbe number in the d-line of the first lens and the third lens, and vcc represents a total of Abbe number in the d-line of the second lens and the fourth lens.

The image reading apparatus according to the present embodiment of the invention does not use the R signal for the detection of the document image or the detection of the dot. Thus, the image reading apparatus is possible to cause an imaging position of the light having the frequency of the R region farther than an imaging position of the light having the frequency of the B region, relative to an imaging position of the light having the frequency of the G region as a reference. However, performance equal to or equivalent to that of an ordinary image reading apparatus is required for other imaging performance. In other words, uniform and high contrast is required from a part near an optical axis to a peripheral part in the high spatial frequency region. Therefore, it is necessary for the imaging lens to compensate a field curvature well. In particular, it is necessary to compensate the field curvature in a sagittal direction (concentric direction) in a good manner, as well as to suppress coma flare to be small, in order to uniform the contrast in the sub-scanning direction.

In addition, it is necessary to match the imaging positions of the respective colors of green and blue on the light-receiving surface in a direction of the optical axis, in order to finely read the G signal and the B signal. Also, as the imaging lens, it is necessary that the on-axis chromatic aberration of the two wavelengths of the G and the B be compensated in an extremely good manner. Furthermore, it is required that an aperture efficiency in a peripheral part of a field angle be a value near to 100%.

The conditions of the formula (4) and the formula (5) define a material used for the imaging lens 105, in order to satisfy such performance described above. The formula (4) defines a range of the refractivity of the convex lens and the concave lens structuring the imaging lens. When "ncv−ncc" exceeds an upper limit, Petzval sum becomes too small, and an image plane falls on a positive side, causing the field curvature to be large. On the other hand, when "ncv−ncc" becomes lower than a lower limit, the Petzval sum becomes too large, and the image plane falls on a negative side, causing an astigmatic difference to be large. Therefore, the fine imaging performance cannot be obtained throughout the entire picture when "ncv−ncc" is out of the range of the formula (4).

The formula (5) is a condition which finely compensates the on-axis chromatic aberration. When "vcv−vcc" exceeds an upper limit, compensation for the on-axis chromatic aberration becomes excessive, and the on-axis chromatic aberration nearer to a side of a short wavelength than the reference wavelength becomes large in the positive side. Whereas when "vcv−vcc" falls below a lower limit, the compensation for the on-axis chromatic aberration becomes insufficient, and the on-axis chromatic aberration nearer to the side of the short wavelength than a dominant wavelength becomes large in the negative side.

Therefore, conditions outside the limits of the formulae (4) and (5) cannot satisfy the performance required for the imaging lens 105.

It is preferable that each of the imaging element 105 having the structure A, the imaging element 105 having the structure B, and the imaging element 105 having the structure C satisfy the following formula (6) (structure D):

$$31.0 < fL1 \times v1/f2 < 37.0 \qquad (6)$$

where fL1 represents a focal distance relative to the reference wavelength e-line (546.07 nm) of the first lens, v1 represents Abbe number of the first lens, and f2 represents a focal distance relative to the reference wavelength e-line of the imaging lens 105.

The formula (6) is a condition for obtaining even better image processing performance and the quality in the read image, and for reducing the costs of the imaging lens, while satisfying the above conditions of the formulae (4) and (5). When "fL1×v1/f2" falls below a lower limit of the formula (6), the power of the first lens becomes too strong, and thus coma aberration is increased and at the same time, the on-axis chromatic aberration becomes too large, thereby causing the imaging position of the light having the frequency of the R region to depart excessively away from the imaging position of the light having the frequency of the G region. On the other hand, when "fL1×v1/f2" exceeds an upper limit of the formula (6), the power of the first lens becomes too weak, and hence, the entire lenses become large, causing the reduction of costs, the miniaturization and so on to be unaccomplished.

In one embodiment, the imaging lens 105 includes a glass lens. A glass material used for the glass lens does not include harmful substances such as lead, arsenic and so on (structure E). Recycling of materials is possible by structuring all of the lenses with an optical glass which is chemically stable and which does not include the harmful substances such as lead, arsenic and so on. In addition, no water pollution caused by wastewater at the time of processing is generated. Moreover, resource saving and reduction of carbon dioxide generated in the processing are possible. Therefore, it is possible to realize the small, cost-reduced imaging lens 105 in which global environment conservation is considered.

It is further preferable that all surfaces of the imaging lenses 105 having respectively the structures B, C, D, and E be structured by a spherical surface. The recent digital cameras often employ aspherical lenses, although the aspherical lenses have problems such as it takes time in a molding process, fabrication costs are increased, and a surface configuration cannot be maintained finely and so on, when an external diameter of a lens is increased. Therefore, by structuring all of the surfaces of the imaging lens 105 with the spherical surfaces, it is possible to obtain a lens having no limitation in size and in which workability, accuracy in the surface configuration and so on are good.

EXAMPLES 1-5

Hereinafter, description will be made on examples 1 to 5 of the image reading apparatus according to the present embodiment of the invention. In these examples, a structure and data of the imaging lens 105 are changed to verify its optical characteristics.

Figure 10:
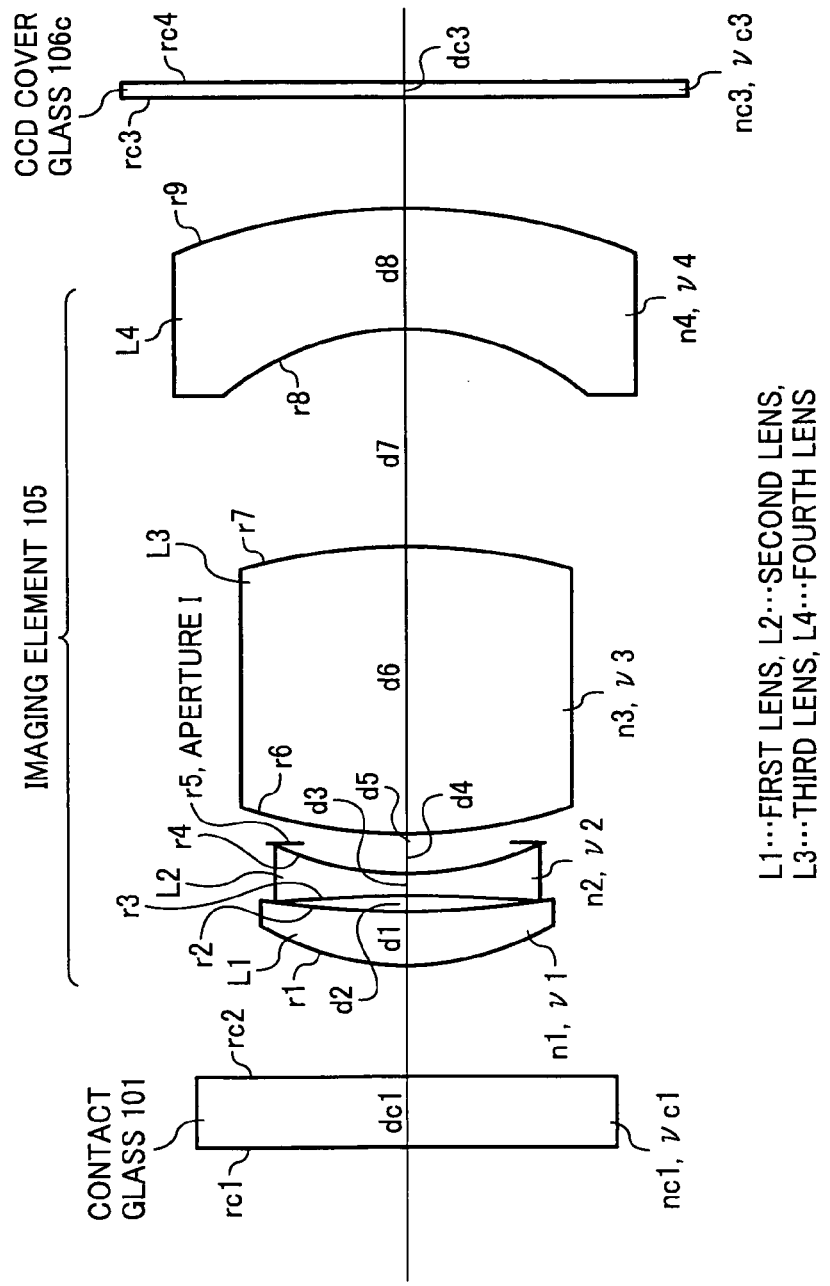
FIG. 10 schematically illustrates a structure of lenses of an imaging lens according to the first embodiment of the invention.

Referring to FIG. 10, the imaging lens 105 includes, on an optical axis and subsequently from a side of a photographic object, a first lens L1, a second lens L2, an aperture stop I, a third lens L3, and a fourth lens L4. Wherein, a curvature radius of an i-th lens surface counted from the photographic object side is "ri", a face interval on the optical axis between the i-th lens surface and an i+1th lens surface is "di", and a refractive index and Abbe number of a material of a j-th lens counted from the photographic object side are "nj" and "vj", respectively. More specifically, the refractive indexes relative to a d-line, an e-line, an F-line and a C-line are "ndj", "nej", "nFj", and "nCj", respectively. In addition, the aperture stop I provided between the second lens L2 and the third lens L3 is i=5.

As to the contact glass 101 and a CCD cover glass 106c of the line sensor unit 106, a curvature radius of an i-th glass plate face counted from the photographic object side is "rci", a face interval on the optical axis between the i-th glass plate face and an i+1 th glass plate face is "dci", a refractive index and Abbe number of a material of a glass plate of the contact glass 101 are "nc1" and "vc1", respectively (more specifically, the refractive indexes relative to the d-line, the e-line, the F-line and the C-line are "ndc1", "nec1", "nFc1", and "nCc1", respectively), and a refractive index and Abbe number of a material of a glass plate of the CCD cover glass 106c are "nc3" and "vc3", respectively (more specifically, the refractive indexes relative to the d-line, the e-line, the F-line and the C-line are "ndc3", "nec3", "nFc3", and "nCc3", respectively).

The meanings of reference signs in each of the examples are as follows.

f: Combined focal distance of the entire optical system relative to the e-line
FNo: F-number
m: Magnification
Ω: Half-field angle (degree)
Y: Object height
ri (i=1-9): Curvature radius of the i-th lens surface counted from the photographic object side
di (i=1-8): Face interval of the i-th lens surface counted from the photographic object side
nj (j=1-4): Refractive index of the material of the j-th lens counted from the photographic object side
vj (=1-4): Abbe number of the material of the j-th lens counted from the photographic object side
rc1: Curvature radius on the photographic object side of the contact glass 101
rc2: Curvature radius on an image side of the contact glass 101
rc3: Curvature radius on the photographic object side of the CCD cover glass 106c
rc4: Curvature radius on the image side of the CCD cover glass 106c
dc1: Thickness of the contact glass 101
dc3: Thickness of the CCD cover glass 106c
nc1: Refractive index of the contact glass 101
nc3: Refractive index of the CCD cover glass 106c vc1: Abbe number of the contact glass 101
vc3: Abbe number of the CCD cover glass 106c
nd: Refractive index of the d-line (587.56 nm)
ne: Refractive index of the e-line (546.07 nm n)
nF: Refractive index of the F-line (486.13 nm)
nC: Refractive index of the C-line (656.27 nm)

Figure 11:
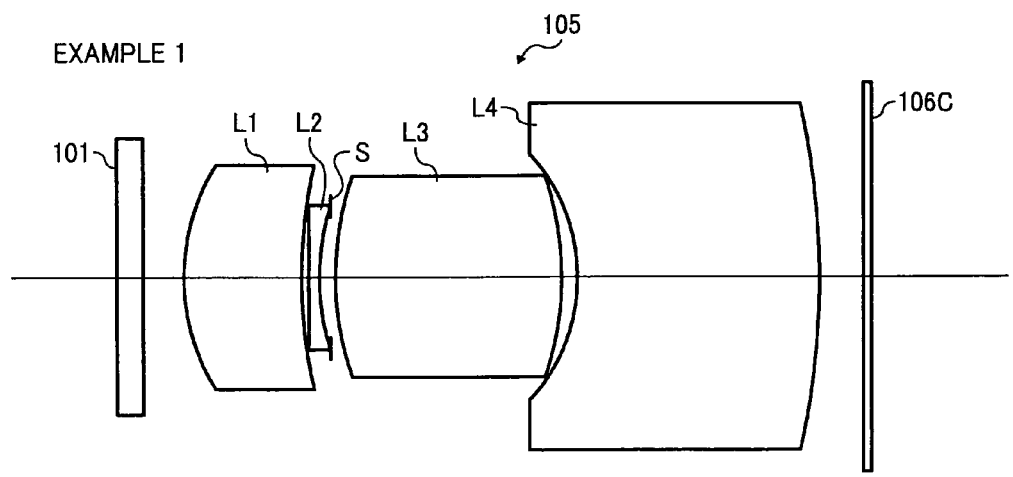
FIG. 11 illustrates a schematic configuration and an arrangement relationship of an imaging lens according to example 1.
Figure 12:
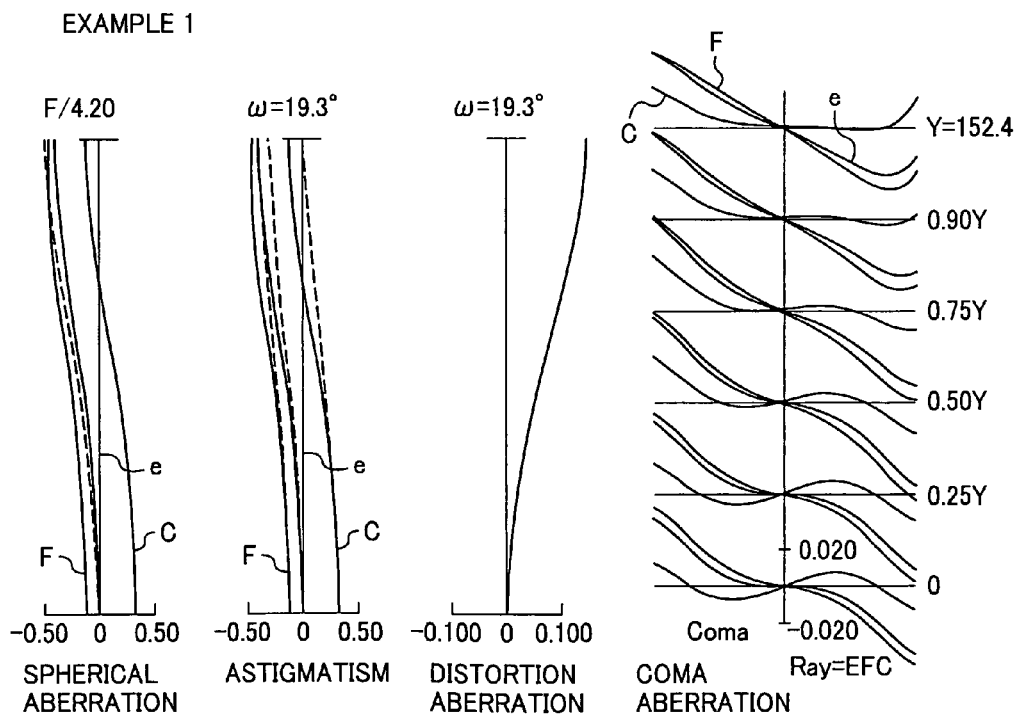
FIG. 12 illustrates aberration curves of the imaging lens according to the example 1.
Figure 13:
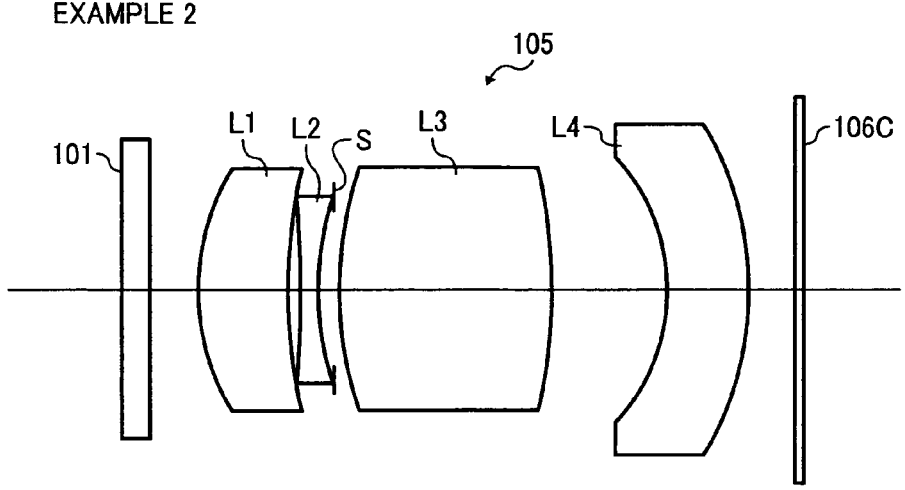
FIG. 13 illustrates a schematic configuration and an arrangement relationship of an imaging lens according to example 2.
Figure 14:
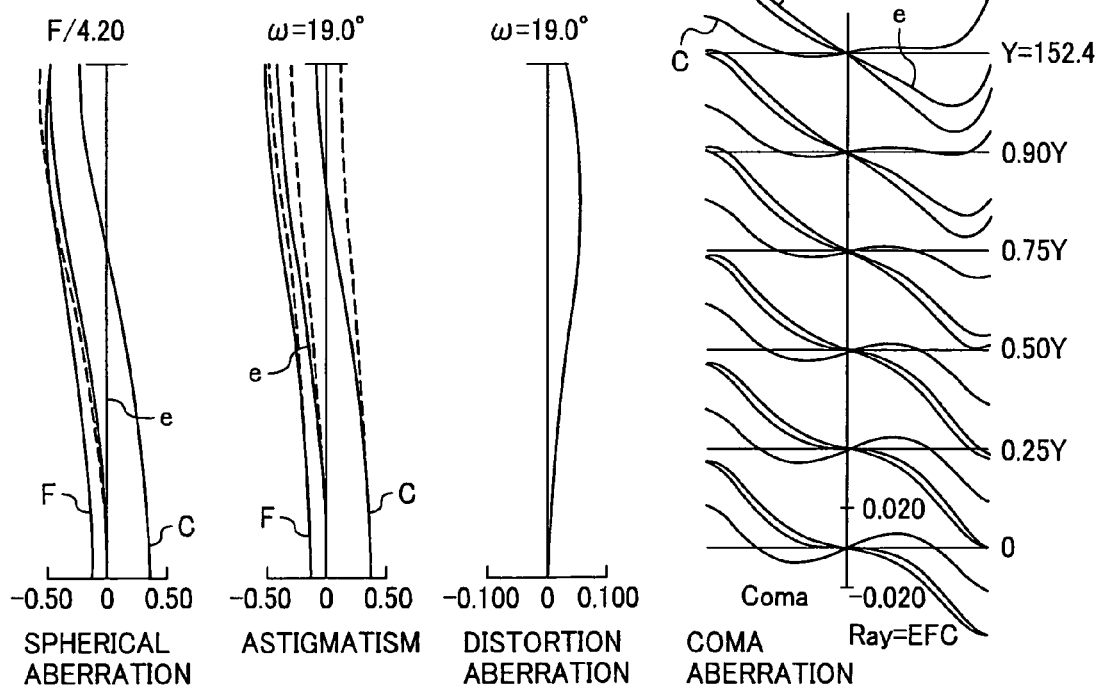
FIG. 14 illustrates aberration curves of the imaging lens according to the example 2.
Figure 15:
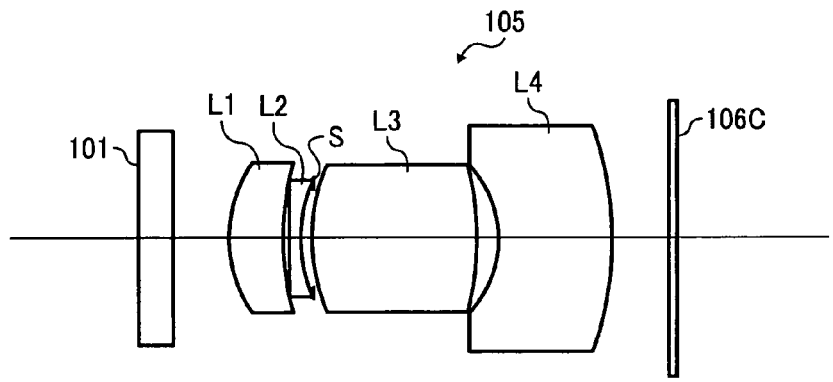
FIG. 15 illustrates a schematic configuration and an arrangement relationship of an imaging lens according to example 3.
Figure 16:
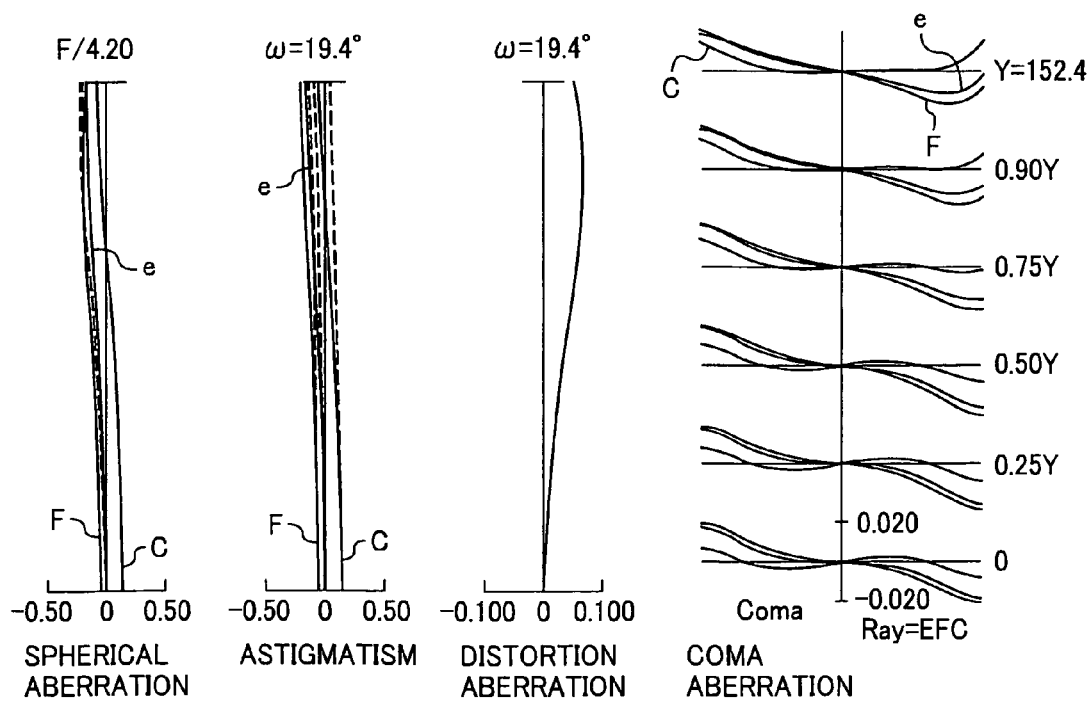
FIG. 16 illustrates aberration curves of the imaging lens according to the example 3.
Figure 17:
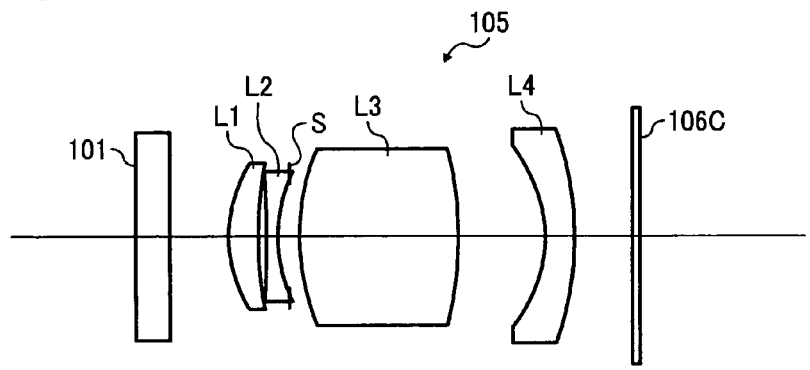
FIG. 17 illustrates a schematic configuration and an arrangement relationship of an imaging lens according to example 4.
Figure 18:
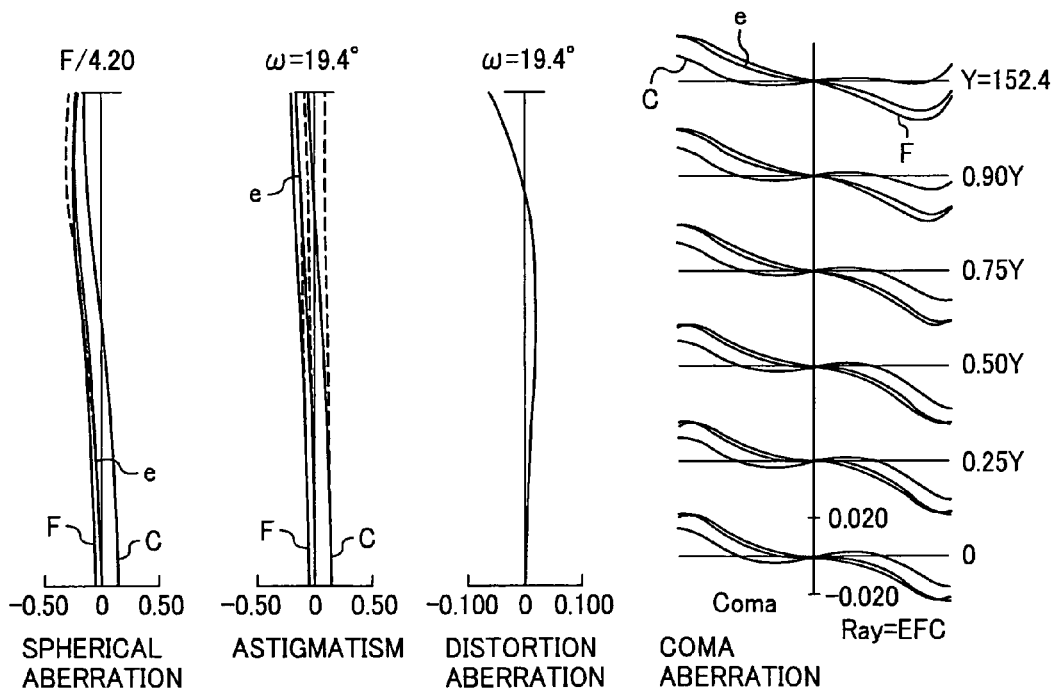
FIG. 18 illustrates aberration curves of the imaging lens according to the example 4.
Figure 19:
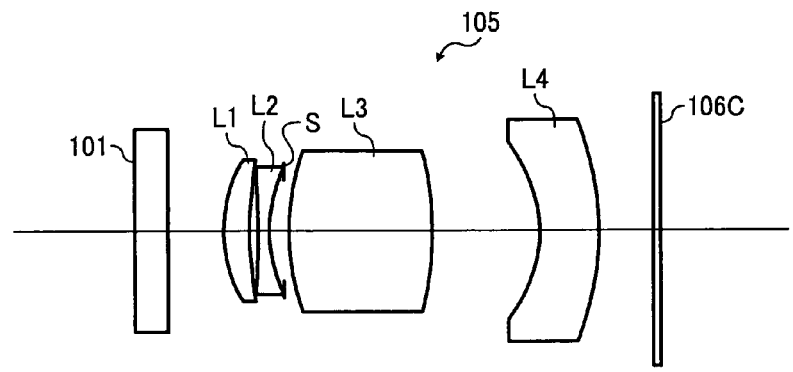
FIG. 19 illustrates a schematic configuration and an arrangement relationship of an imaging lens according to example 5.
Figure 20:
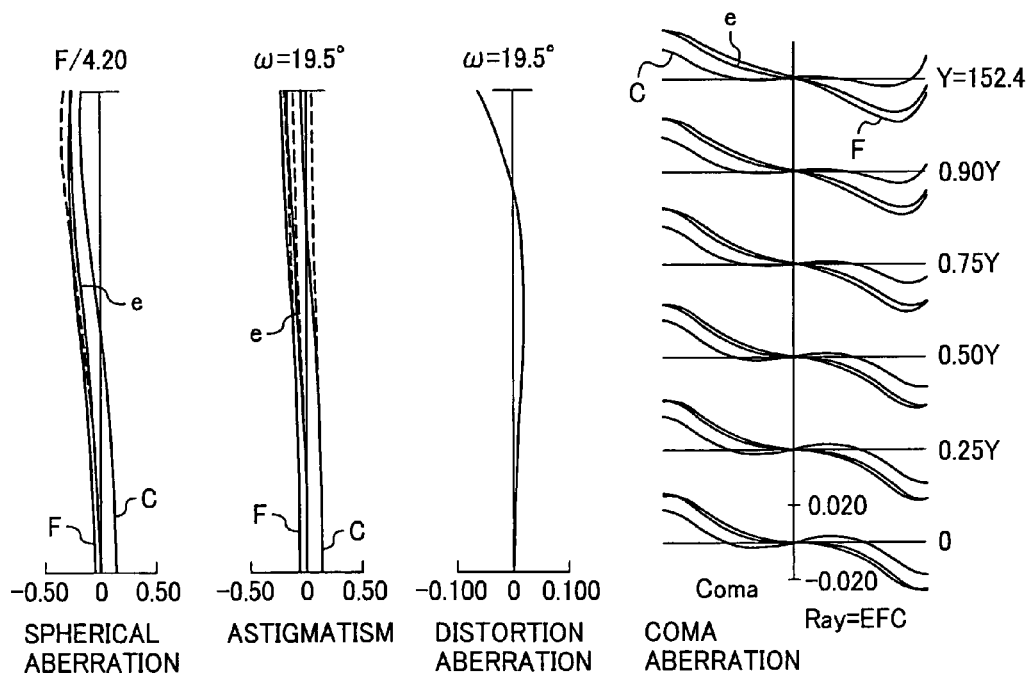
FIG. 20 illustrates aberration curves of the imaging lens according to the example 5.

The structures of the imaging lenses 105 including a schematic configuration and an arrangement relationship are illustrated respectively in FIG. 11 (example 1), FIG. 13 (example 2), FIG. 15 (example 3), FIG. 17 (example 4), and FIG. 19 (example 5). Tables 1 to 5 respectively illustrate the data of the imaging lenses 105 according to the examples 1 to 5 and names of materials of glass used. In addition, graphs representing aberrations of the imaging lenses 105 according to the examples 1 to 5 are illustrated respectively in FIG. 12 (example 1), FIG. 14 (example 2), FIG. 16 (example 3), FIG. 18 (example 4), and FIG. 20 (example 5). In each of the graphs, e, F, and C represent curves for the e-line (546.07 nm), the F-line (486.13 nm), and the C-line (656.27 nm), respectively. In the graphs illustrating a spherical aberration, a dotted line represents a curve for a sine condition. In the graphs illustrating astigmatism, a solid line represents a curve for a sagittal ray and a dotted line represents a curve for a meridional ray.

TABLE 1

(example 1)
$f = 83.080, F = 4.2, m = 0.23622, Y = 152.4, \omega = 19.3°$

| i/j | r | d | nd | vd | ne | nF | nc | Material Name (Manufacturer) |
|---|---|---|---|---|---|---|---|---|
| c1 | 0.0 | 3.2 | 1.51633 | 64.14 | 1.51825 | 1.52191 | 1.51386 | S-BSL7 (OHARA) |
| c2 | 0.0 | | | | | | | |
| 1 | 26.721 | 14.394 | 1.71300 | 53.87 | 1.71615 | 1.72221 | 1.70897 | S-LAL8 (OHARA) |
| 2 | 64.521 | 0.823 | | | | | | |
| 3 | −303.293 | 1.200 | 1.67270 | 32.1 | 1.67765 | 1.68756 | 1.66661 | S-TIM25 (OHARA) |
| 4 | 29.132 | 1.200 | | | | | | |
| 5 | 0.0 (aperture) | 0.748 | | | | | | |
| 6 | 38.301 | 27.319 | 1.83400 | 37.16 | 1.83932 | 1.84982 | 1.82738 | S-LAH60 (OHARA) |
| 7 | −43.571 | 2.380 | | | | | | |
| 8 | −22.067 | 29.518 | 1.76182 | 26.52 | 1.76859 | 1.7823 | 1.75357 | S-TIH14 (OHARA) |
| 9 | −92.777 | | | | | | | |
| c3 | 0.0 | 1.0 | 1.51633 | 64.14 | 1.51825 | 1.52191 | 1.51386 | S-BSL7 (OHARA) |
| c4 | 0.0 | | | | | | | |

TABLE 2

(example 2)
$f = 84.508, F = 4.2, m = 0.23622, Y = 152.4, \omega = 19.0°$

| i/j | r | d | nd | vd | ne | nF | nc | Material Name (Manufacturer) |
|---|---|---|---|---|---|---|---|---|
| c1 | 0.0 | 3.2 | 1.51633 | 64.14 | 1.51825 | 1.52191 | 1.51386 | S-BSL7 (OHARA) |
| c2 | 0.0 | | | | | | | |
| 1 | 25.662 | 9.620 | 1.69680 | 55.53 | 1.69979 | 1.70552 | 1.69297 | S-LAL14 (OHARA) |
| 2 | 66.18 | 1.260 | | | | | | |
| 3 | −111.502 | 1.804 | 1.71736 | 29.52 | 1.7231 | 1.73463 | 1.71033 | S-TIH1 (OHARA) |
| 4 | 30.832 | 1.362 | | | | | | |
| 5 | 0.0 (aperture) | 0.830 | | | | | | |
| 6 | 43.489 | 22.500 | 1.83400 | 37.16 | 1.83932 | 1.84982 | 1.82738 | S-LAH60 (OHARA) |
| 7 | −63.928 | 12.547 | | | | | | |
| 8 | −20.227 | 8.376 | 1.74077 | 27.79 | 1.74705 | 1.75975 | 1.73309 | S-TIH13 (OHARA) |
| 9 | −34.475 | | | | | | | |
| c3 | 0.0 | 1.0 | 1.51633 | 64.14 | 1.51825 | 1.52191 | 1.51386 | S-BSL7 (OHARA) |
| c4 | 0.0 | | | | | | | |

TABLE 3

(example 3)
$f = 43.191, F = 4.2, m = 0.11102, Y = 152.4, \omega = 19.4°$

| i/j | r | d | nd | vd | ne | nF | nc | Material Name (Manfacturer) |
|---|---|---|---|---|---|---|---|---|
| c1 | 0.0 | 3.2 | 1.51633 | 64.14 | 1.51825 | 1.52191 | 1.51386 | S-BSL7 (OHARA) |
| c2 | 0.0 | | | | | | | |
| 1 | 12.668 | 4.840 | 1.71300 | 53.87 | 1.71615 | 1.72221 | 1.70897 | S-LAL8 (OHARA) |
| 2 | 29.093 | 0.571 | | | | | | |
| 3 | −313.322 | 1.000 | 1.64769 | 33.79 | 1.65222 | 1.66126 | 1.6421 | S-TIM22 (OHARA) |

TABLE 3-continued (example 3)
f = 43.191, F = 4.2, m = 0.11102, Y = 152.4, ω = 19.4°

| i/j | r | d | nd | vd | ne | nF | nc | Material Name (Manfacturer) |
|---|---|---|---|---|---|---|---|---|
| 4 | 13.106 | 0.850 | | | | | | |
| 5 | 0.0 | 0.100 | | | | | | |
| 6 | 16.868 | 15.000 | 1.74400 | 44.79 | 1.74795 | 1.75566 | 1.73905 | S-LAM2 (OHARA) |
| 7 | −27.449 | 2.021 | | | | | | |
| 8 | −10.384 | 10.218 | 1.66680 | 33.05 | 1.67157 | 1.6811 | 1.66092 | S-TIM39 (OHARA) |
| 9 | −31.494 | | | | | | | |
| c3 | 0.0 | 0.7 | 1.51633 | 64.14 | 1.51825 | 1.52191 | 1.51386 | S-BSL7 (OHARA) |
| c4 | 0.0 | | | | | | | |

TABLE 4

(example 4)
f = 43.062, F = 4.2, m = 0.11102, Y = 152.4, ω = 19.4°

| i/j | r | d | nd | vd | ne | nF | nc | Material Name (Manufacturer) |
|---|---|---|---|---|---|---|---|---|
| c1 | 0.0 | 3.2 | 1.51633 | 64.14 | 1.51825 | 1.52191 | 1.51386 | S-BSL7 (OHARA) |
| c2 | 0.0 | | | | | | | |
| 1 | 12.475 | 2.532 | 1.71300 | 53.87 | 1.71615 | 1.72221 | 1.70897 | S-LAL8 (OHARA) |
| 2 | 35.826 | 0.692 | | | | | | |
| 3 | −78.931 | 1.000 | 1.66680 | 33.05 | 1.67157 | 1.6811 | 1.66092 | S-TIM39 (OHARA) |
| 4 | 13.481 | 0.963 | | | | | | |
| 5 | 0.0 | 0.956 | | | | | | |
| 6 | 22.788 | 13.962 | 1.74400 | 44.79 | 1.74795 | 1.75566 | 1.73905 | S-LAM2 (OHARA) |
| 7 | −27.877 | 7.568 | | | | | | |
| 8 | −12.141 | 2.428 | 1.60342 | 38.03 | 1.60718 | 1.61462 | 1.59875 | S-TIM5 (OHARA) |
| 9 | −30.472 | | | | | | | |
| c3 | 0.0 | 1.0 | 1.51633 | 64.14 | 1.51825 | 1.52191 | 1.51386 | S-BSL7 (OHARA) |
| c4 | 0.0 | | | | | | | |

TABLE 5

(example 5)
f = 43.106, F = 4.2, m = 0.11102, Y = 152.4, ω = 19.5°

| i/j | r | d | nd | vd | ne | nF | nc | Material Name (Manufacturer) |
|---|---|---|---|---|---|---|---|---|
| c1 | 0.0 | 3.2 | 1.51633 | 64.14 | 1.51825 | 1.52191 | 1.51386 | S-BSL7 (OHARA) |
| c2 | 0.0 | | | | | | | |
| 1 | 12.819 | 2.461 | 1.69680 | 55.53 | 1.69979 | 1.70552 | 1.69297 | S-LAL14 (OHARA) |
| 2 | 38.818 | 0.725 | | | | | | |
| 3 | −72.576 | 1.000 | 1.64769 | 33.79 | 1.65222 | 1.66126 | 1.6421 | S-TIM22 (OHARA) |
| 4 | 13.41 | 1.369 | | | | | | |
| 5 | 0.0 | 0.441 | | | | | | |
| 6 | 22.428 | 13.000 | 1.74400 | 44.79 | 1.74795 | 1.75566 | 1.73905 | S-LAM2 (OHARA) |
| 7 | −30.031 | 9.893 | | | | | | |
| 8 | −12.367 | 5.420 | 1.66680 | 33.05 | 1.67157 | 1.6811 | 1.66092 | S-TIM39 (OHARA) |
| 9 | −27.394 | | | | | | | |
| c3 | 0.0 | 0.7 | 1.51633 | 64.14 | 1.51825 | 1.52191 | 1.51386 | S-BSL7 (OHARA) |
| c4 | 0.0 | | | | | | | |

Comparative Example

Figure 21:
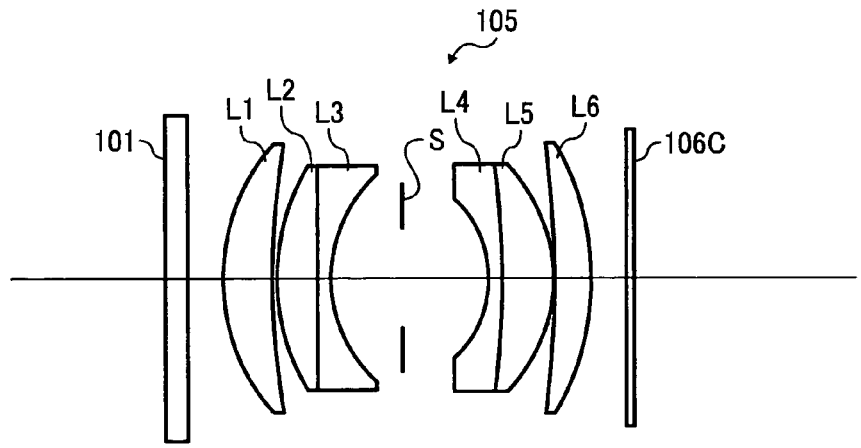
FIG. 21 illustrates a schematic configuration and an arrangement relationship of an imaging lens according to a comparative example.
Figure 22:
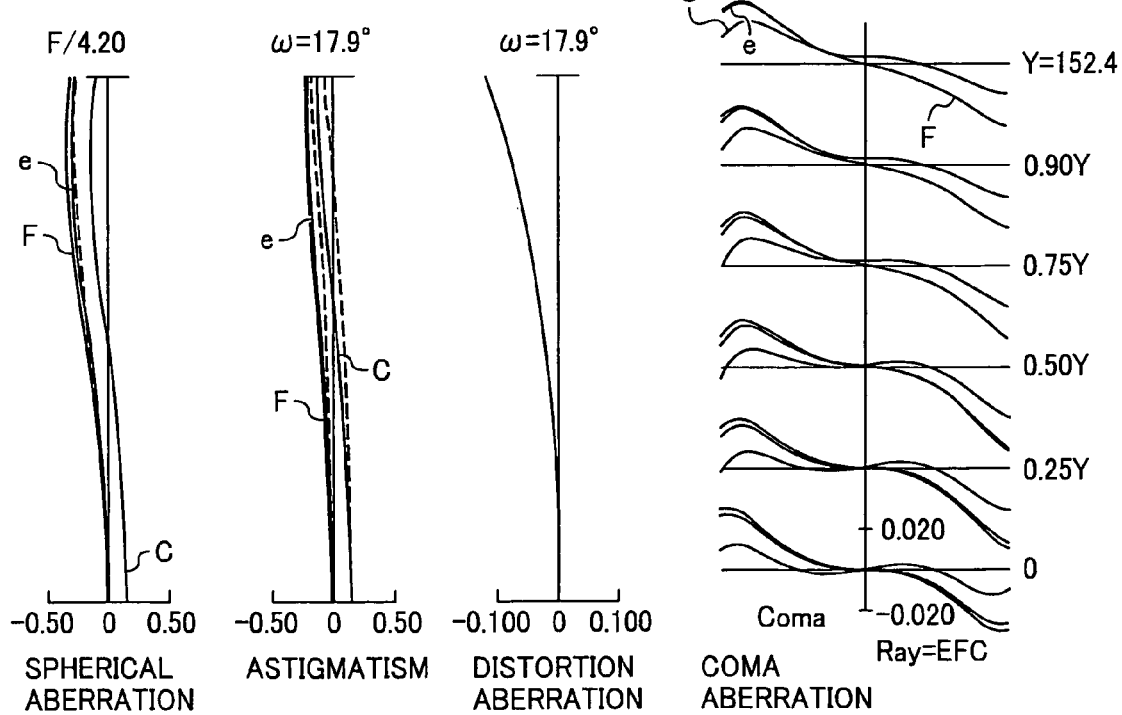
FIG. 22 illustrates aberration curves of the imaging lens according to the comparative example.

For comparison, a comparative example of a Gauss type having a four-group and six-piece structure is studied. FIG. 21 illustrates a structure including a schematic configuration and an arrangement relationship of an imaging lens according to the comparative example. Table 6 illustrates data of the imaging lens according to the comparative example and a name of a material of a glass used. The reference signs are the same as those of the examples 1 to 5, although only the surface number is increased in accordance with increase in the number of lenses. FIG. 22 illustrates aberrations of the imaging lens according to the comparative example, in which the reference signs are the same as those of FIG. 12.

TABLE 6

(comparative example)
f = 90.274, F = 4.2, m = 0.23622, Y = 152.4, ω = 17.9°

| i/j | r | d | nd | vd | ne | nF | nc | Material Name (Manufacturer) |
|---|---|---|---|---|---|---|---|---|
| c1 | 0.0 | 3.2 | 1.51680 | 64.20 | 1.51872 | 1.52237 | 1.51432 | BK7 (HOYA) |
| c2 | 0.0 | | | | | | | |
| 1 | 29.468 | 6.910 | 1.61272 | 58.58 | 1.61521 | 1.62000 | 1.60954 | BACD4 (HOYA) |
| 2 | 113.824 | 0.520 | | | | | | |
| 3 | 31.071 | 5.860 | 1.48749 | 70.44 | 1.48914 | 1.49227 | 1.48535 | FC5 (HOYA) |
| 4 | −5298.5 | 1.880 | 1.61310 | 44.36 | 1.61639 | 1.62277 | 1.60895 | EADF10 (HOYA) |
| 5 | 20.593 | 10.090 | | | | | | |
| 6 | 0.0 (aperture) | 12.280 | | | | | | |
| 7 | −15.659 | 1.900 | 1.65412 | 39.68 | 1.65803 | 1.66571 | 1.64923 | SNBH5 (HOYA) |
| 8 | −137.015 | 7.320 | 1.61800 | 63.39 | 1.62032 | 1.62478 | 1.61503 | PCD4 (HOYA) |
| 9 | −23.349 | 0.100 | | | | | | |
| 10 | −153.438 | 5.170 | 1.73400 | 51.47 | 1.73739 | 1.74394 | 1.72968 | SLAL59 (HOYA) |
| 11 | −38.689 | | | | | | | |
| c3 | 0.0 | 1.0 | 1.51680 | 64.20 | 1.51872 | 1.52237 | 1.51432 | BK7(HOYA) |
| c4 | 0.0 | | | | | | | |

Table 7 represents, in each of the examples 1 to 5 and the comparative example, the distance Bf1 from the rear end part of the imaging element to the imaging position of the F-line, the distance Bf2 from the rear end part of the imaging element to the imaging position of the e-line, the distance Bf3 from the rear end part of the imaging element to the imaging position of the C-line, the focal distance f1 in the F-line, the focal distance f2 in the e-line, and the focal distance f3 in the C-line. Table 8 represents values according to the formulae (1), (2), and (3) calculated by using the values in the table 7.

TABLE 7

<Values of Parameters used in the Formulae (1) to (3)>

| | Example 1 | Example 2 | Example 3 | Example 4 | Example 5 | Comparative Example | Remarks |
|---|---|---|---|---|---|---|---|
| Bf1 | 44.710 | 58.360 | 20.609 | 24.128 | 20.560 | 82.413 | A |
| Bf2 | 44.831 | 58.485 | 20.663 | 24.183 | 20.613 | 82.435 | B |
| Bf3 | 45.157 | 58.840 | 20.797 | 24.327 | 20.756 | 82.577 | C |
| f1 | 82.935 | 84.391 | 43.128 | 42.998 | 43.043 | 90.283 | D |
| f2 | 83.080 | 84.508 | 43.191 | 43.062 | 43.106 | 90.274 | E |
| f3 | 83.386 | 84.793 | 43.332 | 43.212 | 43.255 | 90.335 | F |

In the Table 7:
Remark A: The distance from the rear end part of the imaging element to the imaging position of the F-line
Remark B: The distance from the rear end part of the imaging element to the imaging position of the e-line
Remark C: The distance Bf3 from the rear end part of the imaging element to the imaging position of the C-line
Remark D: The focal distance in the F-line
Remark E: The focal distance in the e-line
Remark F: The focal distance in the C-line

TABLE 8

<Values of Formulae (1) to (3)>

| | Example 1 | Example 2 | Example 3 | Example 4 | Example 5 | Comparative Example | Remarks |
|---|---|---|---|---|---|---|---|
| \|Bf1 − Bf2\| | −0.120 | −0.126 | −0.054 | −0.055 | −0.053 | −0.023 | A |
| \|Bf3 − Bf2\| | 0.327 | 0.355 | 0.134 | 0.144 | 0.142 | 0.142 | |
| \|f1 − f2\| | −0.145 | −0.117 | −0.063 | −0.064 | −0.062 | 0.010 | B |
| \|f3 − f2\| | 0.306 | 0.285 | 0.141 | 0.151 | 0.150 | 0.061 | |
| \|f3 − f2\|/f2 | 0.0037 | 0.0034 | 0.0033 | 0.0035 | 0.0035 | 0.0007 | C |

In the Table 8:
Remark A: Corresponding to the formula (1)
Remark B: Corresponding to the formula (2)
Remark C: Corresponding to the formula (3)

Table 9 represents values according to the formulae (4), (5), and (6), in each of the examples 1 to 5 and the comparative example.

TABLE 9

<Values of Parameters used in the Formulae (4) to (6) and Values of the Formulae (4) to (6)>

| | | | | | | |
|---|---|---|---|---|---|---|
| n1 | 1.71300 | 1.69680 | 1.71300 | 1.71300 | 1.69680 | |
| n2 | 1.67270 | 1.71736 | 1.64769 | 1.66680 | 1.64769 | |
| n3 | 1.83400 | 1.83400 | 1.74400 | 1.74400 | 1.74400 | |
| n4 | 1.76182 | 1.74077 | 1.66680 | 1.60342 | 1.66680 | |
| ν1 | 53.87 | 55.53 | 53.87 | 53.87 | 55.53 | |
| ν2 | 32.10 | 29.52 | 33.79 | 33.05 | 33.79 | |
| ν3 | 37.16 | 37.16 | 44.79 | 44.79 | 44.79 | |
| ν4 | 26.52 | 27.79 | 33.05 | 38.03 | 33.05 | |
| ncv − ncc | 0.1125 | 0.0727 | 0.1425 | 0.1868 | 0.1263 | formula (4) |
| νcv − νcc | 32.41 | 35.38 | 31.82 | 27.58 | 33.48 | formula (5) |
| fL1 × ν1/f2 | 35.634 | 35.853 | 34.800 | 31.986 | 33.912 | formula (6) |

In the Table 9:
n1: Refractive index of the d-line (587.56 nm) of the first lens (positive lens)
n2: Refractive index of the d-line (587.56 nm) of the second lens (negative lens)
n3: Refractive index of the d-line (587.56 nm) of the third lens (positive lens)
n4: Refractive index of the d-line (587.56 nm) of the fourth lens (negative lens)
ν1: Abbe number of the first lens (positive lens)
ν2: Abbe number of the second lens (negative lens)
ν3: Abbe number of the third lens (positive lens)
ν4: Abbe number of the fourth lens (negative lens)

As is clear from the above-described examples, in the first embodiment of the invention in comparison to the comparative example, the chromatic aberration on the axis of the C-line (656.27 nm) corresponding to the R (red) signal is increased. As a result, in the present embodiment, the difference between the distance Bf3 from the rear end part of the imaging element to the imaging position of the C-line and the distance Bf2 from the rear end part of the imaging element to the imaging position of the e-line is larger than that of the comparative example in an actually-used state. However, since the R (red) signal is unused in the present embodiment of the invention for the detection of the dot in the image region separation processes, there is no influence on the performance for the image region separation.

With respect to other aberrations in accordance with the present embodiment, the distortion aberration is suppressed to be small to an extent of ±0.1% while a field angle, in which a half-field angle exceeds 19 degrees, is maintained. In addition, the field curvature and, in particular, the sagittal field curvature, are extremely small. Moreover, as to the coma aberration, a flare component is compensated finely in spite of a large diameter of F4.2, and thus the performance therefor equivalent to the comparative example is maintained. Hence, according to the present embodiment, the imaging lens has the good performance throughout the entire range from the part near the optical axis to the peripheral part of the imaging lens. Also, the chromatic aberration relative to the magnification is suppressed and thus is less than that of the comparative example in spite of the large on-axis chromatic aberration. Therefore, a pixel deviation for each color in a final image hardly occurs.

Second Embodiment

Hereinafter, a second embodiment of the invention will be described with reference to FIGS. 23 to 44. In the present second embodiment, elements which are the same or similar to those already described in the first embodiment may be attached with the same reference numerals.

Figure 23:
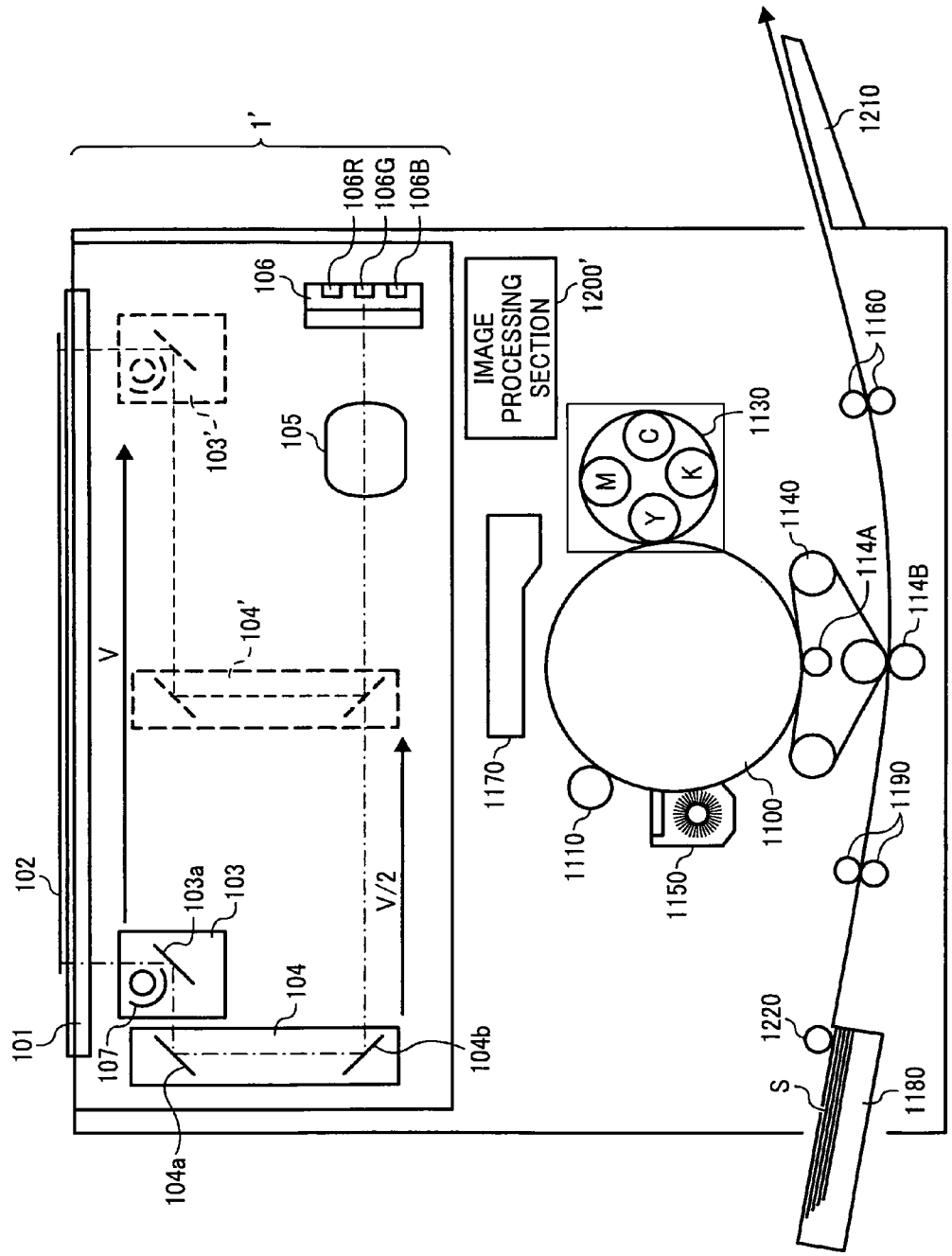
FIG. 23 schematically illustrates a structure of an image forming apparatus according to a second embodiment of the invention.

FIG. 23 schematically illustrates a structure of a digital full-color copying machine as an image forming apparatus according to the second embodiment of the invention. The image forming apparatus includes an image reading apparatus according to the present embodiment, and an image forming section. The image reading apparatus includes a scanner 1' as a document reading section, and a later-described third image processor provided with a scanner compensation section (not shown), a color compensation processing section (not shown) and a BG/UCR processing section (not shown). The image forming section performs formation of an image corresponding to an image signal of a document image read by the image reading apparatus. Referring to FIG. 23, the scanner 1' is disposed at an upper part of the image forming apparatus, whereas the image forming section is disposed at a lower part of the image forming apparatus.

The scanner 1' as the image reading apparatus according to the present embodiment includes a light source which irradiates illumination light to a document, an imaging element which images reflected light of the illumination light from the document, a light-receiving element which converts the reflected light imaged by the imaging element into an electrical signal as a document image, and an image processor which performs an image process on the basis of the electrical signal. The image reading apparatus also includes a color separator provided in an optical path from the light source to the light-receiving element and which performs color separation of the illumination light or the reflected light into at least three kinds of wavelength ranges including a first wavelength range, a second wavelength range, and a third wavelength range. The imaging element satisfies a formula (7) as follows.

$$0.001 < |f - fe|/fe \quad (7)$$

where "fe" represents a focal distance in a reference wavelength e-line (546.07 nm), and "f" represents a focal distance in a C-line (656.27 nm) or in an F-line (486.13 nm).

Moreover, the image processor converts the electrical signal into luminance/color difference signals or value/chromaticity signals to perform the image process performing a filter process.

Figure 24:
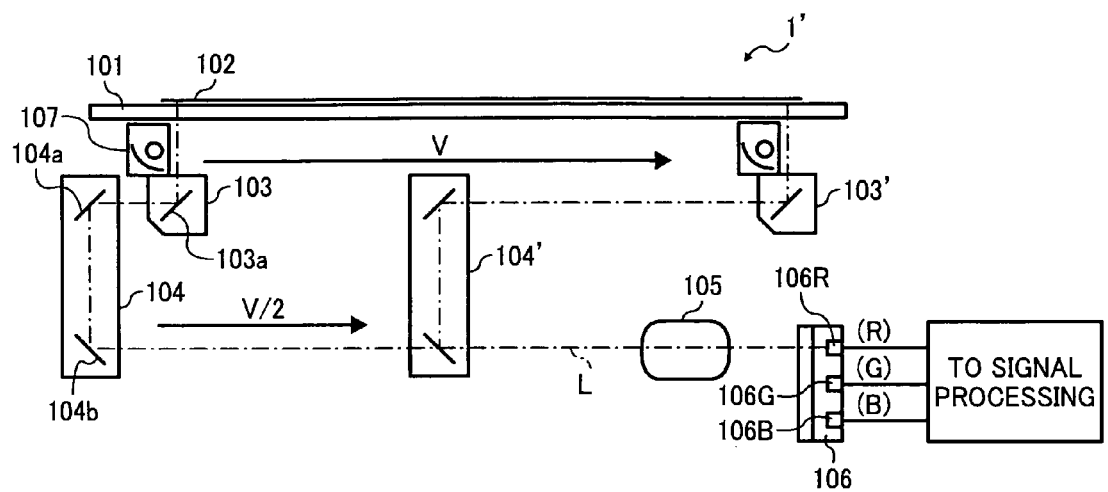
FIG. 24 is a sectional side view illustrating an image reading apparatus according to the second embodiment of the invention.

FIG. 24 illustrates the scanner 1' as the image reading apparatus according to the second embodiment of the invention. Referring to FIG. 24, the scanner 1' according to the present embodiment includes a so-called three-line CCD (Charge Coupled Device) as a light-receiving element.

In the scanner 1', a document 102 is disposed or placed on a contact glass 101. The document 102 is illuminated through the contact glass 101 by an illumination optical system 107 disposed below the contact glass 101. Illumination reflected light L from the document 102 is reflected by a first mirror 103a of a first moving carriage 103, which is then reflected by a first mirror 104a and a second mirror 104b of a second moving carriage 104 to be guided to an imaging lens 105'. Thereafter, the illumination reflected light L is imaged by the imaging lens 105' on each line sensor 106R, 106G; and 106B of a line sensor unit 106.

For example, when a longitudinal direction (a horizontal direction in FIG. 24) of the document 102 is to be read, the first moving carriage 103 moves to a position denoted by a reference numeral 103' located on a right side end from a left side end of FIG. 24 at a speed of "V". Simultaneously the second moving carriage 104 moves to a position denoted by a reference numeral 104' located in a central part from the left side end of FIG. 24 at a speed of "V/2" which is half the speed of the first moving carriage 103. In this operation, an optical length from the document 102 to the line sensor unit 106 becomes constant, consistently, and thereby, reading of the entire part of the document 102 is performed.

Figure 25:
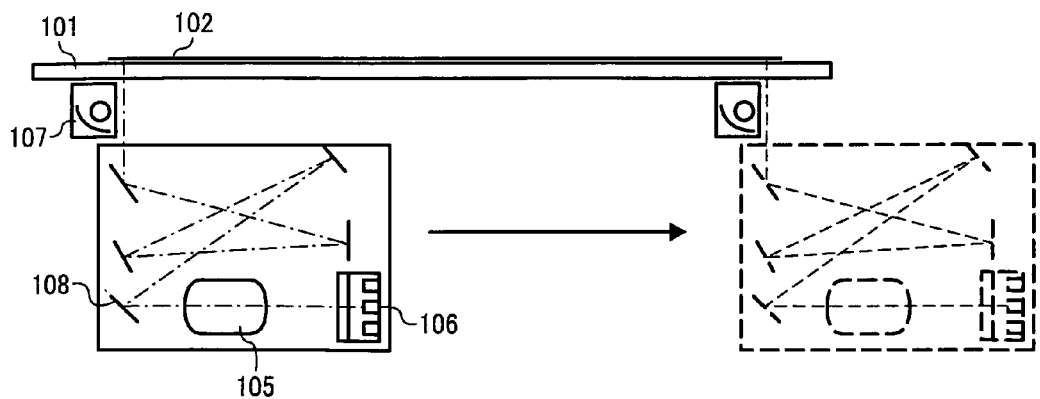
FIG. 25 is a sectional side view illustrating another image reading apparatus according to the second embodiment of the invention.

FIG. 25 illustrates another image reading apparatus according to the second embodiment of the invention. The optical system of the image reading apparatus may alternatively have a structure in which the optical path of the illumination reflected light L is turned back by a plurality of mirrors (the number of lenses can be arbitrary selected) to guide the illumination reflected light L to the imaging lens 105', and in which the mirrors, the imaging lens 105' and the line sensor unit 106 are held by an integrated unit 108, which moves in its entirety to read the document image.

The line sensor unit 106 has a structure in which the line sensors 106R, 106G and 106B as line CCDs are aligned parallel to each other in three lines on a single chip, in such a manner that a longitudinal direction of each of the line sensors 106R, 106G and 106B becomes or corresponds to a sub-scanning direction (a direction orthogonal to a plane of the drawings). In other words, the line sensor unit 106 employs the three-line CCD. In addition, filters for performing color separation of the illumination reflected light L into light having three kinds of wavelength ranges, i.e., a filter which color-separates the illumination reflected light L into light having a wavelength range of red (R), a filter which color-separates the illumination reflected light L into light having a wavelength range of green (G), and a filter which color-separates the illumination reflected light L into light having a wavelength range of blue (B), are provided on a front surface of the line sensors 106R, 106G and 106B, respectively.

As a method of the color separation, a color separation prism, a color separation filter or the like may be selectively inserted between the imaging lens 105' and the line sensors 106R, 106Q and 106B to color-separate the light into R, G and B. Alternatively, light sources of R, G and B may be subsequently lit to illuminate the document 102. However, any methods can be employed as long as the light is separated into predetermined wavelength ranges.

Then, the third image processor, which is illustrated in FIG. 23 as an image processor 1200', performs predetermined image processes to RGB image data outputted from the line sensor unit 106, and outputs image signals used for formation of electrostatic latent images. More specifically, the image signals are used for forming the electrostatic latent images corresponding to the respective colors of yellow (Y), magenta (M), cyan (C) and black (K=keytone) onto the surface of the photoreceptor, which will be described later in greater detail.

The image forming section illustrated in FIG. 23 includes a fourth image processor, which is illustrated in FIG. 23 as the image processor 1200', and an image outputting section. The fourth image processor includes a printer γ (gamma) compensation processing section, and a halftone processing section. The fourth image processor performs quantization of image data used for the formation of the electrostatic latent image, and outputs the image data. The quantization of the image data may be carried out by, for example, a printer γ (gamma) compensation process, a gradation process, a compensation process for a brightness characteristic in the subsequent image outputting section, an error diffusion process according to a gradation characteristic in the subsequent image outputting section and a result of image region separation, and a dither process. In the present embodiment, the third image processor and the fourth image processor are provided integrally as the single image processor 1200' as illustrated in FIG. 23, although the third image processor and the fourth image processor may be individually provided. Thereafter, the electrostatic latent images are formed on the surface of the photoreceptor by the image outputting section.

Referring to FIG. 23, the image outputting section includes a photoconductive photoreceptor 1100 formed cylindrical. In addition, an electrification roller 1110 as a charger, a revolver type developing device 1130, a transfer belt 1140, and a cleaning device 1150 are arranged around the photoreceptor 1100. A so-called corona charger can be used for the charger, in place of the electrification roller 1110.

An optical scanning device 1170, which scans a light beam on the basis of a signal outputted from the image processor 1200' and forms the electrostatic latent image on the photo-receptor 1100, is provided above the photoreceptor 1100. The optical scanning device 1170 performs optical scanning of the photoreceptor 1100 between the electrification roller 1110 and the developing device 1130.

FIG. 23 also illustrates transfer papers S as recording media, a fixing device 1160, a cassette 1180 in which the transfer papers S are stored, a pair of resist rollers 1190, a paper-feeding roller 1220, and a tray 1210.

To form an image, the photoconductive photoreceptor 1100 is rotated in a clockwise direction in the drawings at a constant speed, and the surface thereof is evenly charged by the electrification roller 1110. The surface of the photoreceptor 1100 is exposed by a laser beam of the optical scanning device 1170, and thereby the electrostatic latent image is formed. The thus-formed electrostatic latent image is a so-called negative latent image.

The formation of the electrostatic latent image is performed in order of a yellow image, a magenta image, a cyan image and a black image, in accordance with the rotation of the photoreceptor 1100. The formed electrostatic latent images are subsequently subjected to reversal development by a developer unit Y which performs development by a yellow toner, a developer unit M which performs development by a magenta toner, a developer unit C which performs development by a cyan toner, and a developer unit K which performs development by a black toner, which are provided in the revolver type developing device 1130, so as to be visualized as toner images as positive images. The thus-obtained toner images of the respective colors are subsequently transferred onto the transfer belt 1140 by a transfer voltage applying roller 114A. Thereby, the toner images of the respective colors are overlapped on the transfer belt 1140 to be a color image.

The cassette 1180 stored with the transfer papers S is provided attachable and detachable to a body of the image forming apparatus. The uppermost one sheet of transfer papers S stored in the cassette 1180, in a state in which the cassette 1180 is mounted to the body of the image forming apparatus as illustrated in FIG. 23, is delivered to the pair of resist rollers 1190 by the paper-feeding roller 1220. Thus, a tip end of the transfer paper S delivered toward the pair of resist rollers 1190 is caught by the resist rollers 1190.

The pair of resist rollers 1190 sends the transfer paper S to a transfer section in accordance with timing that the toner image on the transfer belt 1140 moves to a transfer position. The transfer paper S delivered to the transfer section is overlapped with the toner image in the transfer section, and is pressed to the toner image on the transfer belt 1140 by a transfer roller 114B. By this operation, the toner image is electro-statically transferred on the transfer paper S.

The transfer paper S on which the toner image is transferred is then sent to the fixing device 1160 to fix the toner image. Thereafter, the transfer paper S travels through a delivery path structured by a guiding member (not shown), and is discharged on the tray 1210 by a pair of paper-discharging rollers (not shown).

The surface of the photoreceptor 1100 is cleaned by the cleaning device 1150 to remove the residual toner, paper powder and so on, every time the toner image is transferred.

Now, description is made on the image processor 1200' in the digital full-color copying machine illustrated in FIG. 23.

Figure 26:
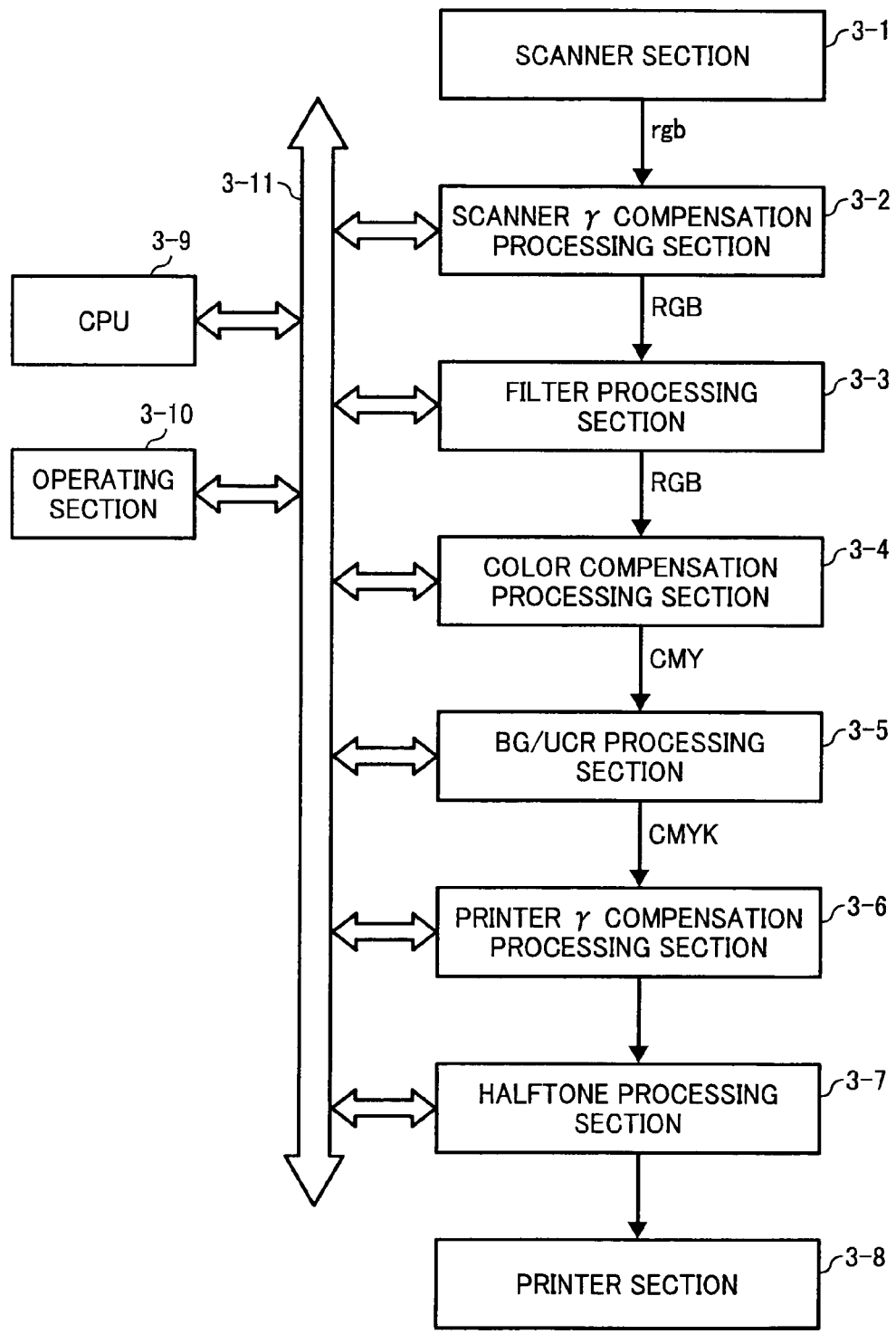
FIG. 26 is a block diagram of an image processor in the image forming apparatus.

FIG. 26 is a block diagram schematically illustrating a structure including sections which performs image signal processes in the image processor 1200' according to the present embodiment. Referring to FIG. 26, the image processor 1200' includes a scanner section 3-1, the scanner γ (gamma) compensation processing section 3-2, a filter processing section 3-3, a color compensation processing section 3-4, a BG/UCR (Black Generation processing and Under-Color-Removal) processing section 3-5, a printer γ (gamma) compensation processing section 3-6, the halftone processing section 3-7, a printer section 3-8, a CPU (Central Processing Unit) 3-9, an operating section 3-10, and a data bus 3-11.

Now, brief operation of image processes according to FIG. 26 will be described. When a start button (not shown) included in the operating section 3-10 is pressed, the CPU 3-9, prior to copying operation, sets parameters of each image process to each of the image processing sections including the scanner γ compensation processing section 3-2, the filter processing section 3-3, the color compensation processing section 3-4, the BG/UCR processing section 3-5, the printer γ compensation processing section 3-6, and the halftone processing section 3-7 through data bus 3-11, in accordance with a copying mode (described later in detail) previously set by a user. Normally, copying machines are provided with copying modes such as a character mode, a character/photograph mode, a photograph mode and so on in accordance with types of document, and the CPU 3-9 changes the parameters of each of the image processes and so on based on setting of the copying mode. Here, since the setting of the parameters is well known in the art, it will not be described in detail. The scanner section 3-1 initiates operation of reading a document, after the setting of the parameters is carried out. An image of the document read by the scanner section 3-1 is applied with the image processes by the image processor 1200', and thereafter, the processed image is outputted to the printer section 3-8, which is then printed on the transfer paper S.

The scanner section 3-1 optically reads the colored document image, and photo-electrically converts the read document image into a digital image signal having 8 bits (0-255). Thereafter, the scanner section 3-1 performs a known shading compensation process.

The scanner γ compensation section 3-2 uses a look-up table or the like used for conversion to convert the digital image signal outputted from the scanner section 3-1 into an RGB signal as a density signal.

The filter processing section 3-3 converts the RGB signal outputted from the scanner γ compensation section 3-2 into an LUV signal (L: luminance signal, UV: color difference signal) as luminance/color difference signals, and thereafter, applies a luminance/color difference filter process to the LUV signal. The filter process will be described later in greater detail.

The color compensation processing section 3-4 performs a color conversion process to convert the RGB signal outputted from the filter processing section 3-3 into a CMY (Cyan, Magenta, Yellow) signal. The color conversion process of converting the RGB signal into the CMY signal is performed, for example, by using formulae (9) to (11) as follows:

$$C = \alpha 11 \times R + \alpha 12 \times G + \alpha 13 \times B + \beta 1 \tag{9}$$

$$M = \alpha 21 \times R + \alpha 22 \times G + \alpha 23 \times B + \beta 2 \tag{10}$$

$$Y = \alpha 31 \times R + \alpha 32 \times G + \alpha 33 \times B + \beta 3 \tag{11}$$

where a11 to a33 and β1 to β3 are predetermined color compensation coefficients, and C, M, and Y are signals having 8 bits (0-255).

The BG/UCR processing section 3-5 generates a K (keytone) signal as a black component on the basis of the CMY signal outputted from the color compensation processing section 3-4, and at the same time, performs an under-color-removal process to the CMY signal. The generation of the K signal and the under-color-removal process of the CMY signal are performed, for example, by using formulae (12) to (15) as follows:

$$K = \mathrm{Min}(C, M, Y) \times \beta 4 \tag{12}$$

$$C' = C - K \times \beta 5 \tag{13}$$

$$M' = M - K \times \beta 5 \tag{14}$$

$$Y' = Y - K \times \beta 5 \tag{15}$$

where Min (C, M, Y) represents the minimum one of the CMY signal, β4 and β5 are predetermined coefficients, and C', M', and Y' are signals having 8 bits (0-255).

The printer γ compensation processing section 3-6 uses a look-up table for conversion to perform a γ compensation process to a CMYK signal outputted from the BG/UCR processing section 3-5, so as to adapt the CMYK signal to a printer γ characteristic.

The halftone processing section 3-7 performs a pseudo medium tone process such as a known dither process, an error diffusion process and so on to the CMYK signal already applied with the printer γ compensation process and outputted from the printer γ compensation processing section 3-6.

The printer section 3-8 uses the CMYK signal already applied with the pseudo medium tone process and outputted from the halftone processing section 3-7 to perform a series of image forming processes, and transfers the formed image onto the transfer paper S.

Now, a structure and operation of the filter processing section 3-3 will be described in detail.

Figures 27, 28A, 28B:
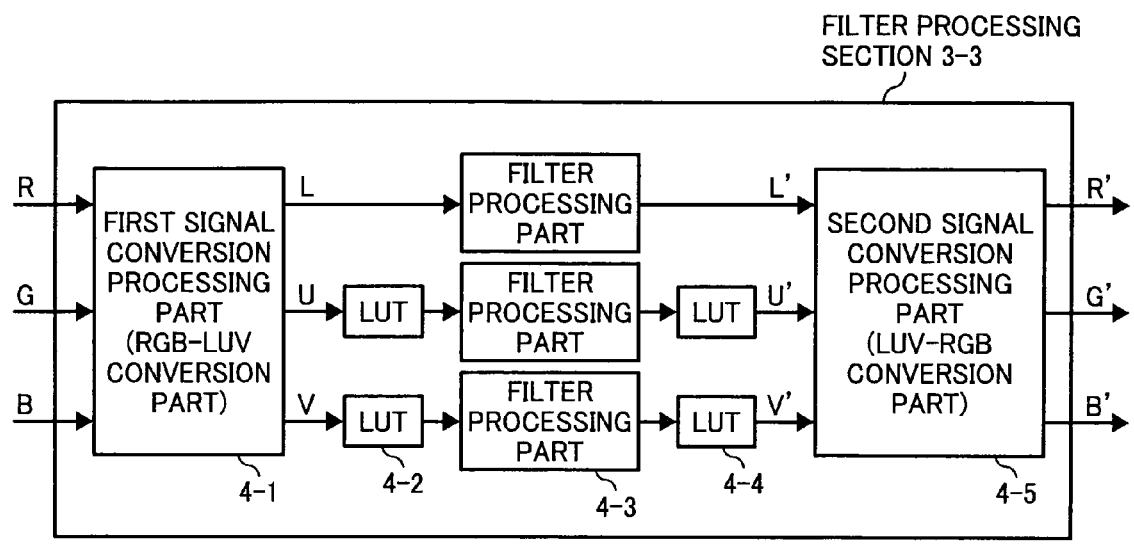
FIG. 27 is a block diagram of a filter processing section in the image processor illustrated in FIG. 26.
FIG. 28A illustrates one example of a smoothing filter used in the filter processing section illustrated in FIG. 27.
FIG. 28B illustrates one example of an edge reinforcement filter used in the filter processing section illustrated in FIG. 27.

FIG. 27 is a block diagram illustrating a detailed structure of the filter processing section 3-3 illustrated in FIG. 26. Referring to FIG. 26, the filter processing section 3-3 includes a first signal conversion processing part (RGB-LUV conversion part) 4-1, a filter processing part body 4-3 provided for each L-signal, U-signal, and V-signal, and a second signal conversion processing part (LUV-RGB conversion part) 4-5.

The first signal conversion processing part 4-1 converts the CMY signal outputted from the color compensation processing section 3-4 into the LUV signal (L: luminance signal, UV: color difference signal) as the luminance/color difference signals, and outputs the LUV signal to the filter processing part body 4-3. For example, the conversion of the CMY signal into the LUV signal is performed by using the formulae (16) to (18) as follows:

$$L=\text{floor}\{(R+2\times G+B)/4\} \quad (16)$$

$$U=R-G \quad (17)$$

$$V=B-G \quad (18)$$

where "floor { }" represents a floor function.

The above formulae (16) to (18) are conversion equations for converting the CMY signal into the luminance/color difference signals that are realizable only by a bit shift and addition/subtraction, and are invertible-transformable by integer calculation. The formulae (16) to (18) are employed in "JPEG 2000" as a standard compression type and being a successor of JPEG (Joint Photographic Experts Group).

The filter processing part body 4-3 performs a filter process to each of the L signal, the U signal, and the V signal respectively outputted from the first signal conversion processing part 4-1, and outputs an L' signal, an U' signal, and a V' signal to the second signal conversion processing part 4-5. The filter process performed by the filter processing part body 4-3 includes convolution calculation carried out by utilizing filters having filter coefficients illustrated in FIGS. 28A and 28B, for example. FIG. 28A illustrates one example of the filter coefficient used in a smoothing filter process, whereas FIG. 28B illustrates one example of the filter coefficient used in an edge reinforcement filter process.

Alternatively, a structure may be employed in which the above filter coefficients are altered in accordance with copying modes and so on. In addition, the filter coefficients different from each other may be used for the L signal and the UV signal, and in this case, it is preferable that an influence on the L signal be stronger than that on the UV signal. Furthermore, a structure may be employed in which the image region separation process described above is used to separate regions of an image, and the filter coefficients are altered based on a result of the image separation. Here, since the filter coefficients are an element which greatly influences the quality of the image, the filter coefficients are normally determined for each device on the basis of experiments and so on. In addition, although the number of line memories corresponding to "sizes in a sub-scanning direction−(minus) 1" lines of the filter coefficients (for example, 3−1=2 in the filters illustrated in FIGS. 28A and 28B) is normally required to implement such a filter process described above, illustration of the line memories are omitted here for the sake of simplification of explanation.

The second signal conversion processing part 4-5 converts the L' signal, the U' signal, and the V' signal outputted from the filter processing part body 4-3 into an R' signal, a G' signal, and a B' signal by using formulae (19) to (21) as follows, and outputs the R' signal, the G' signal, and the B' signal to the BG/UCR processing section 3-5.

$$G'=L-\text{floor}\{(U+V)/4\} \quad (19)$$

$$R'=U+G \quad (20)$$

$$B'=V+G \quad (21)$$

where "floor { }" represents a floor function.

Invertible transformation is possible by using the floor function such as the formulae (16) and (19) when a floor function such as a compression process is to be implemented, although it is not necessarily limited by the use of the floor function. An alternative method such as round-off, truncation and so on may be used in place of the floor function.

Figure 29:
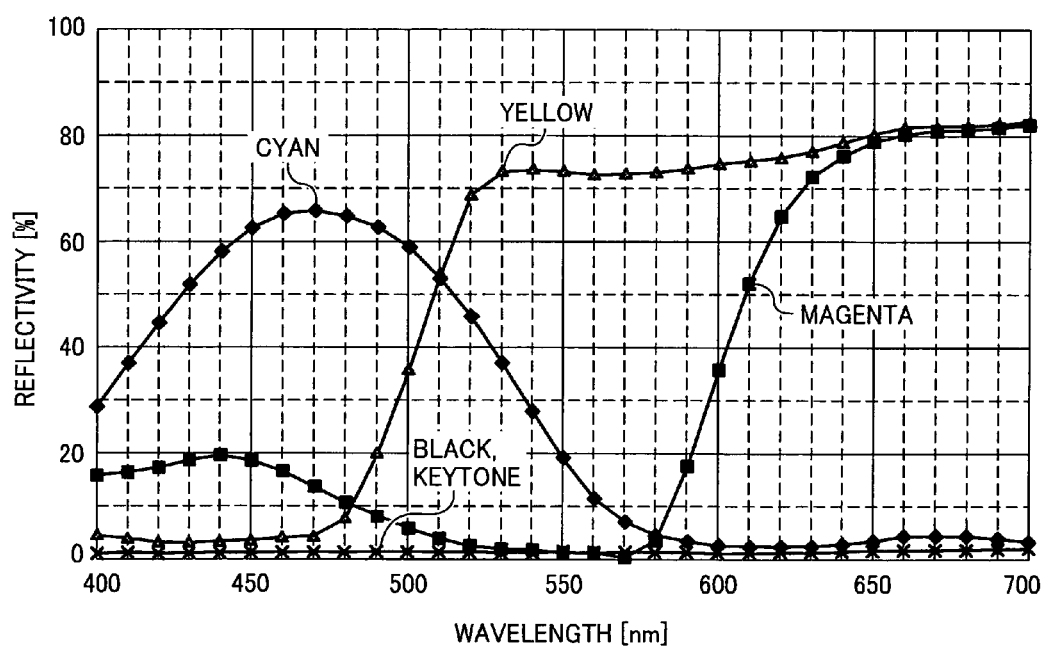
FIG. 29 is a graph illustrating spectral reflectance characteristics of ordinary inks used in printing of a document.
Figure 30:
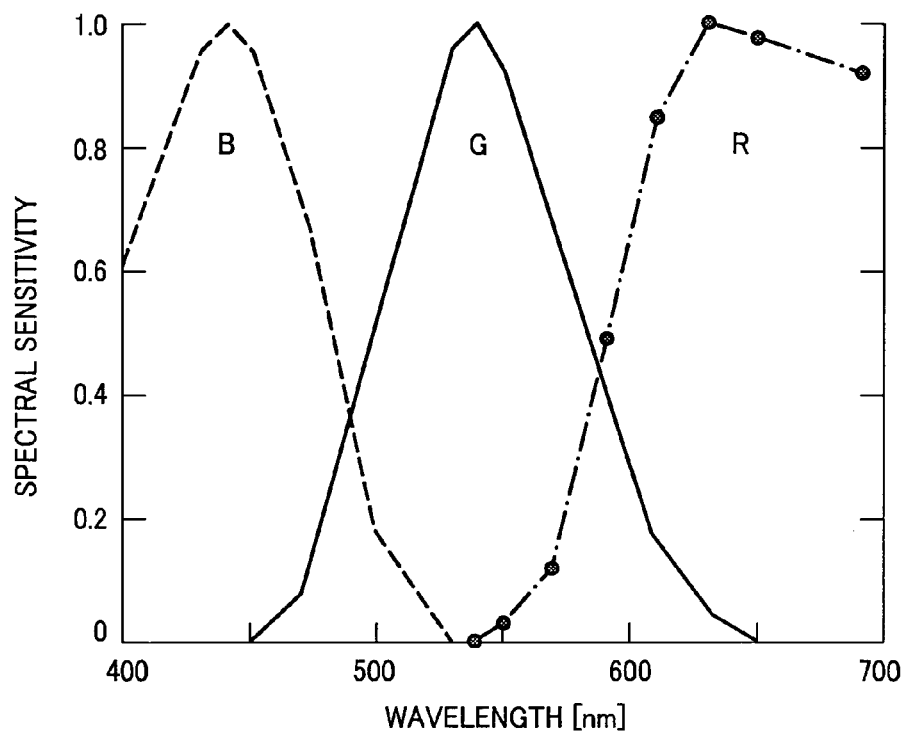
FIG. 30 illustrates one example of a spectral sensitivity characteristic of a line sensor unit according to the second embodiment.

FIG. 29 illustrates one example of spectral reflectance characteristics of ordinary inks used in printing of a document. FIG. 30 illustrates one example of a spectral sensitivity characteristic of the line sensor unit 106 according to the present embodiment. Normally, when light having a wavelength range in which reflectivity of an ink is high is used, a difference in reflectivity of light due to presence or absence of the ink is small, and hence, detection of a document image is difficult. Therefore, light having a wavelength in which the difference in the reflectivity of light by the presence or absence of the ink is large is used to detect the document image.

In a case of a cyan ink as a complementary color of the R (red) signal, the reflectivity of light is high in the wavelength range corresponding to the B signal, while the reflectivity of light is substantially 0% in the wavelength range corresponding to the R signal. Therefore, it is possible to detect presence or absence of an image printed by the cyan ink by using the R signal as the complementary color. It is to be noted that the reflectivity of light is also low in the wavelength range corresponding to the G signal, in the case of the cyan ink. Hence, it is possible to detect the image printed by the cyan ink by the G signal as well.

More specifically, the RGB signal is converted into the LUV signal, and the filter process is performed to the L-signal having large contribution to the G signal, such that modification of an image is possible to an extent that a problem does not occur even when the imaging performance of the wavelength range corresponding to the R signal is slightly deteriorated. Hence, there is no necessity for finely compensating the on-axis chromatic aberration of the R signal unlike in a conventional imaging lens. This also applies to a case in which the black ink is used.

In a case of a yellow ink, the reflectivity of light is high in the wavelength ranges corresponding to the R signal and the G signal, while the reflectivity of light is substantially zero percent in the wavelength range corresponding to the B signal. In other words, in a case in which an image printed by the yellow ink is present on a document and the document is read, for example, by the document reading section illustrated in FIG. 23, the reflectivity of light having the wavelength range corresponding to the B signal becomes extremely small. On the other hand, when there is no information printed by the yellow ink on the document, the reflectivity of light having the wavelength range corresponding to the B signal is increased. Therefore, it is possible to detect presence or absence of the image printed by the yellow ink by utilizing the B signal. Accordingly, it is necessary that good imaging performance is obtained for the wavelength range corresponding to the B signal, in order to detect the document image printed by the yellow image in a decent manner.

Since the yellow color of the yellow ink has high value (brightness), there is little need for edge reinforcement in terms of human visual characteristics. In other words, the problem does not occur in the case of the yellow ink even when an MTF (Modulation Transfer Function) of a high spatial frequency is deteriorated due to the generation of the on-axis chromatic aberration.

Figure 31:
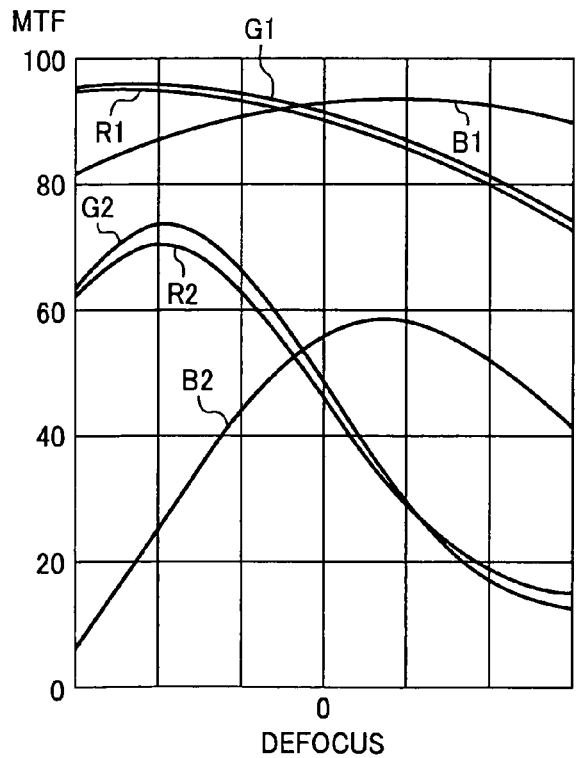
FIG. 31 is a graph illustrating a relationship between a modulation transfer function and a defocus or M-D curves.

Here, a reason why the on-axis chromatic aberration does not have to be compensated finely will be explained with reference to an MTF versus defocus curve (M-D curves) diagram represented in FIG. 31. Referring to FIG. 31, R1, G1, and B1 represent the MTF in a low spatial frequency for the RGB, respectively, while R2, G2, and B3 represent the MTF in the high spatial frequency for the RGB, respectively.

In FIG. 31, when assuming that the on-axis chromatic aberration is generated for the wavelength range in which the influence on the B signal is large, a peak of the MTF for the B signal does not match with others. In addition, the MTF of the high spatial frequency deteriorates largely, although deterioration of the MTF in the low spatial region is small since the MTF of the low spatial frequency has deep depth or wide depth.

Here, in order to suppress coloration in a peripheral part of a black character, it is desirable to perform region-separation of a chromatic region and an achromatic region. When the region-separation of the chromatic region and the achromatic region is to be performed, it is preferable that the deterioration in the MTF in the low spatial frequency be small, since the MTF of the low spatial frequency is necessary therein.

Therefore, high accuracy image reading is possible in the image reading apparatus according to the present embodiment, even when the compact, cost-reduced imaging lens in which the number of lenses is reduced is used.

The formula (7) defines an allowable value of the on-axis chromatic aberration for the R signal or the B signal in the above case.

$$0.001 < |f-fe|/fe \quad (7)$$

where "f" represents the focal distance in the C-line (656.27 nm) or in the F-line (486.13 nm) of the imaging element, and "fe" represents the focal distance in the reference wavelength e-line (546.07 nm) of the imaging element.

When "|f−fe|/fe" of the formula (7) exceeds an range defined in the formula (7), a good state of the chromatic aberration is obtained, although advanced color compensation becomes necessary to achieve the good state, and thus the number of lenses and an entire length of the lenses have to be increased.

In addition, it is preferable that the imaging element according to the present embodiment satisfy, in addition to the formula (7), a formula (7') as follows:

$$0.0015 < |f-fe|/fe \quad (7')$$

It is more preferable that the imaging element according to the present embodiment satisfy, in addition to the formula (7), a formula (7") as follows:

$$0.002 < |f-fe|/fe \quad (7")$$

However, the imaging performance related to colors becomes worse when the large on-axis chromatic aberration is generated. Therefore, it is further preferable that the imaging element satisfy a formula (8) as follows:

$$|f-fe|/fe < 0.0045 \quad (8)$$

where "f" represents the focal distance in the C-line (656.27 nm) or in the F-line (486.13 nm) of the imaging element, and "fe" represents the focal distance in the reference wavelength e-line (546.07 nm) of the imaging element.

It is preferable that the imaging lens 105' be structured, subsequently in an order from a side of a photographic object, by a first lens having positive power, a second lens having negative power, a third lens having positive power, and a fourth lens having negative power.

Furthermore, in the imaging lens 105', it is preferable that the first lens be a lens having a meniscus configuration facing its convex surface to the photographic object side, that the second lens be a both-concaved lens (having concave sections on both sides), that the third lens be a both-convexed lens (having convex sections on both sides), that the fourth lens be a lens having a meniscus configuration facing its concave surface to the photographic object side, and that an aperture stop be provided between the second lens and the third lens.

According to this structure, the imaging performance achieved by the Gauss type having the four-group and six-piece structure is obtained also by the telephoto type lens having the four-group and four-piece structure.

It is preferable that the imaging lens 105' be an imaging lens which causes reduction imaging of a document image. As the imaging lens used for the image reading apparatus, there are a reduction optical system which causes the reduction imaging of document information, and an equal-magnification imaging optical system which causes equal-magnification imaging of the document information. The fine image reading performance is obtainable even in a case in which a surface of the document is not in close-contact with the contact glass and floated from the contact glass in an example in which the reduction optical system is used, although the image reading apparatus according to the present embodiment is applicable to both of the reduction optical system and the equal-magnification imaging optical system.

It is desirable that the image reading apparatus according to the present embodiment have uniform and high contrast from a part near an optical axis to a peripheral part in the high spatial frequency region. Therefore, it is necessary for the imaging lens 105' to compensate a field curvature well. In particular, it is necessary to compensate the field curvature in a sagittal direction (concentric direction) in a good manner, as well as to suppress coma flare to be small, in order to uniform the contrast in the sub-scanning direction. Furthermore, it is required that an aperture efficiency in a peripheral part of a field angle be a value near to 100%. Moreover, it is necessary to compensate magnification chromatic aberration finely, in order to suppress color shift.

Therefore, it is preferable that the imaging lens 105' satisfy both of the following formulae (4) and (5):

$$0.05 < ncv - ncc < 0.25 \quad (4)$$

$$25.0 < vcv - vcc < 36.5 \quad (5)$$

where ncv represents a total of a refractive index in a d-line (587.56 nm) of the first lens and the third lens, ncc represents a total of a refractive index in a d-line of the second lens and the fourth lens, vcv represents a total of Abbe number in the d-line of the first lens and the third lens, and vcc represents a total of Abbe number in the d-line of the second lens and the fourth lens.

The conditions of the formula (4) and the formula (5) define a material used for the imaging lens 105', in order to satisfy such performance described above. The formula (4) defines a range of the refractivity of the convex lens and the concave lens structuring the imaging lens. When "ncv−ncc" exceeds an upper limit, Petzval sum becomes too small, and an image plane falls on a positive side, causing the field curvature to be large. On the other hand, when "ncv−ncc" becomes lower than a lower limit, the Petzval sum becomes too large, and the image plane falls on a negative side, causing an astigmatic difference to be large. Therefore, the fine imaging performance cannot be obtained throughout the entire picture when "ncv−ncc" is out of the range of the formula (4).

The formula (5) is a condition which finely compensates the on-axis chromatic aberration. When "vcv−vcc" exceeds an upper limit, compensation for the on-axis chromatic aberration becomes excessive, and the on-axis chromatic aberration nearer to a side of a short wavelength than the reference wavelength becomes large in the positive side. Whereas when "vcv−vcc" falls below a lower limit, the compensation for the on-axis chromatic aberration becomes insufficient, and the on-axis chromatic aberration nearer to the side of the short wavelength than a dominant wavelength becomes large in the negative side.

Therefore, conditions outside the limits of the formulae (4) and (5) cannot satisfy the performance required for the imaging lens 105'.

It is preferable that the imaging lens 105' satisfy the following formula (6):

$$31.0 < fL1 \times v1/fe < 37.0 \quad (6)$$

where fL1 represents a focal distance relative to the reference wavelength e-line (546.07 nm) of the first lens, v1 represents Abbe number of the first lens, and fe represents a focal distance relative to the reference wavelength e-line of the imaging lens 105'.

The formula (6) is a condition for obtaining even better image processing performance and quality in the read image, and for reducing the costs of the imaging lens, while satisfying the above conditions of the formulae (4) and (5). When "fL1×v1/fe" falls below a lower limit of the formula (6), the power of the first lens becomes too strong, and thus coma aberration is increased and at the same time, the on-axis chromatic aberration becomes too large, thereby causing the imaging position of the light having the frequency of the R region to depart excessively away from the imaging position of the light having the frequency of the G region. On the other hand, when "fL1×v1/fe" exceeds an upper limit of the formula (6), the power of the first lens becomes too weak, and hence, the entire lenses become large, causing the reduction of costs, the miniaturization and so on to be unaccomplished.

In one embodiment, the imaging lens 105' includes a glass lens. A glass material used for the glass lens does not include harmful substances such as lead, arsenic and so on. Recycling of materials is possible by structuring all of the lenses with an optical glass which is chemically stable and which does not include the harmful substances such as lead, arsenic and so on. In addition, water pollution caused by wastewater generated at the time of processing is avoided. Moreover, resource saving and reduction of carbon dioxide generated in the processing are possible. Therefore, it is possible to realize the small, cost-reduced imaging lens 105' in which global environment conservation is considered.

It is further preferable that all surfaces of the imaging lens 105' be structured by a spherical surface. The recent digital cameras often employ aspherical lenses, although the aspherical lenses have problems such as it takes time in a molding process, fabrication costs are increased, and a surface configuration cannot be maintained finely and so on, when an external diameter of a lens is increased. Therefore, by structuring all of the surfaces of the imaging lens 105' with the spherical surfaces, it is possible to obtain a lens having no limitation in size and in which workability, accuracy in the surface configuration and so on are good.

EXAMPLES 6-11

Hereinafter, description will be made on examples 6 to 11 of the image reading apparatus according to the present embodiment of the invention. In these examples, a structure and data of the imaging lens 105' are changed to verify its optical characteristics.

Figure 32:
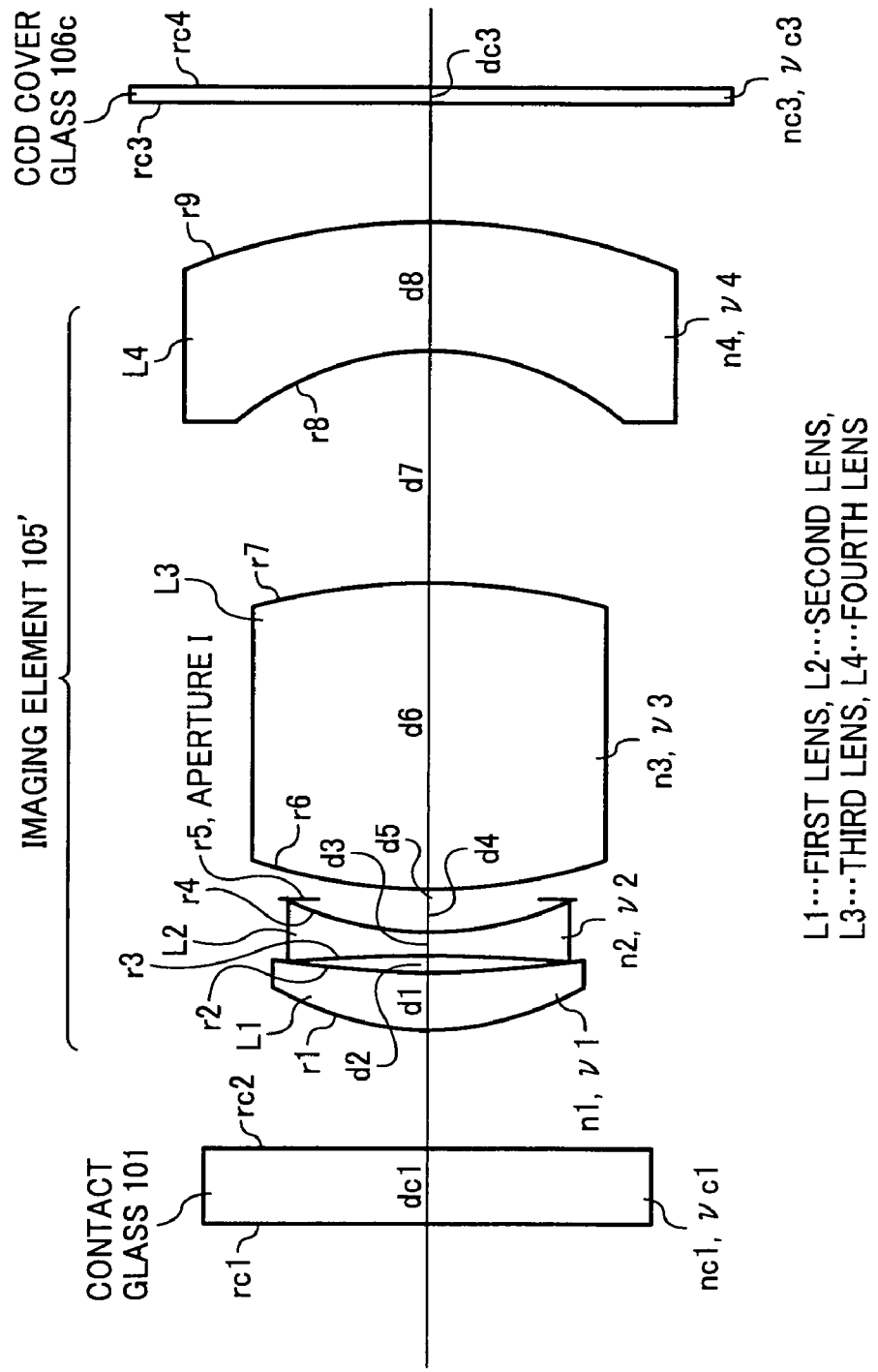
FIG. 32 schematically illustrates a structure of lenses of an imaging lens according to the second embodiment of the invention.

Referring to FIG. 32, the imaging lens 105' includes, on an optical axis and subsequently from a side of a photographic object, a first lens L1, a second lens L2, an aperture stop I, a third lens L3, and a fourth lens L4. Wherein, a curvature radius of an i-th lens surface counted from the photographic object side is "ri", a face interval on the optical axis between the i-th lens surface and an i+1th lens surface is "di", and a refractive index and Abbe number of a material of a j-th lens counted from the photographic object side are "nj" and "vj", respectively. More specifically, the refractive indexes relative to a d-line, an e-line, an F-line and a C-line are "ndj", "nej", "nFj", and "nCj", respectively. In addition, the aperture stop I provided between the second lens L2 and the third lens L3 is i=5.

As to the contact glass 101 and a CCD cover glass 106c of the line sensor unit 106, a curvature radius of an i-th glass plate face counted from the photographic object side is "rci", a face interval on the optical axis between the i-th glass plate face and an i+1th glass plate face is "dci", a refractive index and Abbe number of a material of a glass plate of the contact glass 101 are "nc1" and "vc1", respectively (more specifically, the refractive indexes relative to the d-line, the e-line, the F-line and the C-line are "ndc1", "nec1", "nFc1", and "nCc1", respectively), and a refractive index and Abbe number of a material of a glass plate of the CCD cover glass 106c are "nc3" and "vc3", respectively (more specifically, the refractive indexes relative to the d-line, the e-line, the F-line and the C-line are "ndc3", "nec3", "nFc3", and "nCc3", respectively).

The meanings of reference signs in each of the examples are as follows.

f: Combined focal distance of the entire optical system relative to the e-line
FNo: F-number
m: Magnification
Ω: Half-field angle (degree)
Y: Object height
ri (i=1-9): Curvature radius of the i-th lens surface counted from the photographic object side
di (i=1-8): Face interval of the i-th lens surface counted from the photographic object side
nj (j=1-4): Refractive index of the material of the j-th lens counted from the photographic object side
vj (=1-4): Abbe number of the material of the j-th lens counted from the photographic object side
rc1: Curvature radius on the photographic object side of the contact glass 101
rc2: Curvature radius on an image side of the contact glass 101
rc3: Curvature radius on the photographic object side of the CCD cover glass 106c
rc4: Curvature radius on the image side of the CCD cover glass 106c
dc1: Thickness of the contact glass 101
dc3: Thickness of the CCD cover glass 106c
nc1: Refractive index of the contact glass 101
nc3: Refractive index of the CCD cover glass 106c
vc1: Abbe number of the contact glass 101
vc3: Abbe number of the CCD cover glass 106c
nd: Refractive index of the d-line (587.56 nm)
ne: Refractive index of the e-line (546.07 nm)
nF: Refractive index of the F-line (486.13 nm)
nC: Refractive index of the C-line (656.27 nm)

Figure 33:
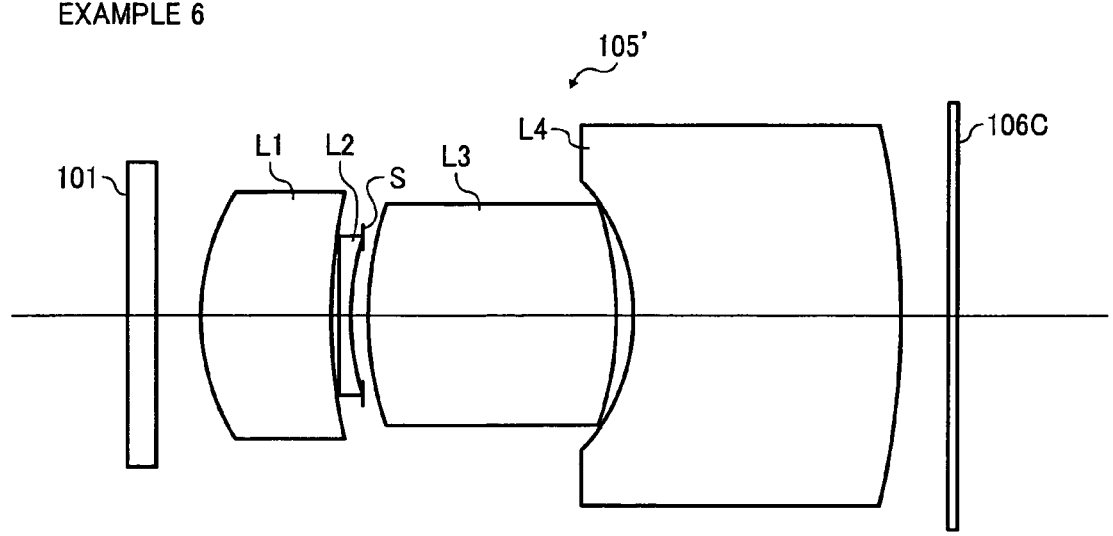
FIG. 33 illustrates a schematic configuration and an arrangement relationship of an imaging lens according to example 6.
Figure 34:
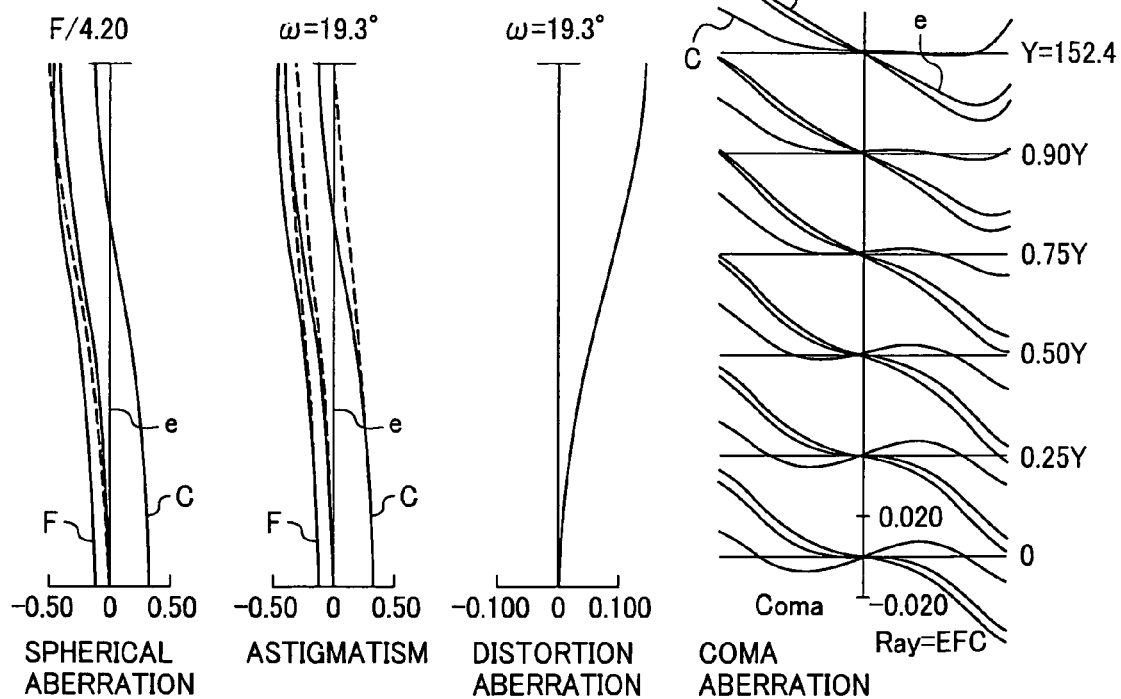
FIG. 34 illustrates aberration curves of the imaging lens according to the example 6.
Figure 35:
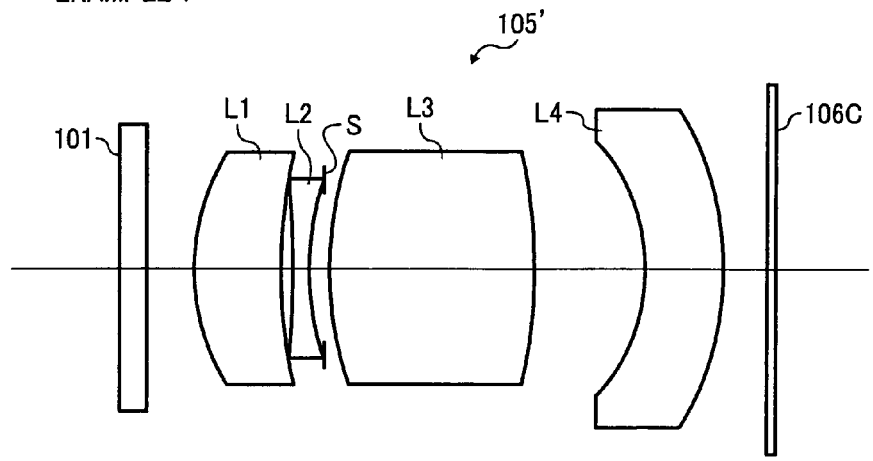
FIG. 35 illustrates a schematic configuration and an arrangement relationship of an imaging lens according to example 7.
Figure 36:
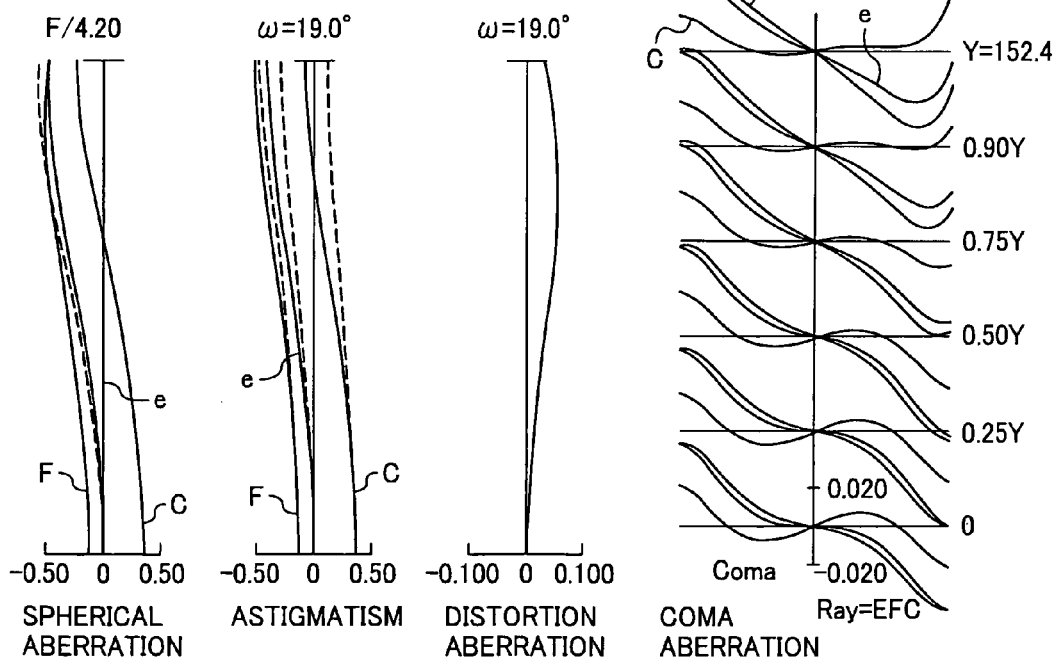
FIG. 36 illustrates aberration curves of the imaging lens according to the example 7.
Figure 37:
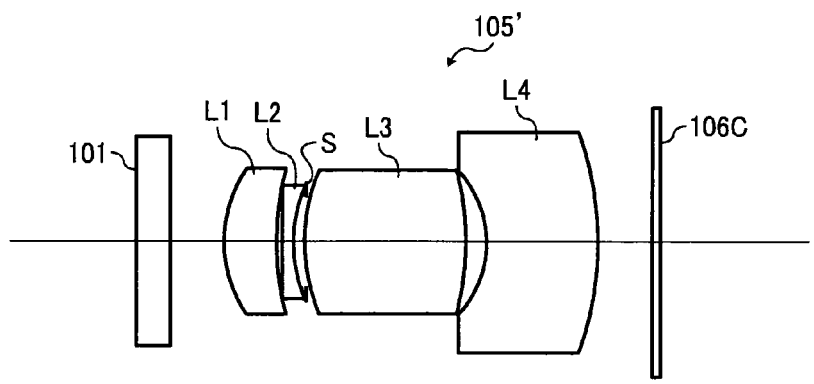
FIG. 37 illustrates a schematic configuration and an arrangement relationship of an imaging lens according to example 8.
Figure 38:
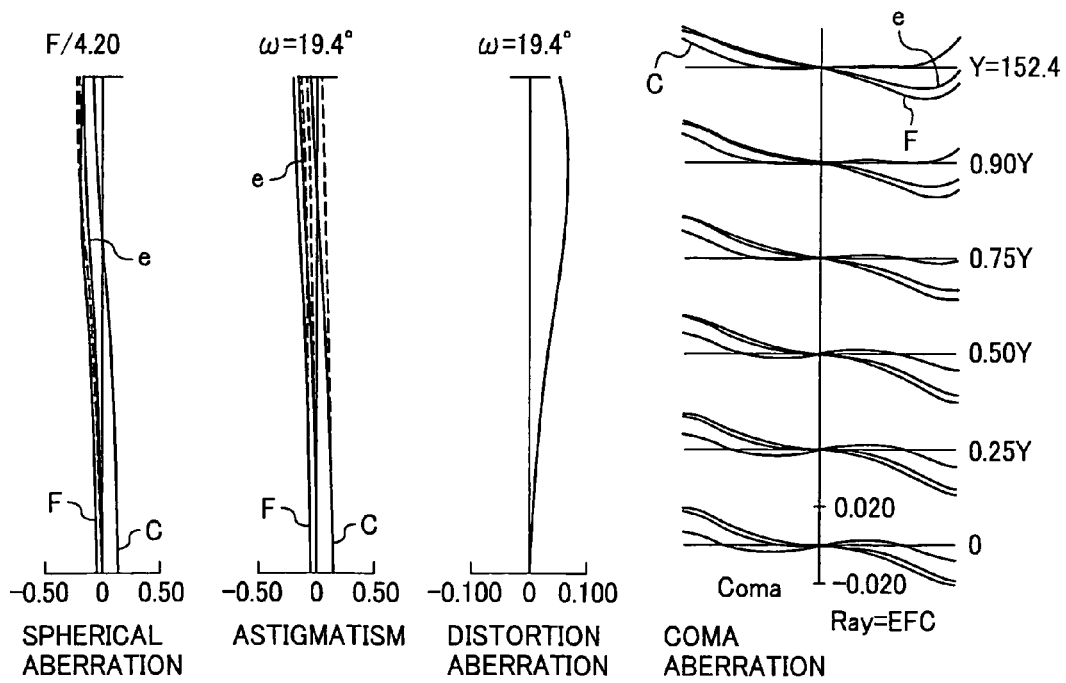
FIG. 38 illustrates aberration curves of the imaging lens according to the example 8.
Figure 39:
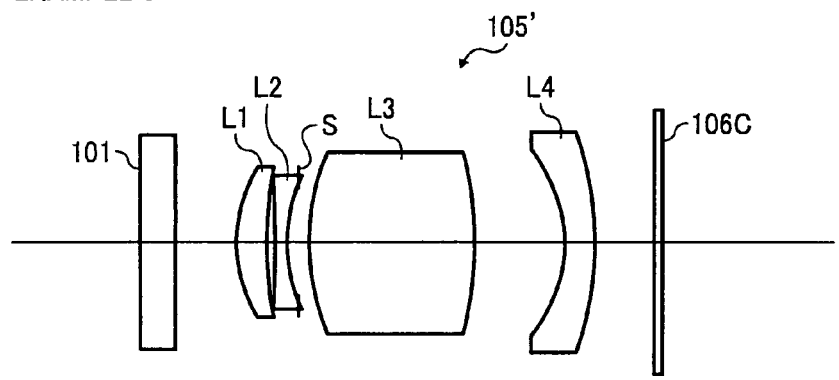
FIG. 39 illustrates a schematic configuration and an arrangement relationship of an imaging lens according to example 9.
Figure 40:
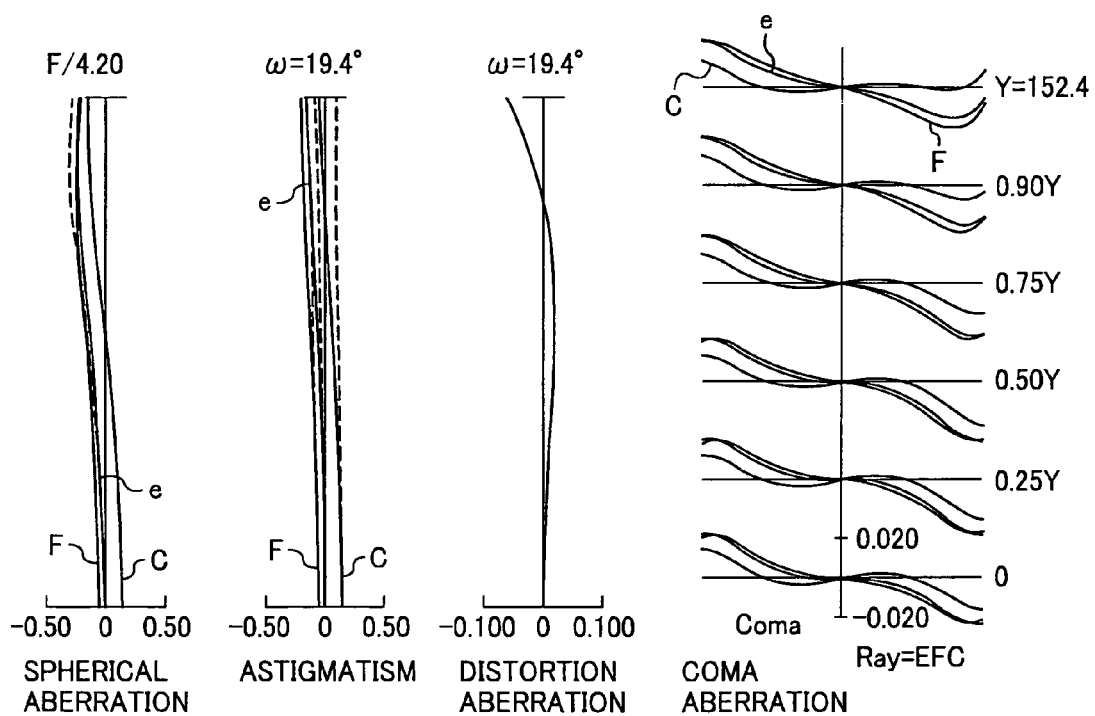
FIG. 40 illustrates aberration curves of the imaging lens according to the example 9.
Figure 41:
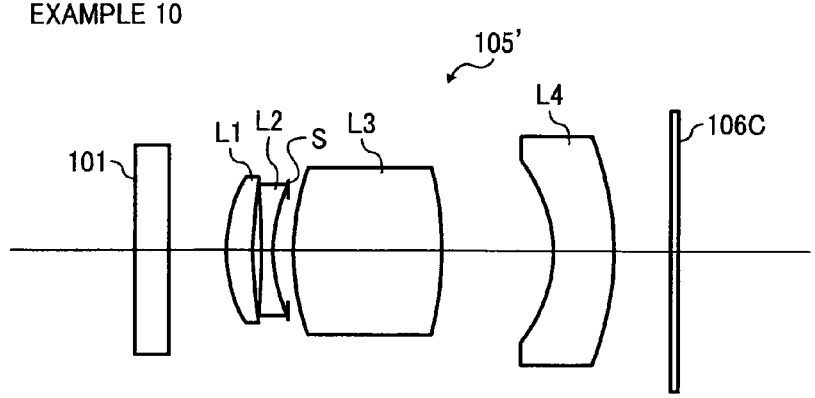
FIG. 41 illustrates a schematic configuration and an arrangement relationship of an imaging lens according to example 10.
Figure 42:
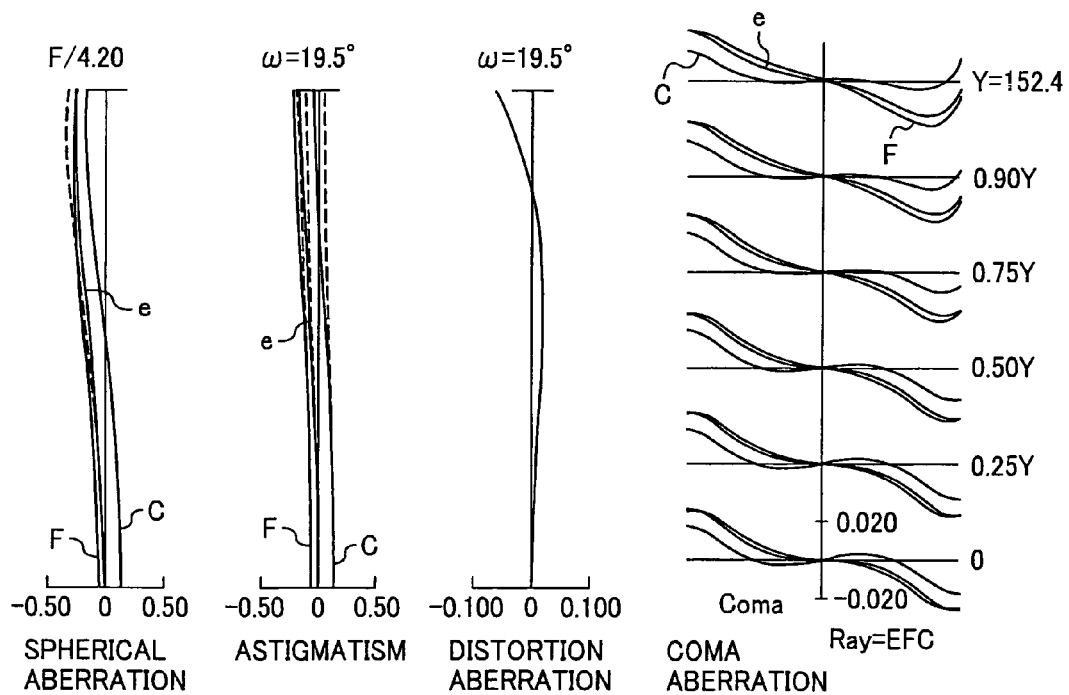
FIG. 42 illustrates aberration curves of the imaging lens according to the example 10.
Figure 43:
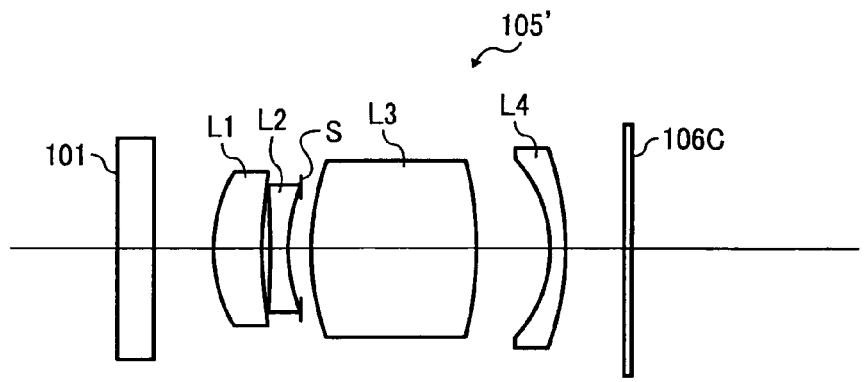
FIG. 43 illustrates a schematic configuration and an arrangement relationship of an imaging lens according to example 11.
Figure 44:
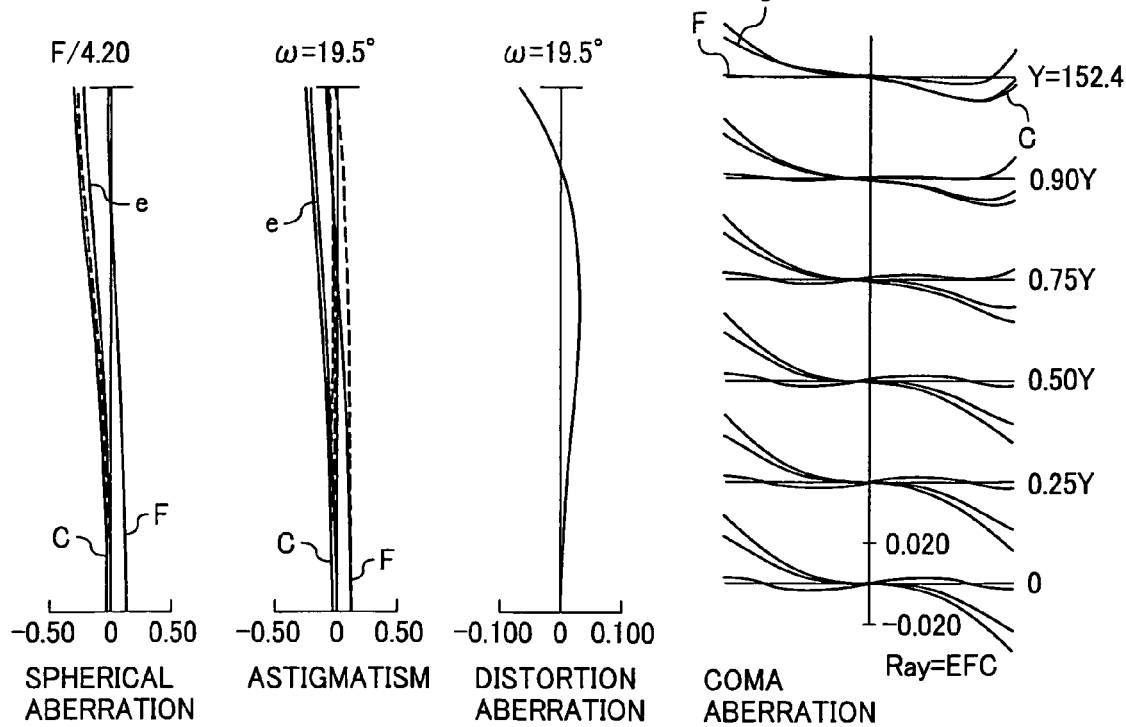
FIG. 44 illustrates aberration curves of the imaging lens according to the example 11.

The structures of the imaging lenses 105' including a schematic configuration and an arrangement relationship are illustrated respectively in FIG. 33 (example 6), FIG. 35 (example 7), FIG. 37 (example 8), FIG. 39 (example 9), FIG. 41 (example 10), and FIG. 43 (example 11). Tables 10 to 15 respectively illustrate the data of the imaging lenses 105' according to the examples 6 to 11 and names of materials of glass used. In addition, graphs representing aberrations of the imaging lenses 105' according to the examples 6 to 11 are illustrated respectively in FIG. 34 (example 6), FIG. 36 (example 7), FIG. 38 (example 8), FIG. 40 (example 9), FIG. 42 (example 10), and FIG. 44 (example 11). In each of the graphs, e, F, and C represent curves for the e-line (546.07 nm), the F-line (486.13 nm), and the C-line (656.27 nm), respectively. In the graphs illustrating a spherical aberration, a dotted line represents a curve for a sine condition. In the graphs illustrating astigmatism, a solid line represents a curve for a sagittal ray and a dotted line represents a curve for a meridional ray.

TABLE 10

(example 6)
f = 83.080, F = 4.2, m = 0.23622, Y = 152.4, ω = 19.3°

| i/j | r | d | nd | vd | ne | nF | nc | Material Name (Manufacturer) |
|---|---|---|---|---|---|---|---|---|
| c1 | 0.0 | 3.2 | 1.51633 | 64.14 | 1.51825 | 1.52191 | 1.51386 | S-BSL7 (OHARA) |
| c2 | 0.0 | | | | | | | |
| 1 | 26.721 | 14.394 | 1.71300 | 53.87 | 1.71615 | 1.72221 | 1.70897 | S-LAL8 (OHARA) |
| 2 | 64.521 | 0.823 | | | | | | |
| 3 | −303.293 | 1.200 | 1.67270 | 32.1 | 1.67765 | 1.68756 | 1.66661 | S-TIM25 (OHARA) |
| 4 | 29.132 | 1.200 | | | | | | |
| 5 | 0.0 (aperture) | 0.748 | | | | | | |
| 6 | 38.301 | 27.319 | 1.83400 | 37.16 | 1.83932 | 1.84982 | 1.82738 | S-LAH60 (OHARA) |
| 7 | −43.571 | 2.380 | | | | | | |
| 8 | −22.067 | 29.518 | 1.76182 | 26.52 | 1.76859 | 1.7823 | 1.75357 | S-TIH14 (OHARA) |
| 9 | −92.777 | | | | | | | |
| c3 | 0.0 | 1.0 | 1.51633 | 64.14 | 1.51825 | 1.52191 | 1.51386 | S-BSL7 (OHARA) |
| c4 | 0.0 | | | | | | | |

TABLE 11

(example 7)
f = 84.508, F = 4.2, m = 0.23622, Y = 152.4, ω = 19.0°

| i/j | r | d | nd | vd | ne | nF | nc | Material Name (Manufacturer) |
|---|---|---|---|---|---|---|---|---|
| c1 | 0.0 | 3.2 | 1.51633 | 64.14 | 1.51825 | 1.52191 | 1.51386 | S-BSL7 (OHARA) |
| c2 | 0.0 | | | | | | | |
| 1 | 25.662 | 9.620 | 1.69680 | 55.53 | 1.69979 | 1.70552 | 1.69297 | S-LAL14 (OHARA) |
| 2 | 66.18 | 1.260 | | | | | | |
| 3 | −111.502 | 1.804 | 1.71736 | 29.52 | 1.7231 | 1.73463 | 1.71033 | S-TIH1 (OHARA) |
| 4 | 30.832 | 1.362 | | | | | | |
| 5 | 0.0 (aperture) | 0.830 | | | | | | |
| 6 | 43.489 | 22.500 | 1.83400 | 37.16 | 1.83932 | 1.84982 | 1.82738 | S-LAH60 (OHARA) |
| 7 | −63.928 | 12.547 | | | | | | |
| 8 | −20.227 | 8.376 | 1.74077 | 27.79 | 1.74705 | 1.75975 | 1.73309 | S-TIH13 (OHARA) |
| 9 | −34.475 | | | | | | | |
| c3 | 0.0 | 1.0 | 1.51633 | 64.14 | 1.51825 | 1.52191 | 1.51386 | S-BSL7 (OHARA) |
| c4 | 0.0 | | | | | | | |

TABLE 12

(example 8)
f = 43.191, F = 4.2, m = 0.11102, Y = 152.4, ω = 19.4°

| i/j | r | d | nd | vd | ne | nF | nc | Material Name (Manufacturer) |
|---|---|---|---|---|---|---|---|---|
| c1 | 0.0 | 3.2 | 1.51633 | 64.14 | 1.51825 | 1.52191 | 1.51386 | S-BSL7 (OHARA) |
| c2 | 0.0 | | | | | | | |
| 1 | 12.668 | 4.840 | 1.71300 | 53.87 | 1.71615 | 1.72221 | 1.70897 | S-LAL8 (OHARA) |
| 2 | 29.093 | 0.571 | | | | | | |
| 3 | −313.322 | 1.000 | 1.64769 | 33.79 | 1.65222 | 1.66126 | 1.6421 | S-TIM22 (OHARA) |
| 4 | 13.106 | 0.850 | | | | | | |
| 5 | 0.0 | 0.100 | | | | | | |
| 6 | 16.868 | 15.000 | 1.74400 | 44.79 | 1.74795 | 1.75566 | 1.73905 | S-LAM2 (OHARA) |

TABLE 12-continued (example 8)
f = 43.191, F = 4.2, m = 0.11102, Y = 152.4, ω = 19.4°

| i/j | r | d | nd | vd | ne | nF | nc | Material Name (Manufacturer) |
|---|---|---|---|---|---|---|---|---|
| 7 | −27.449 | 2.021 | | | | | | |
| 8 | −10.384 | 10.218 | 1.66680 | 33.05 | 1.67157 | 1.6811 | 1.66092 | S-TIM39 (OHARA) |
| 9 | −31.494 | | | | | | | |
| c3 | 0.0 | 0.7 | 1.51633 | 64.14 | 1.51825 | 1.52191 | 1.51386 | S-BSL7 (OHARA) |
| c4 | 0.0 | | | | | | | |

TABLE 13

(example 9)
f = 43.062, F = 4.2, m = 0.11102, Y = 152.4, ω = 19.4°

| i/j | r | d | nd | vd | ne | nF | nc | Material Name (Manufacturer) |
|---|---|---|---|---|---|---|---|---|
| c1 | 0.0 | 3.2 | 1.51633 | 64.14 | 1.51825 | 1.52191 | 1.51386 | S-BSL7 (OHARA) |
| c2 | 0.0 | | | | | | | |
| 1 | 12.475 | 2.532 | 1.71300 | 53.87 | 1.71615 | 1.72221 | 1.70897 | S-LAL8 (OHARA) |
| 2 | 35.826 | 0.692 | | | | | | |
| 3 | −78.931 | 1.000 | 1.66680 | 33.05 | 1.67157 | 1.6811 | 1.66092 | S-TIM39 (OHARA) |
| 4 | 13.481 | 0.963 | | | | | | |
| 5 | 0.0 | 0.956 | | | | | | |
| 6 | 22.788 | 13.962 | 1.74400 | 44.79 | 1.74795 | 1.75566 | 1.73905 | S-LAM2 (OHARA) |
| 7 | −27.877 | 7.568 | | | | | | |
| 8 | −12.141 | 2.428 | 1.60342 | 38.03 | 1.60718 | 1.61462 | 1.59875 | S-TIM5 (OHARA) |
| 9 | −30.472 | | | | | | | |
| c3 | 0.0 | 1.0 | 1.51633 | 64.14 | 1.51825 | 1.52191 | 1.51386 | S-BSL7 (OHARA) |
| c4 | 0.0 | | | | | | | |

TABLE 14

(example 10)
f = 43.106, F = 4.2, m = 0.11102, Y = 152.4, ω = 19.5°

| i/j | r | d | nd | vd | ne | nF | nc | Material Name (Manufacturer) |
|---|---|---|---|---|---|---|---|---|
| c1 | 0.0 | 3.2 | 1.51633 | 64.14 | 1.51825 | 1.52191 | 1.51386 | S-BSL7 (OHARA) |
| c2 | 0.0 | | | | | | | |
| 1 | 12.819 | 2.461 | 1.69680 | 55.53 | 1.69979 | 1.70552 | 1.69297 | S-LAL14 (OHARA) |
| 2 | 38.818 | 0.725 | | | | | | |
| 3 | −72.576 | 1.000 | 1.64769 | 33.79 | 1.65222 | 1.66126 | 1.6421 | S-TIM22 (OHARA) |
| 4 | 13.41 | 1.369 | | | | | | |
| 5 | 0.0 | 0.441 | | | | | | |
| 6 | 22.428 | 13.000 | 1.74400 | 44.79 | 1.74795 | 1.75566 | 1.73905 | S-LAM2 (OHARA) |
| 7 | −30.031 | 9.893 | | | | | | |
| 8 | −12.367 | 5.420 | 1.66680 | 33.05 | 1.67157 | 1.6811 | 1.66092 | S-TIM39 (OHARA) |
| 9 | −27.394 | | | | | | | |
| c3 | 0.0 | 0.7 | 1.51633 | 64.14 | 1.51825 | 1.52191 | 1.51386 | S-BSL7 (OHARA) |
| c4 | 0.0 | | | | | | | |

TABLE 15

(example 11)
f = 42.918, F = 4.2, m = 0.11102, Y = 152.4, ω = 19.5°

| | r | d | nd | vd | ne | nF | nc | Material Name (Manufacturer) |
|---|---|---|---|---|---|---|---|---|
| c1 | 0.0 | 3.2 | 1.51633 | 64.14 | 1.51825 | 1.52191 | 1.51386 | S-BSL7 (OHARA) |
| c2 | 0.0 | | | | | | | |
| 1 | 14.033 | 4.272 | 1.71300 | 53.87 | 1.71615 | 1.72221 | 1.70897 | S-LAL8 (OHARA) |

TABLE 15-continued (example 11)
f = 42.918, F = 4.2, m = 0.11102, Y = 152.4, ω = 19.5°

|    | r       | d      | nd      | vd    | ne      | nF      | nc      | Material Name (Manufacturer) |
|----|---------|--------|---------|-------|---------|---------|---------|------------------------------|
| 2  | 43.733  | 0.635  | 1.00000 |       | 1       | 1       | 1       |                              |
| 3  | −63.466 | 1.663  | 1.76182 | 26.52 | 1.76859 | 1.7823  | 1.75357 | S-TIH14 (OHARA)              |
| 4  | 16.293  | 0.735  | 1.00000 |       | 1       | 1       | 1       |                              |
| 5  | 0.0     | 1.219  | 1.00000 |       | 1       | 1       | 1       |                              |
| 6  | 23.579  | 14.000 | 1.83400 | 37.16 | 1.83932 | 1.84982 | 1.82738 | S-LAH60 (OHARA)              |
| 7  | −29.268 | 6.327  | 1.00000 |       | 1       | 1       | 1       |                              |
| 8  | −12.145 | 1.250  | 1.69895 | 30.13 | 1.70442 | 1.71542 | 1.69222 | S-TIM35 (OHARA)              |
| 9  | −26.285 |        |         |       |         |         |         |                              |
| c3 | 0.0     | 0.7    | 1.51633 | 64.14 | 1.51825 | 1.52191 | 1.51386 | S-BSL7 (OHARA)               |
| c4 | 0.0     |        |         |       |         |         |         |                              |

The structure of the imaging element 105 of the Gauss type having the four-group and six-piece structure, the graph illustrating the aberrations of the imaging element 105, and the data as well as the material name of the glass used of the imaging element 105, are represented in FIGS. 21 and 22 and in the table 6.

Table 17 represents, in each of the examples 6 to 11 and the comparative example, a focal distance fF relative to the F-line of the imaging element 105', a focal distance fe relative to the e-line of the imaging element 105', and a focal distance fC relative to the C-line of the imaging element 105'. Table 17 represents values according to the formulae (7) and (8) calculated by using the values in the table 16.

TABLE 16

<Values of Parameters used in the Formulae (7) and (8)>

|    | Example 6 | Example 7 | Example 8 | Example 9 | Example 10 | Example 11 | Comparative Example | Remarks |
|----|-----------|-----------|-----------|-----------|------------|------------|---------------------|---------|
| fF | 82.9349   | 84.3911   | 43.128    | 42.9982   | 43.0432    | 43.0297    | 90.2833             | A       |
| fe | 83.0798   | 84.5076   | 43.1908   | 43.0618   | 43.1056    | 42.9183    | 90.2737             | B       |
| fC | 83.3859   | 84.793    | 43.3321   | 43.2123   | 43.2555    | 42.8991    | 90.335              | C       |

In the Table 16:
Remark A: The focal distance in the F-line
Remark B: The focal distance in the e-line
Remark C: The focal distance in the C-line

TABLE 17

<Values of Formulae (7) and (8)>

|          | Example 6 | Example 7 | Example 8 | Example 9 | Example 10 | Example 11 | Comparative Example | Remarks |
|----------|-----------|-----------|-----------|-----------|------------|------------|---------------------|---------|
| \|f − fe\|/fe | 0.0037    | 0.0034    | 0.0033    | 0.0035    | 0.0035     | 0.0026     | 0.0007              | A       |

In the Table 17:
Remark A: Corresponding to the formulae (7) and (8)

Table 18 represents values according to the formulae (4), (5), and (6), in each of the examples 6 to 11 and the comparative example.

TABLE 18

<Values of Parameters used in the Formulae (4) to (6)>

|     | Example 6 | Example 7 | Example 8 | Example 9 | Example 10 | Example 11 | Remarks |
|-----|-----------|-----------|-----------|-----------|------------|------------|---------|
| fe  | 83.080    | 84.508    | 43.191    | 43.062    | 43.106     | 42.918     |         |
| fL1 | 54.955    | 54.563    | 27.901    | 25.569    | 26.324     | 27.220     |         |
| n1  | 1.71300   | 1.69680   | 1.71300   | 1.71300   | 1.69680    | 1.71300    |         |
| n2  | 1.67270   | 1.71736   | 1.64769   | 1.66680   | 1.64769    | 1.76182    |         |
| n3  | 1.83400   | 1.83400   | 1.74400   | 1.74400   | 1.74400    | 1.83400    |         |
| n4  | 1.76182   | 1.74077   | 1.66680   | 1.60342   | 1.66680    | 1.69895    |         |

TABLE 18-continued

<Values of Parameters used in the Formulae (4) to (6)>

|  | Example 6 | Example 7 | Example 8 | Example 9 | Example 10 | Example 11 | Remarks |
|---|---|---|---|---|---|---|---|
| v1 | 53.87 | 55.53 | 53.87 | 53.87 | 55.53 | 53.87 | |
| v2 | 32.10 | 29.52 | 33.79 | 33.05 | 33.79 | 26.52 | |
| v3 | 37.16 | 37.16 | 44.79 | 44.79 | 44.79 | 37.16 | |
| v4 | 26.52 | 27.79 | 33.05 | 38.03 | 33.05 | 30.13 | |
| ncv − ncc | 0.1125 | 0.0727 | 0.1425 | 0.1868 | 0.1263 | 0.0862 | formula (4) |
| vcv − vcc | 32.41 | 35.38 | 31.82 | 27.58 | 33.48 | 34.38 | formula (5) |
| fL1 × v1/f2 | 35.634 | 35.853 | 34.800 | 31.986 | 33.912 | 34.166 | formula (6) |

In the Table 18:
n1: Refractive index of the d-line (587.56 nm) of the first lens (positive lens)
n2: Refractive index of the d-line (587.56 nm) of the second lens (negative lens)
n3: Refractive index of the d-line (587.56 nm) of the third lens (positive lens)
n4: Refractive index of the d-line (587.56 nm) of the fourth lens (negative lens)
v1: Abbe number of the first lens (positive lens)
v2: Abbe number of the second lens (negative lens)
v3: Abbe number of the third lens (positive lens)
v4: Abbe number of the fourth lens (negative lens)

As is clear from the above-described examples, in the second embodiment of the invention in comparison to the comparative example, the chromatic aberration on the axis of the C-line (656.27 nm) corresponding to the R (red) signal is increased. As a result, in the present embodiment, the difference between the distance Bf3 from the rear end part of the imaging element to the imaging position of the C-line and the distance Bfe from the rear end part of the imaging element to the imaging position of the e-line is larger than that of the comparative example in an actually-used state. However, since the R (red) signal is unused in the present embodiment of the invention for the detection of the dot in the image region separation processes, there is no influence on the performance for the image region separation.

With respect to other aberrations in accordance with the present embodiment, the distortion aberration is suppressed to be small to an extent of ±0.1% while a field angle, in which a half-field angle exceeds 19 degrees, is maintained. In addition, the field curvature and, in particular, the sagittal field curvature, are extremely small. Moreover, as to the coma aberration, a flare component is compensated finely in spite of a large diameter of F4.2, and thus the performance therefor equivalent to the comparative example is maintained. Hence, according to the present embodiment, the imaging lens has the good performance throughout the entire range from the part near the optical axis to the peripheral part of the imaging lens. Also, the chromatic aberration relative to the magnification is suppressed and thus is less than that of the comparative example in spite of the large on-axis chromatic aberration. Therefore, a pixel deviation for each color in a final image hardly occurs.

Accordingly, it is possible to extract the following (1) to (20) from the above-described exemplary embodiments of the present invention.

(1) An image reading apparatus, comprising: a light source which irradiates illumination light to a document; an imaging element which images reflected light of the illumination light from the document, and which satisfies a formula (1)

$$|Bf1 - Bf2| < |Bf3 - Bf2| \quad (1)$$

where Bf1 is a distance from a rear end part of the imaging element to a first imaging position relative to first light having a wavelength in the first wavelength range, Bf2 is a distance from the rear end part of the imaging element to a second imaging position relative to second light having a wavelength in the second wavelength range, and Bf3 is a distance from the rear end part of the imaging element to a third imaging position relative to third light having a wavelength in the third wavelength range; a color separator which performs color separation of the illumination light or the reflected light into at least three wavelength ranges including the first wavelength range, the second wavelength range, and the third wavelength range; a light-receiving element which converts the reflected light imaged by the imaging element into an electrical signal as a document image of the document, for each of the at least three wavelength ranges; and an image processor which classifies the document image on the basis of the electrical signal in the first wavelength range and in the second wavelength range.

(2) An image reading apparatus according to (1), wherein the first wavelength range comprises a wavelength range of blue light, the second wavelength range comprises a wavelength range of green light, and the third wavelength range comprises a wavelength range of red light.

(3) An image reading apparatus according to (1) or (2), wherein the image processor judges a dot region in the document.

Accordingly, fine classification of the document images is possible even when a compact, low-cost imaging lens in which the number of lenses is reduced is used as the imaging element. Therefore, it is possible to apply image processes suitable for each of the classified document images, and thereby to realize the image reading having high precision.

In addition, the document images are classified, and the image processes suitable for each of the classified document images are applied. Therefore, it is possible to improve quality of a formed image. In particular, it is possible to ensure response to the dot character region on the white part.

Furthermore, both of the electrical signals for the first wavelength range and the second wavelength range are used to detect the dot region. Therefore, it is possible to increase the accuracy in the detection of the dot region.

Moreover, it is possible to suppress the optical performance for the third wavelength range unused for the imaging processes to be small. For example, reduction of the imaging performance for the high spatial frequency region in the unused third wavelength range is possible. Therefore, degree of freedom in the optical design is increased significantly.

Additionally, the electrical signal of the first wavelength range and the electrical signal of the second wavelength range are used as the electrical signal for performing the image processes. Therefore, it is possible to suppress the number of signals used, and to reduce the amount of memory in the image processes.

(4) An image reading apparatus according to any one of (1) to (3), wherein the imaging element comprises a reduction imaging element which causes reduction imaging of the reflected light.

(5) An image reading apparatus according to (4), wherein a formula (2) and a formula (3) are satisfied:

$$|ff-fe| < |fc-fe| \qquad (2)$$

$$0.003 < |fc-fe|/fe < 0.0045 \qquad (3)$$

where fe is a focal distance for a reference wavelength e-line (546.07 nm) of the reduction imaging element, ff is a focal distance for an F-line (486.13 nm) of the reduction imaging element, and fc is a focal distance for an C-line (656.27 nm) of the reduction imaging element.

Accordingly, the imaging element can be the imaging element which causes the reduction imaging of the reflected light. Therefore, the fine image reading performance is obtainable even in a case in which the surface of the document is not in close-contact with the contact glass and floated from the contact glass.

In addition, the on-axis chromatic aberration of the imaging element is set within in the predetermined range. Therefore, the reduction in the number of lenses and compactification thereof are possible, and the imaging lens having reduced costs is obtained.

(6) An image reading apparatus according to (5), wherein the reduction imaging element comprises, subsequently in an order from a side of the document as a photographic object, by a first lens having positive power, a second lens having negative power, a third lens having positive power, and a fourth lens having negative power.

(7) An image reading apparatus according to (6), wherein the first lens comprises a lens having a meniscus configuration facing its convex surface to the side of the photographic object, the second lens comprises a both-concaved lens, the third lens comprises a both-convexed lens, the fourth lens comprises a lens having a meniscus configuration facing its concave surface to the side of the photographic object, and the reduction imaging element comprises an aperture stop provided between the second lens and the third lens.

Accordingly, the fine imaging performance is obtainable even when the so-called telephoto type lens having the four-group and four-piece structure is employed, as an alternative to the so-called Gauss type lens having the four-group and six-piece structure.

(8) An image reading apparatus according to (6) or (7), wherein a formula (4) and a formula (5) are satisfied:

$$0.05 < ncv - ncc < 0.25 \qquad (4)$$

$$25.0 < vcv - vcc < 36.5 \qquad (5)$$

where ncv is a total of a refractive index in a d-line (587.56 nm) of the first lens and the third lens, ncc is a total of a refractive index in a d-line of the second lens and the fourth lens, vcv is a total of Abbe number in the d-line of the first lens and the third lens, and vcc is a total of Abbe number in the d-line of the second lens and the fourth lens.

Accordingly, the plane-fall or plane-collapse and the field curvature are suppressed, and the on-axis chromatic aberration is finely compensated. Therefore, it is possible to obtain the good imaging performance.

(9) An image reading apparatus according to any one of (6) to (8), wherein a formula (6) is satisfied:

$$31.0 < fL1 \times v1/fe < 37.0 \qquad (6)$$

where fL1 is a focal distance for a reference wavelength e-line (546.07 nm) of the first lens, v1 is Abbe number of the first lens, and fe is the focal distance for the reference wavelength e-line of the reduction imaging element.

Accordingly, it is possible to obtain the fine quality in the read image, and to reduce the costs of the imaging lens.

(10) An image reading apparatus according to any one of (1) to (9), wherein the imaging element comprises at least one spherical lens.

Accordingly, it is possible to obtain a lens having no limitation in size, and in which workability, accuracy in the surface configuration and so on are good.

(11) An image forming apparatus, comprising: the image reading apparatus according any one of (1) to (10); and an image forming section which forms an electrostatic latent image on a photoconductive photoreceptor with a light beam, on the basis of an output signal from the image reading apparatus.

Accordingly, the image forming apparatus utilizes the image reading apparatus of the present invention. Therefore, the fine reading of the document is possible without causing the performance for the image region separation to be deteriorated. Hence, the fine image formation having no pixel shift or chromatic aberration for each color is possible.

(12) An image reading apparatus, comprising: a light source which irradiates illumination light to a document; an imaging element which images reflected light of the illumination light from the document, and which satisfies a formula (7)

$$0.001 < |f-fe|/fe \qquad (7)$$

where fe is a focal distance for a reference wavelength e-line (546.07 nm), and f is a focal distance for a C-line (656.27 nm) or for an F-line (486.13 nm); a color separator which performs color separation of the illumination light or the reflected light into at least three wavelength ranges including a first wavelength range, a second wavelength range, and a third wavelength range; a light-receiving element which converts the reflected light imaged by the imaging element into an electrical signal as a document image of the document, for each of the at least three wavelength ranges; and an image processor which converts the electrical signal into luminance/color difference signals or value/chromaticity signals to perform a filter process.

(13) An image reading apparatus according to (12), wherein the first wavelength range comprises a wavelength range of blue light, the second wavelength range comprises a wavelength range of green light, and the third wavelength range comprises a wavelength range of red light.

(14) An image reading apparatus according to (12) or (13), wherein a formula (8) is satisfied:

$$|f-fe|/fe < 0.0045 \qquad (8)$$

where fe is the focal distance for the reference wavelength e-line (546.07 nm), and f is the focal distance for the C-line (656.27 nm) or for the F-line (486.13 nm).

Accordingly, the sufficient field angle and brightness are obtainable even when a compact, low-cost imaging lens in which the number of lenses is reduced is used as the imaging element. Therefore, the image reading of high accuracy is possible without causing decrease in the image quality.

In addition, the RGB signal is converted into the luminance/color difference signals or the value/chromaticity signals, and the filter process is performed to the luminance signal having large contribution to the wavelength range of the green light. Therefore, the image processes are performable even when the imaging performance for the wavelength range of the red light is deteriorated to some extent. Hence, there is no necessity for finely compensating the on-axis chromatic aberration in the wavelength range of the red light.

Moreover, the on-axis chromatic aberration of the imaging element is set within the predetermined range. Therefore, the reduction in the number of lenses and compactification thereof are possible, and the imaging lens having reduced costs is obtained.

(15) An image reading apparatus according to any one of (12) to (14), wherein the imaging element comprises, subsequently in an order from a side of the document as a photographic object, by a first lens having positive power, a second lens having negative power, a third lens having positive power, and a fourth lens having negative power.

(16) An image reading apparatus according to (15), wherein the first lens comprises a lens having a meniscus configuration facing its convex surface to the side of the photographic object, the second lens comprises a both-concaved lens, the third lens comprises a both-convexed lens, the fourth lens comprises a lens having a meniscus configuration facing its concave surface to the side of the photographic object, and the imaging element comprises an aperture stop provided between the second lens and the third lens.

Accordingly, the fine imaging performance is obtainable even when the so-called telephoto type lens having the four-group and four-piece structure is employed, as an alternative to the so-called Gauss type lens having the four-group and six-piece structure.

(17) An image reading apparatus according to (15) or (16), wherein a formula (4) and a formula (5) are satisfied:

$$0.05 < ncv - ncc < 0.25 \qquad (4)$$

$$25.0 < vcv - vcc < 36.5 \qquad (5)$$

where ncv is a total of a refractive index in a d-line (587.56 nm) of the first lens and the third lens, ncc is a total of a refractive index in a d-line of the second lens and the fourth lens, vcv is a total of Abbe number in the d-line of the first lens and the third lens, and vcc is a total of Abbe number in the d-line of the second lens and the fourth lens.

Accordingly, the plane-fall or plane-collapse and the field curvature are suppressed, and the on-axis chromatic aberration is finely compensated. Therefore, it is possible to obtain the good imaging performance.

(18) An image reading apparatus according to any one of (15) to (17), wherein a formula (6) is satisfied:

$$31.0 < fL1 \times v1/fe < 37.0 \qquad (6)$$

where fL1 is a focal distance for a reference wavelength e-line (546.07 nm) of the first lens, v1 is Abbe number of the first lens, and fe is the focal distance for the reference wavelength e-line of the imaging element.

Accordingly, it is possible to obtain the fine quality in the read image, and to reduce the costs of the imaging lens.

(19) An image reading apparatus according to any one of (12) to (18), wherein the imaging element comprises at least one spherical lens.

Accordingly, it is possible to obtain a lens having no limitation in size, and in which workability, accuracy in the surface configuration and so on are good.

(20) An image forming apparatus, comprising: the image reading apparatus according to any one of (12) to (19); and an image forming section which forms an electrostatic latent image on a photoconductive photoreceptor with a light beam, on the basis of an output signal from the image reading apparatus.

Accordingly, the image forming apparatus utilizes the image reading apparatus of the present invention. Therefore, the fine reading of the document is possible without causing the performance for the image region separation to be deteriorated. Hence, the fine image formation having no pixel shift or chromatic aberration for each color is possible.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based on the language employed in the claims and not limited to examples described in the present specification or during the prosecution of the application, and the examples are to be construed as non-exclusive. For example, in the present disclosure, the term "preferably", "preferred" or the like is non-exclusive and means "preferably", but not limited to. The use of the terms first, second, etc. do not denote any order or importance, but rather the terms first, second, etc. are used to distinguish one element from another. Moreover, no element or component in the present disclosure is intended to be dedicated to the public regardless of whether the element or component is explicitly recited in the following claims.

What is claimed is:

1. An image reading apparatus, comprising:
a light source which irradiates illumination light to a document;
an imaging element which images reflected light of the illumination light from the document, and which satisfies a formula (1)

$$|Bf1 - Bf2| < |Bf3 - Bf2| \qquad (1)$$

where Bf1 is a distance from a rear end part of the imaging element to a first imaging position relative to first light having a wavelength in a first wavelength range, Bf2 is a distance from the rear end part of the imaging element to a second imaging position relative to second light having a wavelength in a second wavelength range, and Bf3 is a distance from the rear end part of the imaging element to a third imaging position relative to third light having a wavelength in a third wavelength range;
a color separator which performs color separation of the illumination light or the reflected light into at least three wavelength ranges including the first wavelength range, the second wavelength range, and the third wavelength range;
a light-receiving element which converts the reflected light imaged by the imaging element into an electrical signal as a document image of the document, for each of the at least three wavelength ranges; and
an image processor which classifies the document image on the basis of the electrical signal in the first wavelength range and in the second wavelength range; and
wherein the imaging element comprises a reduction imaging element which causes reduction imaging of the reflected light; and wherein a formula (2) and a formula (3) are satisfied:

$$|f\!f-fe| < |fc-fe| \qquad (2)$$

$$0.003 < |fc-fe|/fe < 0.0045 \qquad (3)$$

where fe is a focal distance for an F-line of the reduction imaging element, and fc is a focal distance for an C-line of the reduction imaging element, wherein the e-line has a wavelength of about 546.07 nm, the F-line has a wavelength of about 486.13 nm, and the C-line has a wavelength of about 656.27 nm.

2. The image reading apparatus according to claim 1, wherein the first wavelength range comprises a wavelength range of blue light, the second wavelength range comprises a wavelength range of green light, and the third wavelength range comprises a wavelength range of red light.

3. The image reading apparatus according to claim 1, wherein the image processor judges a dot region in the document.

4. The image reading apparatus according to claim 1, wherein the reduction imaging element comprises, subsequently in an order from a side of the document as a photographic object, by a first lens having positive power, a second lens having negative power, a third lens having positive power, and a fourth lens having negative power.

5. The image reading apparatus according to claim 4, wherein
the first lens comprises a lens having a meniscus configuration facing its convex surface to the side of the photographic object,
the second lens comprises a both-concaved lens,
the third lens comprises a both-convexed lens,
the fourth lens comprises a lens having a meniscus configuration facing its concave surface to the side of the photographic object, and
the reduction imaging element comprises an aperture stop provided between the second lens and the third lens.

6. The image reading apparatus according to claim 4, wherein a formula (4) and a formula (5) are satisfied:

$$0.05 < ncv-ncc < 0.25 \qquad (4)$$

$$25.0 < vcv-vcc < 36.5 \qquad (5)$$

where ncv is a total of a refractive index in a d-line of the first lens and the third lens, ncc is a total of a refractive index in a d-line of the second lens and the fourth lens, vcv is a total of Abbe number in the d-line of the first lens and the third lens, and vcc is a total of Abbe number in the d-line of the second lens and the fourth lens, wherein the d-line has a wavelength of about 587.56 nm.

7. The image reading apparatus according to claim 4, wherein a formula (6) is satisfied:

$$31.0 < fL1 \times v1/fe < 37.0 \qquad (6)$$

where fL1 is a focal distance for a reference wavelength e-line of the first lens, v1 is Abbe number of the first lens, and fe is the focal distance for the reference wavelength e-line of the reduction imaging element, wherein the e-line has a wavelength of about 546.07 nm.

8. The image reading apparatus according to claim 1, wherein the imaging element comprises at least one spherical lens.

9. The image forming apparatus, comprising:
the image reading apparatus according to claim 1; and
an image forming section which forms an electrostatic latent image on a photoconductive photoreceptor with a light beam, on the basis of an output signal from the image reading apparatus.

10. An image reading apparatus, comprising:
a light source which irradiates illumination light to a document;
an imaging element which images reflected light of the illumination light from the document, and which satisfies a formula (7) and a formula (8)

$$|f\!f-fe| < |fc-fe| \qquad (7)$$

$$0.003 < |fc-fe|/fe < 0.0045 \qquad (8)$$

where fe is a focal distance for a reference wavelength e-line, and ff is a focal distance for an F-line, and fc is a focal distance for a C-line;
a color separator which performs color separation of the illumination light or the reflected light into at least three wavelength ranges including a first wavelength range, a second wavelength range, and a third wavelength range;
a light-receiving element which converts the reflected light imaged by the imaging element into an electrical signal as a document image of the document, for each of the at least three wavelength ranges; and
an image processor which converts the electrical signal into luminance/color difference signals or value/chromaticity signals to perform a filter process,
wherein the e-line has a wavelength of about 546.07 nm, the F-line has a wavelength of about 486.13 nm, and the C-line has a wavelength of about 656.27 nm.

11. The image reading apparatus according to claim 10, wherein the first wavelength range comprises a wavelength range of blue light, the second wavelength range comprises a wavelength range of green light, and the third wavelength range comprises a wavelength range of red light.

12. The image reading apparatus according to claim 10, wherein the imaging element comprises, subsequently in an order from a side of the document as a photographic object, by a first lens having positive power, a second lens having negative power, a third lens having positive power, and a fourth lens having negative power.

13. The image reading apparatus according to claim 12, wherein
the first lens comprises a lens having a meniscus configuration facing its convex surface to the side of the photographic object,
the second lens comprises a both-concaved lens,
the third lens comprises a both-convexed lens,
the fourth lens comprises a lens having a meniscus configuration facing its concave surface to the side of the photographic object, and
the imaging element comprises an aperture stop provided between the second lens and the third lens.

14. The image reading apparatus according to claim 12, wherein a formula (4) and a formula (5) are satisfied:

$$0.05 < ncv-ncc < 0.25 \qquad (4)$$

$$25.0 < vcv-vcc < 36.5 \qquad (5)$$

where ncv is a total of a refractive index in a d-line of the first lens and the third lens, ncc is a total of a refractive index in a d-line of the second lens and the fourth lens, vcv is a total of Abbe number in the d-line of the first lens and the third lens, and vcc is a total of Abbe number in the d-line of the second lens and the fourth lens, wherein the d-line has a wavelength of about 587.56 nm.

15. The image reading apparatus according to claim 12, wherein a formula (6) is satisfied:

$$31.0 < fL1 \times v1/fe < 37.0 \qquad (6)$$

where fL1 is a focal distance for a reference wavelength e-line of the first lens, ν1 is Abbe number of the first lens, and fe is the focal distance for the reference wavelength e-line of the imaging element, wherein the e-line has a wavelength of about 546.07 nm.

16. The image reading apparatus according to claim 10, wherein the imaging element comprises at least one spherical lens.

17. The image forming apparatus, comprising:
the image reading apparatus according to claim 10; and
an image forming section which forms an electrostatic latent image on a photoconductive photoreceptor with a light beam, on the basis of an output signal from the image reading apparatus.

* * * * *